(12) United States Patent
Park et al.

(10) Patent No.: US 8,907,925 B2
(45) Date of Patent: Dec. 9, 2014

(54) TOUCH PANEL AND DISPLAY APPARATUS HAVING THE SAME

(75) Inventors: Wonbae Park, Seoul (KR); Soobeom Lee, Seoul (KR); Myungsuk Byeon, Seoul (KR); Yonghan Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 626 days.

(21) Appl. No.: 13/115,324

(22) Filed: May 25, 2011

(65) Prior Publication Data

US 2012/0146950 A1    Jun. 14, 2012

(30) Foreign Application Priority Data

Dec. 14, 2010    (KR) .................. 10-2010-0127630

(51) Int. Cl.
    *G06F 3/042*    (2006.01)
(52) U.S. Cl.
    CPC ............ *G06F 3/0421* (2013.01); *G06F 3/0428* (2013.01)
    USPC ........................................................ 345/175

(58) Field of Classification Search
    None
    See application file for complete search history.

(56) References Cited

U.S. PATENT DOCUMENTS

| | | | |
|---|---|---|---|
| 7,202,856 B2 * | 4/2007 | Cok ............................... | 345/173 |
| 7,417,627 B2 * | 8/2008 | Cok ............................... | 345/173 |
| 8,400,406 B1 * | 3/2013 | Kurtz et al. .................... | 345/173 |
| 8,654,101 B2 * | 2/2014 | Onishi ........................... | 345/175 |
| 2009/0189878 A1 * | 7/2009 | Goertz et al. .................. | 345/175 |
| 2009/0295744 A1 * | 12/2009 | Onishi ........................... | 345/173 |
| 2010/0295821 A1 * | 11/2010 | Chang et al. .................. | 345/175 |
| 2011/0050639 A1 * | 3/2011 | Challener et al. ............. | 345/175 |
| 2012/0268403 A1 * | 10/2012 | Christiansson ............... | 345/173 |

* cited by examiner

*Primary Examiner* — Joseph Haley
*Assistant Examiner* — Emily Frank
(74) *Attorney, Agent, or Firm* — Birch, Stewart, Kolasch & Birch, LLP

(57) ABSTRACT

Provided are a touch panel and a display apparatus having the touch panel. The touch panel includes a substrate, and a plurality of optical devices arranged on the substrate, in which a distance between two adjacent optical devices of the plurality of optical devices may gradually decrease toward a corner of the substrate.

9 Claims, 57 Drawing Sheets

TOUCH PANEL AND DISPLAY APPARATUS HAVING THE SAME

The present application claims priority to Korean Application No. 10-2010-0127630 filed in Korea on Dec. 14, 2010, the entire contents of which are hereby incorporated by reference in their entirety.

BACKGROUND

1. Field

This document relates to a touch panel and a display apparatus having the same.

2. Discussion of the Related Art

In general, a touch panel is an input device that is attached to the surface of a display panel. When a user touches an icon or a selection button displayed on a screen of the display panel with his or her finger or a pen, a predetermined command corresponding to the user's touch is executed.

Since touch panels are simpler to operate than other input devices, they have been widely used in electronic automatic guidance systems.

SUMMARY

Accordingly, one object of the present invention is to address the above-noted and other drawbacks of the related art.

Another object of the present invention is to provide a touch panel using a light emitting device and a light receiving device and a display apparatus having the same.

To accomplish the objects of the present invention, according to an aspect of the present invention, there is provided a touch panel including: a substrate; and a plurality of optical devices arranged on the substrate, wherein a distance between two adjacent optical devices of the plurality of optical devices gradually decreases toward a corner of the substrate.

The optical devices may include one or more light emitting devices for emitting light and one or more light receiving devices for receiving the light emitted by the light emitting devices.

A distance between two adjacent light receiving devices of the light receiving devices may gradually decrease toward the corner of the substrate.

A distance between two adjacent light emitting devices of the light emitting devices may gradually decrease toward the corner of the substrate.

A distance between a light emitting device and a light receiving device, adjacent to each other, among the light emitting devices and the light receiving devices may gradually decrease toward the corner of the substrate.

The number of the light receiving devices may be greater than that of the light emitting devices.

At least one of the optical devices may be arranged at the corner of the substrate.

To accomplish the objects of the present invention, according to another aspect of the present invention, there is provided a touch panel including: a substrate; and optical devices arranged on the substrate, wherein the optical devices comprise a light emitting device for emitting light and a light receiving device for receiving the light emitted by the light emitting device, and a direction to which a light emitting surface of at least one of the light emitting devices, arranged next to each other, directs is different from a direction to which a light emitting surface of at least one of other light emitting devices.

The optical devices may include first, second, and third light emitting devices, the first light emitting device may be arranged closer to a center of the substrate than the second light emitting device, and the second light emitting device may be arranged closer to the center of the substrate than the first light emitting device, and an angle between a direction to which the light emitting surface of the first light emitting device directs and a direction to which the light emitting surface of the third light emitting device directs may be greater than an angle between the direction to which the light emitting surface of the first light emitting device directs and a direction to which the light emitting surface of the second light emitting device directs.

A distance between two adjacent optical devices among the optical devices may gradually decrease toward a corner of the substrate.

To accomplish the objects of the present invention, according to another aspect of the present invention, there is provided a display apparatus including: a display panel; and a plurality of optical devices arranged around an edge of the display panel, wherein a distance between two adjacent optical devices of the plurality of optical devices gradually decreases toward a corner of the display panel.

To accomplish the objects of the present invention, according to another aspect of the present invention, there is provided a display apparatus including: a display panel comprising an active area on which an image is displayed and a dummy area arranged outside the active area; and a plurality of optical devices arranged in the dummy area of the display panel, wherein at least one of the plurality of optical devices does not overlap the active area in a direction parallel to a short side of the active area and a direction parallel to a long side of the active area.

A distance between two adjacent optical devices of the plurality of optical devices may gradually decrease toward a corner of the display panel.

The optical device not overlapping the active area in the direction parallel to the short side of the active area and the direction parallel to the long side of the active area may be arranged at a corner of the dummy area.

To accomplish the objects of the present invention, according to another aspect of the present invention, there is provided a display apparatus including: a display panel comprising an active area on which an image is displayed and a dummy area arranged outside the active area; and a plurality of optical devices arranged in the dummy area of the display panel, wherein the plurality of optical devices comprise light emitting devices for emitting light and light receiving devices for receiving the light emitted by the light emitting devices, and a direction to which a light emitting surface of at least one of the light emitting devices, arranged next each other, directs is different from a direction to which a light emitting surface of at least one of other light emitting devices.

To accomplish the objects of the present invention, according to another aspect of the present invention, there is provided a display apparatus including: a display panel comprising an active area on which an image is displayed and a dummy area arranged outside the active area; and a plurality of optical devices arranged in the dummy area of the display panel, wherein a distance between an end of the dummy area and the optical devices is smaller than a distance between the optical devices and the active area.

The number of the optical devices per unit distance in a first part adjacent to a corner of the dummy area may be greater than the number of the optical devices per unit distance in a second part located farther from the corner than the first part.

The optical devices may include at least one light emitting device for emitting light and at least one light receiving device for receiving the light emitted by the at least one light emitting device.

The number of the light receiving devices may be greater than that of the light emitting devices.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
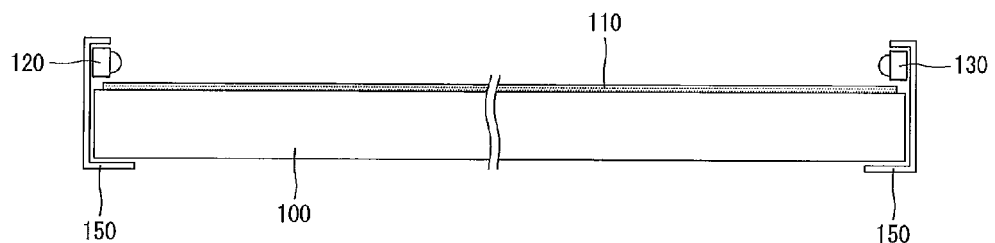
FIGS. 1 and 2 are diagrams illustrating the configuration of a touch panel according to an embodiment of the present invention.

Reference will now be made in detail to the preferred embodiments of the present invention, examples of which are illustrated in the accompanying drawings.

Hereinafter, exemplary embodiments of the present invention will now be described in more detail with reference to the accompanying drawings. However, the description proposed herein is just a preferable example for the purpose of illustrations only, not intended to limit the scope of the invention, so it should be understood that other equivalents and modifications could be made thereto without departing from the spirit and scope of the invention.

Though terms like a first and a second are used to describe various components in various embodiments of the present invention, the components are not limited to these terms. These terms are used only to differentiate one component from another one. Therefore, a component referred to as a first component in an embodiment can be referred to as a second component in another embodiment. In the same manner, a component referred to as a second component in an embodiment can be referred to as a first component in another embodiment.

As used herein, the term "and/or" includes any and all combinations of one or more of the associated listed items.

It will be understood that when an element is referred to as being "connected to" or "coupled to" another element, it can be connected or coupled to the other element or intervening elements may be present. In contrast, when an element is referred to as being "directly connected to" or "directly coupled to" another element, there are no intervening elements present.

In the following description, the technical terms are used only for explaining a specific exemplary embodiment while not limiting the present invention. The terms of a singular form may include plural forms unless referred to the contrary.

The meaning of "include," "comprise," "including," or "comprising," specifies a property, a region, a fixed number, a step, a process, an element and/or a component but does not exclude other properties, regions, fixed numbers, steps, processes, elements and/or components.

In addition, when terms used in this specification are not specifically defined, all the terms used in this specification including technical and scientific terms can be understood by those skilled in the art. Further, when general terms defined in the dictionaries are not specifically defined, the terms will have the normal meaning in the art. As long as clearly defined in this application, terms will not be construed as excessively formal meanings.

Rather, these embodiments are provided so that this disclosure will be thorough and complete and will fully convey the concept of the invention to those skilled in the art. In the drawings, the shapes and dimensions may be exaggerated for clarity.

Figure 2:
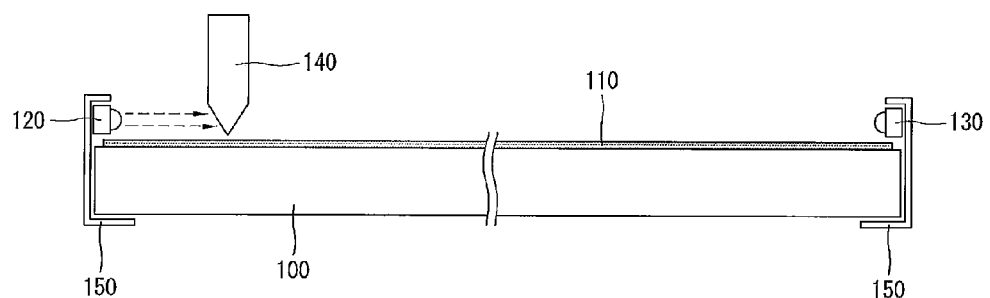

FIGS. 1 and 2 are diagrams illustrating the configuration of a touch panel according to an embodiment of the present invention.

Referring to FIG. 1, a touch panel according to this embodiment includes a substrate 100 and optical devices that are arranged on the substrate 100. Here, the optical devices may include light emitting devices 120 and light receiving devices 130.

The substrate 100 needs to be formed of a substantially transparent material in order to obtain light transmittance and have enough strength to support the light emitting device 120 and the light receiving devices 130. Therefore, the substrate 100 may be a film substrate or a glass substrate. Alternatively, the substrate 100 may be a plastic substrate.

FIG. 1 shows the case in which the light emitting devices 120 and the light receiving devices 130 are arranged on the substrate 100. However, the substrate 100 may be removed, and the light emitting devices 120 and the light receiving devices 130 may be arranged on a display panel (not shown). In this case, the display panel replaces the substrate 100. This will be described in detail below.

A protection layer 110 may further be arranged on the substrate 100. The protection layer 110 may prevent damage to the substrate 100 caused by external pressure exerted thereon. To this end, the protection layer 110 may be formed of glass or resin.

The protection layer 110 may be arranged on the substrate 100 in such a manner that laminates a film type protection film onto the surface of the substrate 100.

The light emitting devices 120 and the light receiving devices 130 may be arranged around the edge of the substrate 100.

The light emitting devices 120 may emit a predetermined beam such as an infrared beam, a visible Light beam, a microwave beam, an acoustic-wave beam, and a vibration-wave beam. Here, a device that emits at least one of the above-mentioned beams is referred to as the light emitting device 120.

The light receiving devices 130 may receive light emitted by the light emitting devices 120.

Though not shown, the touch panel according to this embodiment may include a controller that computes the position of a point selected by a user and a cable (not shown) that connects the controller to either the light emitting devices 120 or the light receiving devices 130.

The operation of the touch panel according to this embodiment which has been described so far will be described in association with FIG. 2.

When an input unit 140, for example, a pen or a finger, is located in a certain point on the surface of the substrate 100, the input unit 140 blocks the beam emitted from the light emitting devices 120 at the corresponding point.

Then, the beam emitted from the light emitting devices 120 may not reach the light receiving devices 130. Here, the controller (not shown) checks the light receiving devices 130 that is arranged at a location corresponding to where the beam has been blocked, thereby calculating the position at which the input unit 140 is located, that is, the position at which the substrate 100 is touched.

A protection cover 150 may cover the outside of the light emitting devices 120 and the light receiving devices 130. The protection cover 150 can prevent an erroneous operation of the light receiving devices 130 by blocking light externally incident thereon.

Figure 3:
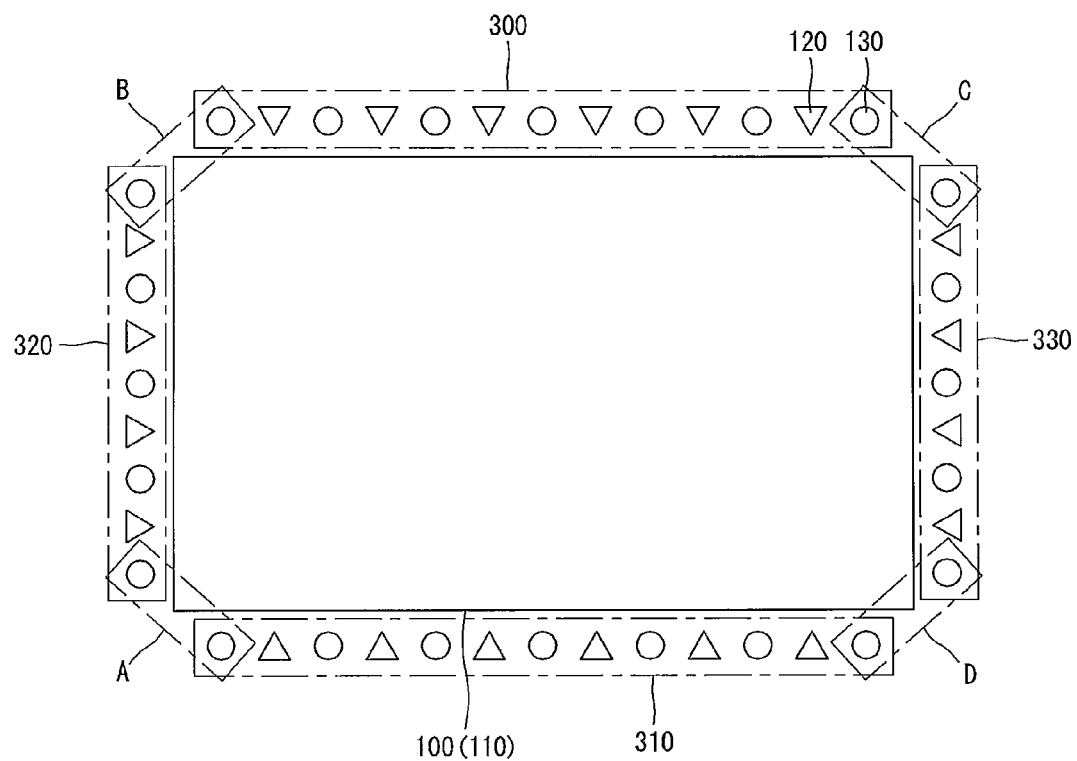
FIGS. 3 through 15, 16A, 16B, and 17 are diagrams illustrating the touch panel according to the embodiment of FIGS. 1 and 2 in detail.
Figure 4:
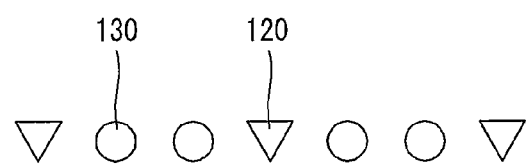

FIGS. 3 through 17 are diagrams illustrating the touch panel according to the embodiment of the present invention. Hereinafter, the light receiving devices 130 are shown as circles. In addition, for understanding, the light emitting devices 120 and the light receiving devices 130 are shown to be arranged around the edge of the substrate 100. The light emitting devices 120 and the light receiving devices 130 may overlap with the substrate 100. In FIG. 3, reference numerals 300, 310, 320, and 330 are partial areas of the substrate 100.

In FIG. 3, the light receiving devices 130 and the light emitting devices 120 may alternate with each other. That is, the light receiving devices 130 and the light emitting devices 120 may be alternately arranged.

As shown in FIG. 3, a first area 300, a second area 310 facing the first area 300, and a third area 320 and a fourth area 330 between the first area 300 and the second area 310 of the substrate 100 each may have the light receiving devices 130 and the light emitting devices 120 that alternate each other.

The number of light receiving devices 130 may be greater than that of light emitting devices 120.

To this end, as shown in FIG. 3, the light receiving devices 130 may be arranged at both ends of each of the first, second, third, and fourth areas 300, 310, 320, and 330 of the substrate 100. As such, when the light receiving devices 130 may be arranged at both ends of each of the first, second, third, and fourth areas 300, 310, 320, and 330 of the substrate 100, if the corner of the substrate 100 is touched, a position corresponding to the touch point can be detected more accurately to thereby enhance the accuracy of the touch panel.

As described above, when the light receiving devices 130 are provided at both ends of the first, second, third, and fourth areas 300, 310, 320, and 330 of the substrate 100, the light receiving devices 130 may be arranged next to each other between two neighboring areas. For example, as shown as B, two light receiving devices 130 are arranged next to each other between the first area 300 and the third area 320 of the substrate 100; as shown as C, two light receiving devices 130 are arranged next to each other between the first area 300 and the fourth area 330 of the substrate 100; as shown as A, two light receiving devices 130 are arranged next to each other between the second area 310 and the third area 320 of the substrate 100; and as shown as D, two light receiving devices 130 are arranged next to each other between the second area 310 and the fourth area 330 of the substrate 100.

Alternatively, in order that the number of light receiving devices 130 can be greater than that of light emitting devices 120, a plurality of light receiving devices 130 may be arranged between two light emitting devices 120. In this case, at least two light receiving devices 130 may be arranged next to each other.

In addition, though not shown, under the condition that the number of light receiving devices 130 is greater than that of light emitting devices 120, at least two light emitting devices 120 may be arranged next to each other.

When the touch panel according to this embodiment is drive, the plurality of light emitting devices 120 may be turned on in a sequential manner. Here, when the light emitting devices 120 are turned on, the light emitting devices 120 emit predetermined beams. In addition, when the light receiving devices 130 are turned on, it may mean that the light receiving devices 130 are activated. A touch position is detected according to whether the light receiving devices 130, which have been activated, receive light or not. In addition, when the light receiving devices 130 are turned off, the light receiving devices 130 may not be activated. Whether the light receiving devices 130, being turned off, receive light or not may not be taken into account at all in terms of detecting a touch position.

Figure 5:
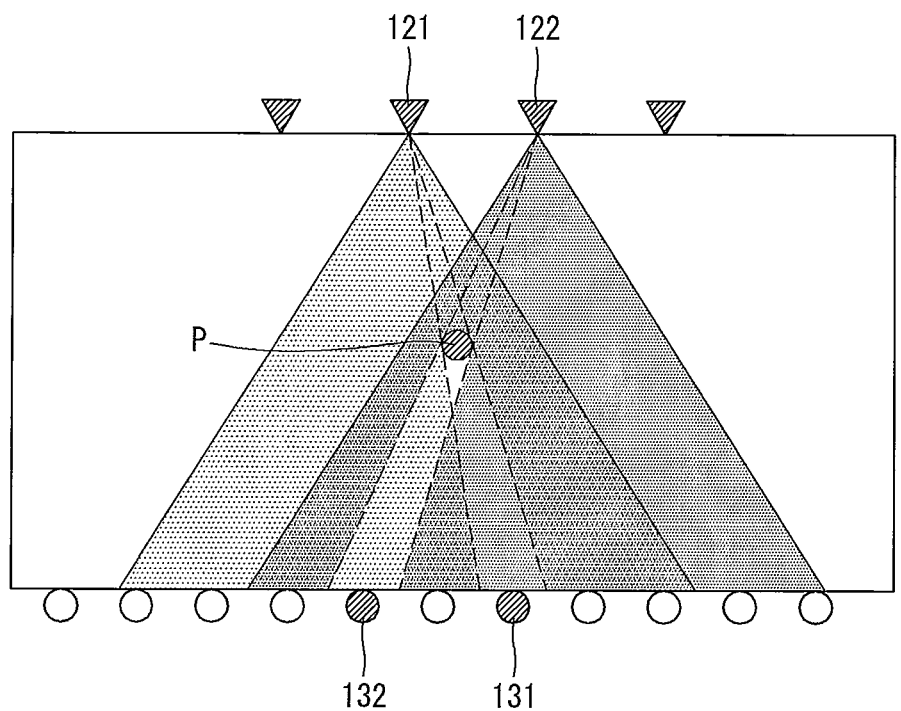

For example, as shown in FIG. 5, when an input unit is located in a specific position P, light that is emitted when a first light emitting device 121 among the plurality of light emitting devices 120 is turned on may be blocked at the specific position P. Correspondingly, a first light receiving device 131 among the plurality of light receiving devices 130 cannot receive the light having been emitted from the first light emitting device 121. Hereinafter, for better understanding, a case in which the light emitting devices 120 and the light receiving devices 130 are arranged in different regions of the substrate 100 will be exemplified.

In addition, when a second light emitting device 122 among the plurality of light emitting devices 120 is turned on, light that is emitted from the second light emitting device 122 may be blocked at the specific position P. Correspondingly, a second light receiving device 132 among the plurality of light receiving devices 130 cannot receive the light having been emitted from the second light emitting device 122.

Here, on the basis of data about the positions of the first light emitting device 121 and the first light receiving device 131 and the positions of the second light emitting device 122 and the second light receiving device 132, a coordinate of the specific position P at which the input unit is located can be acquired.

A case in which the number of light emitting devices 120 is greater than or equal to that of light receiving devices 130 will now be described with reference to FIG. 6.

Figure 6:
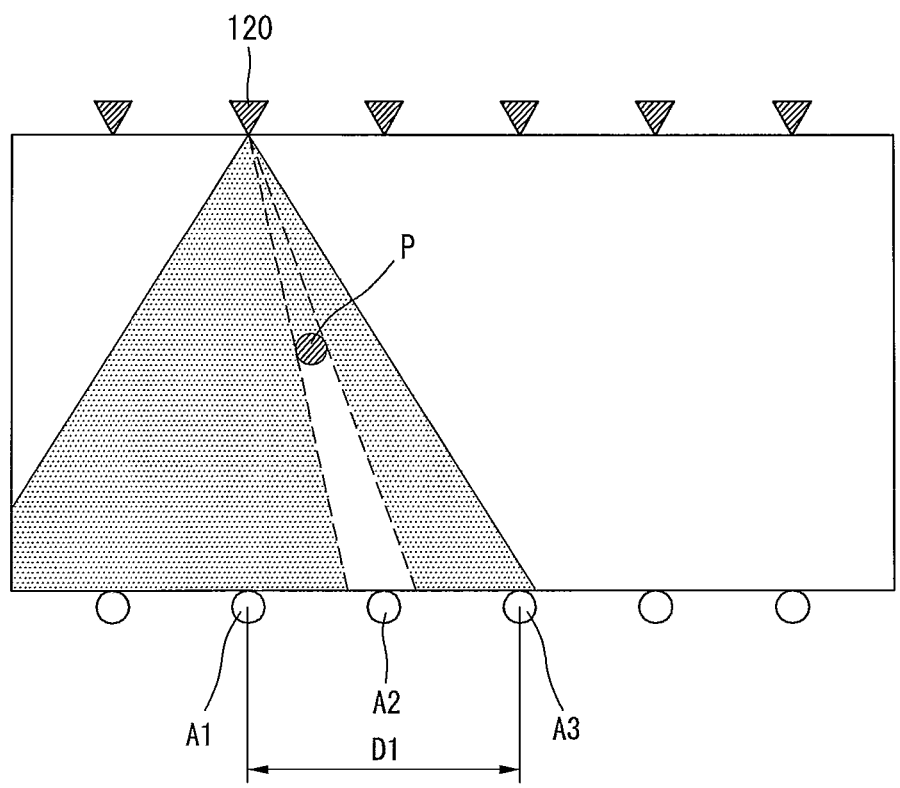

As shown in FIG. 6, when a random light emitting device 120 emits a beam, a second light receiving device A2 among the plurality of light receiving devices 130 being activated may not receive the beam having been emitted from the light emitting devices 120. A first light receiving device A1 and a third light receiving device A3 that are adjunct to the second light receiving device A2 may receive the beam emitted from the light emitting device 120.

In this case, it can be assumed that a specific position P at which an input unit is located, that is, a touch point is present between the first light receiving device A1 and the third light receiving device A3 that are spaced apart from each other by a distance D1.

Figure 7:
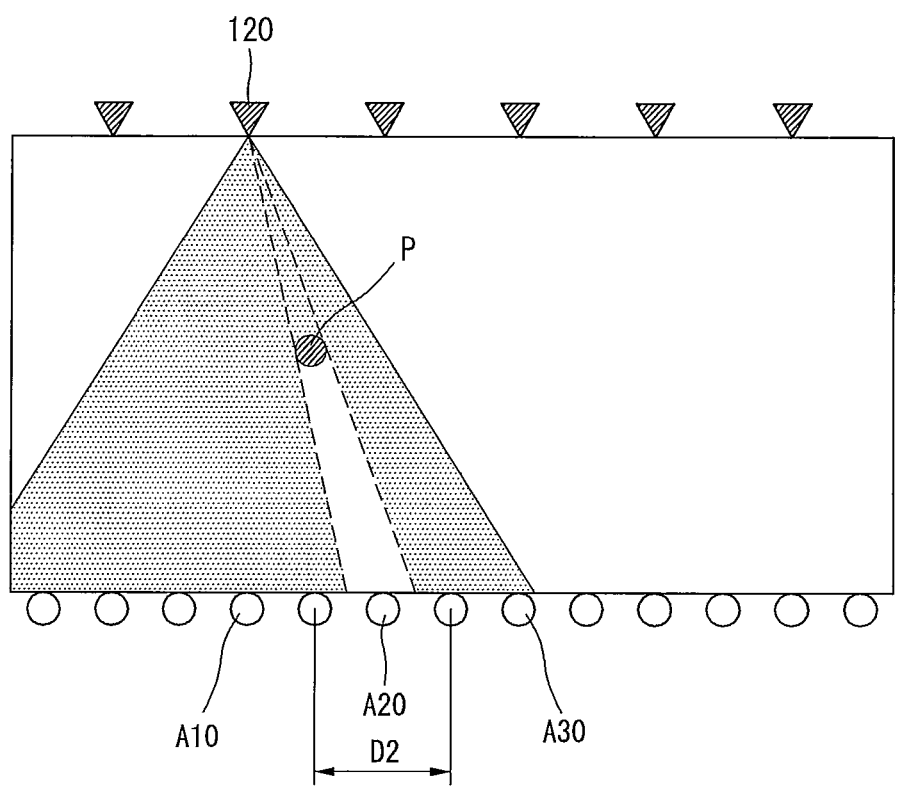

On the other hand, as shown in FIG. 7, in a case in which the number of light receiving devices 130 is greater than that of light emitting devices 120, when an arbitrary light emitting device 120 emits a beam, a twentieth light receiving device A20 among the plurality of light receiving devices 130 being activated may not receive the beam having been emitted from the light emitting device 120, and a tenth light receiving device A10 and a thirtieth light receiving device A30 that are adjacent to the twentieth light receiving device A20 may receive the beam having been emitted from the light emitting device 120.

In this case, it can be assumed that a specific position P at which an input unit is located, that is, a touch point is located between the tenth light receiving device A10 and the thirtieth light receiving device A30 that are spaced apart from each other by a distance D2 smaller than the distance D1. That is, location estimation accuracy is higher in the case as shown in FIG. 7 than in the case as shown in FIG. 6.

In order to increase the location detection accuracy of a touch point, both of the number of light receiving devices 130 and the number of light emitting devices 120 may be increased at the same time.

However, a larger number of light emitting devices 120 may increase manufacturing costs. In addition, since the plurality of light emitting devices 120 need to be turned on in a sequential manner when the touch panel is driven, the increase in the number of light emitting devices 120 increases a time taken to calculate a touch position, and thus, response time of the touch panel may be reduced.

In addition, when the fact that one light emitting device 120 emits a beam at a predetermined angle is taken into account, the enhancement of detection accuracy in terms of a touch position may be insignificant despite the increase in the number of light emitting device.

Therefore, in order to reduce manufacturing costs, increase response time, and enhance detection accuracy for a touch position, the number of light receiving devices 130 may be greater than that of light emitting devices 120.

Figure 8:
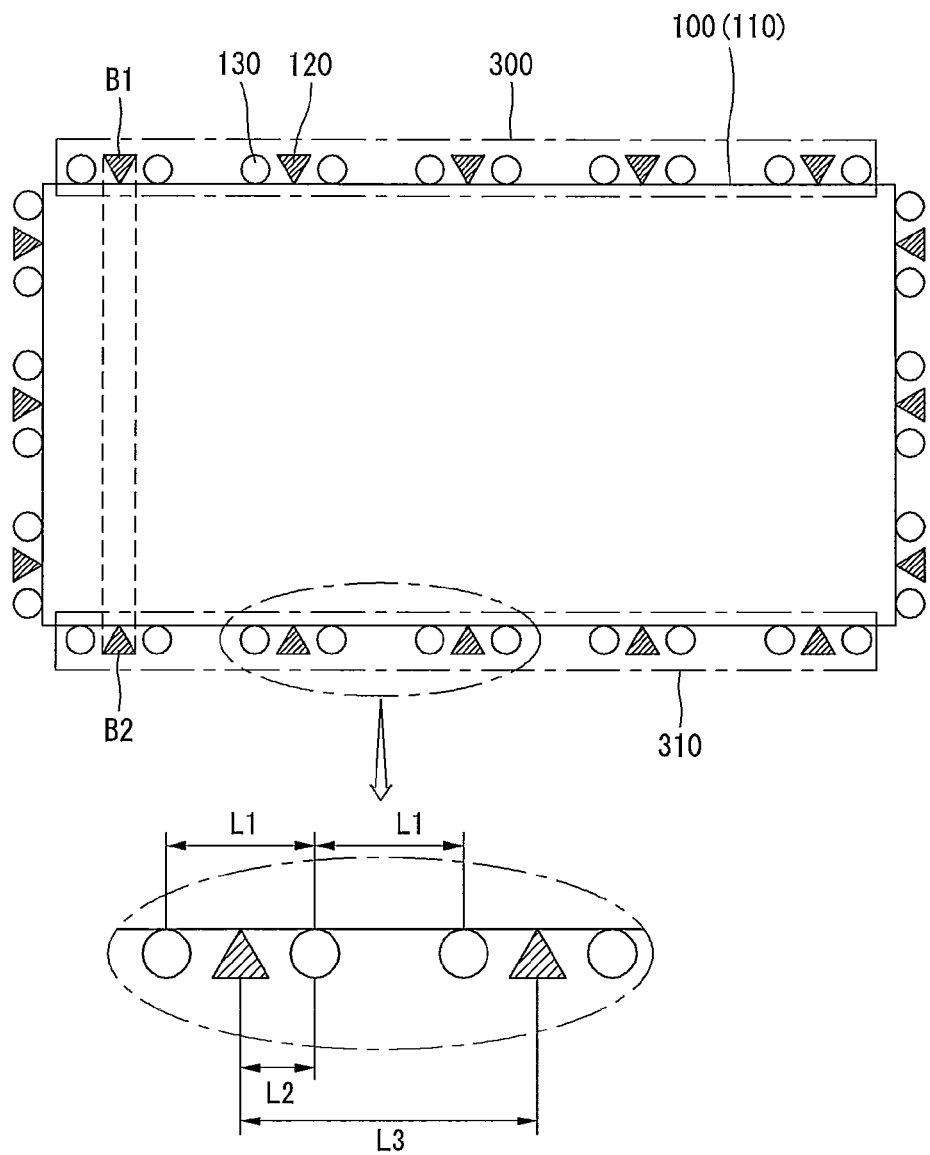

In order to increase the number of light receiving devices 130 to be greater than that of light emitting devices 120, as shown in FIG. 8, the light receiving devices 130 may be arranged at regular intervals, and each one of the light emitting devices 120 may be located between two light receiving devices 130.

In this case, a distance L1 between two light receiving devices 130 that are arranged adjacent to each other may be greater than a distance L2 between a random light emitting device 120 and each of the light receiving devices 130.

In addition, the distance L1 between the two light receiving devices 130 arranged adjacent to each other may be smaller than a distance L3 between two light emitting devices 120 that are arranged adjacent to each other.

Moreover, two arbitrary light emitting devices 120 may directly face each other. For example, as shown in FIG. 8, a first light emitting device B1 that is arranged in the first area 300 of the substrate 100 and a second light emitting device B2 that is arranged in the second area 310 facing the first area 300 of the substrate 100 may overlap in a direction perpendicular to a direction of the first area 300 and the second area 310.

Alternatively, two arbitrary light emitting devices 120 may not face each other. For example, an extension line E1 extended from at least one light emitting device 120 among the plurality of light emitting devices 120 may reach a point between two light receiving devices 130 adjacent to each other where no light emitting device is located as shown in FIG. 9.

Figure 9:
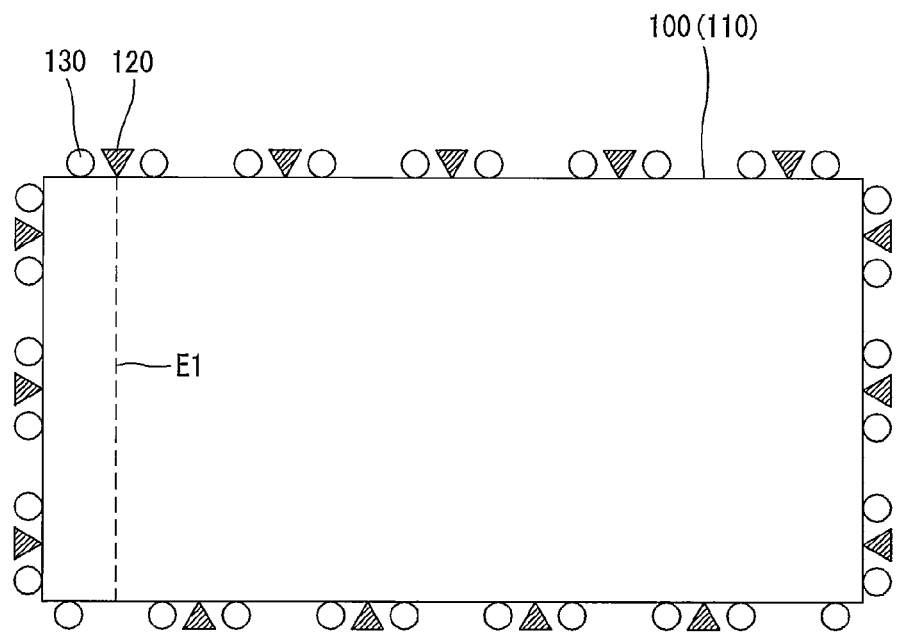

In the touch panel according to this embodiment, since the plurality of light receiving devices 130 may receive a beam emitted by one light emitting device 120, as shown in FIGS. 8 and 9, the light emitting devices 120 and the light receiving devices 130 do not need to be aligned.

A reason for which each one of the light emitting devices 120 is located between two arbitrary light receiving devices 130 will now be described with reference to FIGS. 10 and 11.

Figure 10:
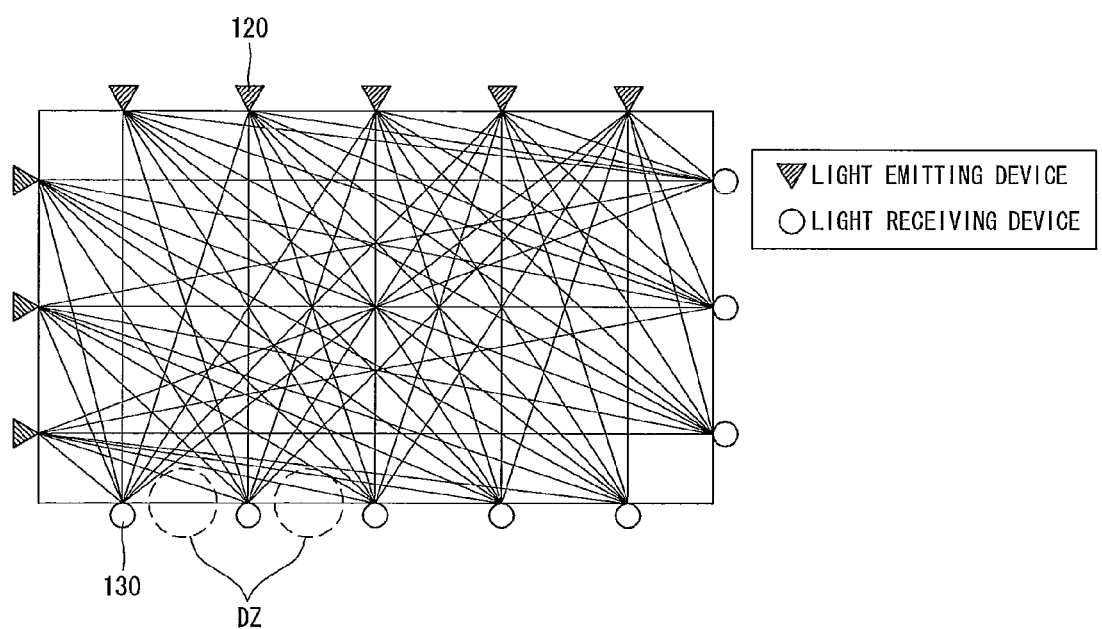

FIG. 10 illustrates an example in which the light emitting devices 120 are arranged next to each other in an arbitrary region of the substrate 100, while the light receiving devices 130 are arranged next to each other in another region thereof.

In this example, the light receiving devices 130, arranged in another region of the substrate 100, receive beams that are emitted from the light emitting devices 120 in the region of the substrate 100. It may be difficult to determine whether areas (DZ) between the light receiving devices 130 have been touched or not. As such, those areas difficult to determine whether they have been touched or not may be referred to as dead zones DZ.

Figure 11:
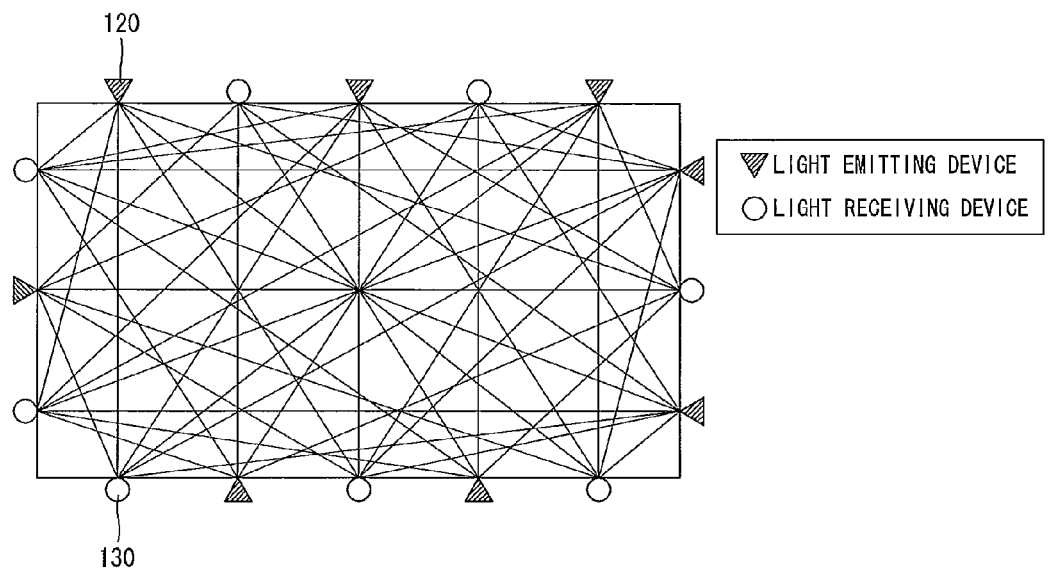

On the other hand, as shown in FIG. 11, when each one of the light emitting devices 120 is arranged between two arbitrary light receiving devices 130, the size of the dead zones DZ can be reduced. As a result, it is possible to enhance the accuracy of the touch panel.

In the touch panel according to this embodiment, it is possible to control a beam radiation angle of the light emitting device 120.

Figure 12:
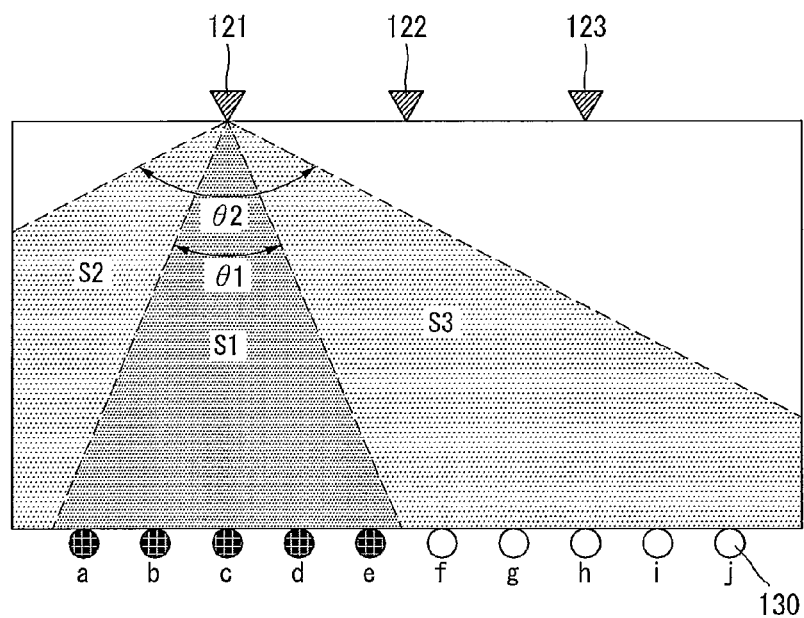

For example, as shown in FIG. 12, it is assumed that the first light emitting device 121 can substantially emit a beam at an angle of $\theta 2$.

In this case, the beam, emitted by the first light emitting device 121, may proceed to areas S1, S2, and S3. Correspondingly, light receiving devices 130, which range from a to j and are arranged in one area of the substrate 100, can receive the beam emitted by the first light emitting device 121.

Here, when the light receiving devices 130, indicated by c, (hereinafter, referred to as the "c light receiving device 130") is compared with the light receiving device 130, indicated by j, (hereinafter, referred to as the "j light receiving device 130") a distance between the j light receiving device 130 and the first light emitting device 121 is greater than a distance between the c light receiving device 130 and the first light emitting device 121. The sensitivity of the j light receiving device 130 with respect to the beam emitted by the first light emitting device 121 may be lower than that of the c light receiving device 130. Therefore, even when a touch is not made in the area S3, the j light receiving device 130 is more unlikely to receive the beam, emitted by the first light emitting device 121, than the c light receiving device 130. Therefore, even when the area S3 is not touched, it is recognized that a touch has been made in the area S3, and thus an erroneous operation of the touch panel may be caused.

On the other hand, in the touch panel according to this embodiment, the light receiving devices 130, ranging from a to j, fall within a range in which they may receive the light emitted by the first light emitting device 121. However, the light receiving devices 130, which ranges from f to j and have lower sensitivity to the beam, emitted by the first light emitting device 121, than the light receiving devices 130 ranging from a to e, may be turned off. That is, when the first light emitting device 121 is turned on, the light receiving devices 130, ranging from a to e, are activated, while the light receiving devices 130, ranging from f to j, are not activated. In other words, the radiation angle of the first light emitting device 121 may be control to have an angle $\theta 1$ that is smaller than the angle $\theta 2$.

Alternatively, some of the light receiving devices 130 among the plurality of light receiving devices 130, which are located within the range in which an arbitrary light emitting device 120 emits light, may be turned on, and others may be turned off.

For example, as shown in FIG. 2, the first light emitting device 121 may emit light at a radiation angle of θ2. In this case, the light receiving devices 130, ranging from a to j, may be located within the range in which the first light emitting device 121 emits light.

Here, the light receiving devices 130 ranging from a to e among the light receiving devices 130, which range from a to j and are located within the range in which the first light emitting device 121 emits light, are turned on, and the light receiving devices 130, ranging from f to j, may be turned off.

In other words, at least one light receiving device 130, which is located within the range in which the arbitrary light emitting device 120, located in a first area of the substrate, emits light, may be turned on. Here, the light receiving devices 130 corresponding to the arbitrary light emitting device 120, located in the first area of the substrate, may be located in a second area facing the first area of the substrate.

In addition, a distance between the first light emitting device 121, arranged in the first area of the substrate, and the light receiving devices 130, which are correspondingly activated and are arranged in the second area of the substrate, may be smaller than a distance between the first light emitting device 121 and the light receiving devices 130, which are not corresponding activated.

For example, in FIG. 12, a distance between the first light emitting device 121 and the light receiving devices 130, which range from a to e and are turned on according to the first light emitting device 121 among the light receiving devices 130, which range from a to j and are located in the second area of the substrate, may be smaller than a distance between the first light emitting device 121 and the rest light receiving devices 130, that is, the light receiving devices 130, which range from f to j and are turned off according to the first light emitting device 121.

That is, the light receiving devices 130, ranging from a to e, may be arranged closer to the first light emitting device 121 than to the light receiving devices 130, ranging from f to j.

In addition, a distance between the first light emitting device 121 and the c light receiving device 130 among the light receiving devices 130, ranging from a to e, may be smaller than a distance between the first light emitting device 121 and another light receiving devices 130. That is, the distance between the c light receiving device 130 and the first light emitting device 121 may be the shortest.

If the c light receiving device 130 alone is turned on according to the first light emitting device 121, it can be seen that one light receiving devices 130, which is the closet to the first light emitting device 121 among the plurality of light receiving devices 130, that is, the c light receiving device 130 alone is activated.

Alternatively, in order to more strongly prevent the malfunction of the touch panel, the light receiving devices 130, which is located in the middle of three arbitrary light receiving devices 130, which is arranged in a row, may be activated.

Figure 13:
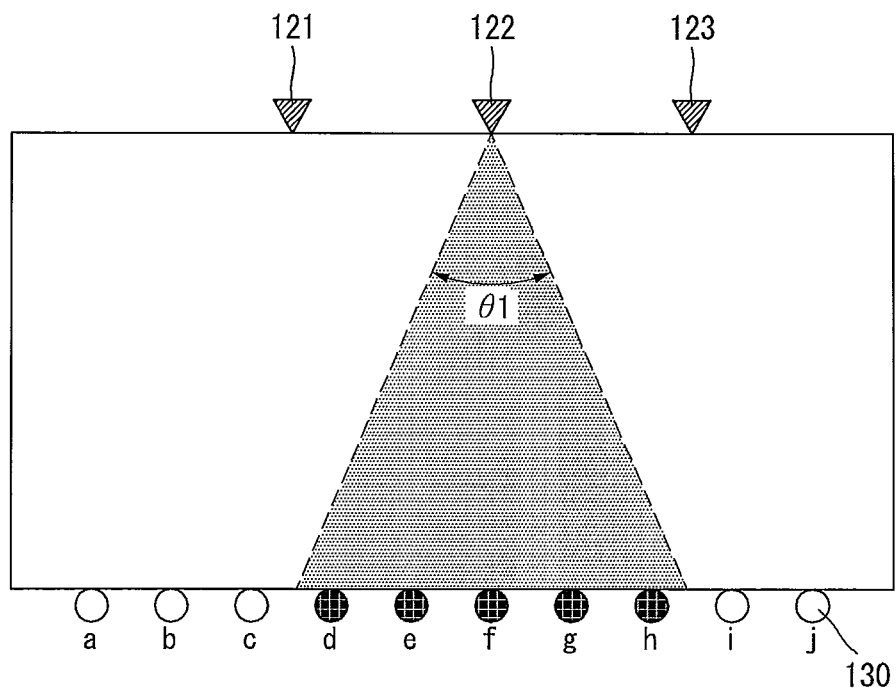

For example, as shown in FIG. 13, when a second light emitting device 120 emits light among the light emitting devices 120, among the light receiving devices 130, which range from a to j and are arranged in a row in an arbitrary area of the substrate 100, the light receiving devices 130, ranging from a to c, and light receiving device 130, indicated by i and j, may be turned off, while the light receiving devices 130, ranging from d to h, between the c light receiving device 130 and the i light receiving devices 130 may be turned on.

In other words, at least one light receiving devices 130, which is located within the range in which the arbitrary light emitting device 120 emits light, is turned on, while the light receiving devices 130, which does not fall within the range in which the arbitrary light emitting device 120 emits light, may be turned off.

In addition, in order to the efficiency of detecting a touch, at least light receiving devices 130, which are located within a range in which an arbitrary light emitting device 120 emits light, may be turned on. When at least three light receiving devices 130 are activated according to the one light emitting device 120, it is possible to easily detect a touch made by a relatively large object and a touch point of the relatively large object.

Figure 14:
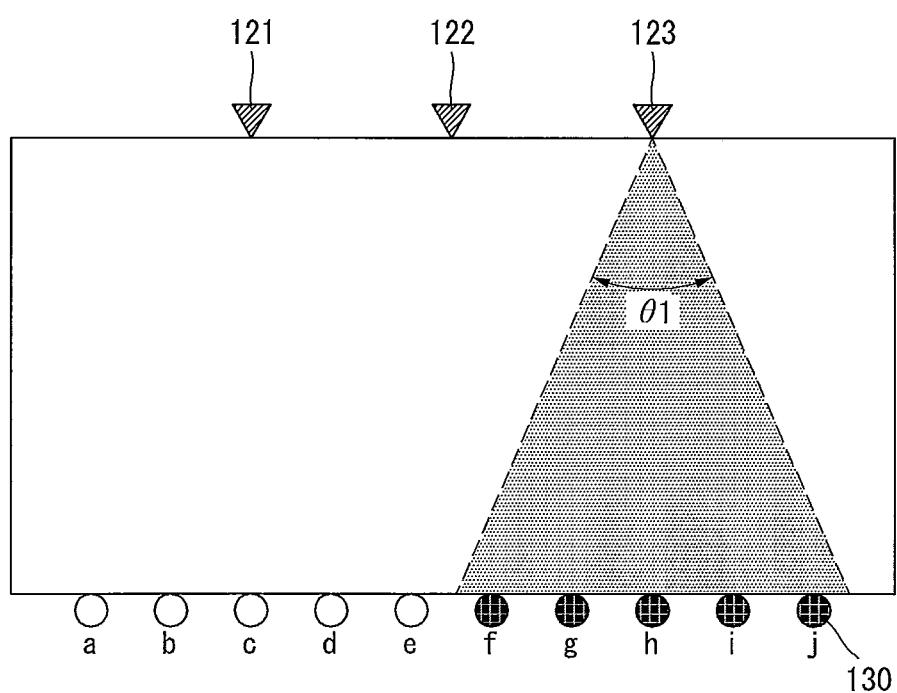

Since the case, shown in FIG. 14, is similar with that shown in FIG. 12, a detailed description thereof will be omitted.

The number of light receiving devices 130 that are activated according to one light emitting device 120 may vary.

Figure 15:
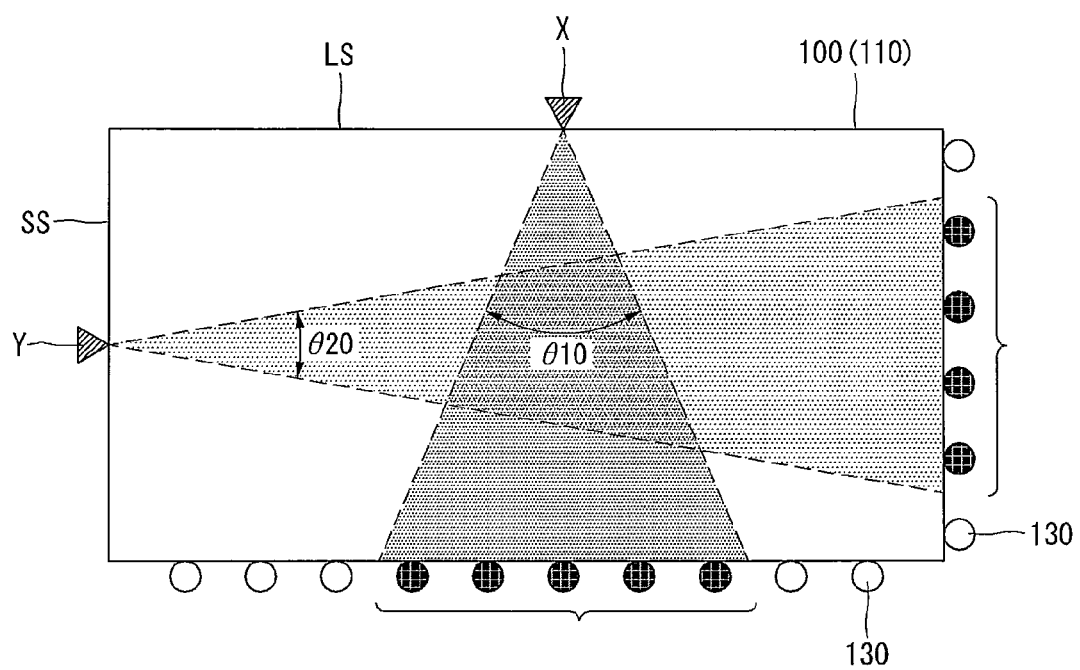

For example, as shown in FIG. 15, the number (five) of light receiving devices 130 that are turned on according to a first light emitting device X that is arranged on a long side LS of the substrate 100 may be different from the number (four) of light receiving devices 130 that are turned on according to a second light emitting device Y that is arranged on a short side of the substrate 100. The number of light receiving devices 130 that are turned on according to the first light emitting device X may be greater than the number of light receiving devices 130 that are turned on according to the second light emitting device Y.

Since the first light emitting device X is arranged on the long side LS of the substrate 100, as shown in FIG. 15, a distance between the first light emitting device X and the light receiving devices 130 that receive a beam, emitted by the first light emitting device X, is relatively smaller. On the other hand, since the second light emitting device Y is arranged on the short side SS of the substrate 100, a distance between the second light emitting device Y and the light receiving devices 130 that receive a beam, emitted by the second light emitting device Y, may be relatively larger.

For these reasons, even if a radiation angle θ10 of the first light emitting device X is set to be larger than a radiation angle θ20 of the second light emitting device Y, the sensitivity of each of the light receiving devices 130 with respect to the beam, emitted by the first light emitting device X, may not be reduced.

As such, it is possible to vary the number of light receiving devices 130 that are activated by controlling radiation angles of two arbitrary light emitting devices 120.

Figure 16A:
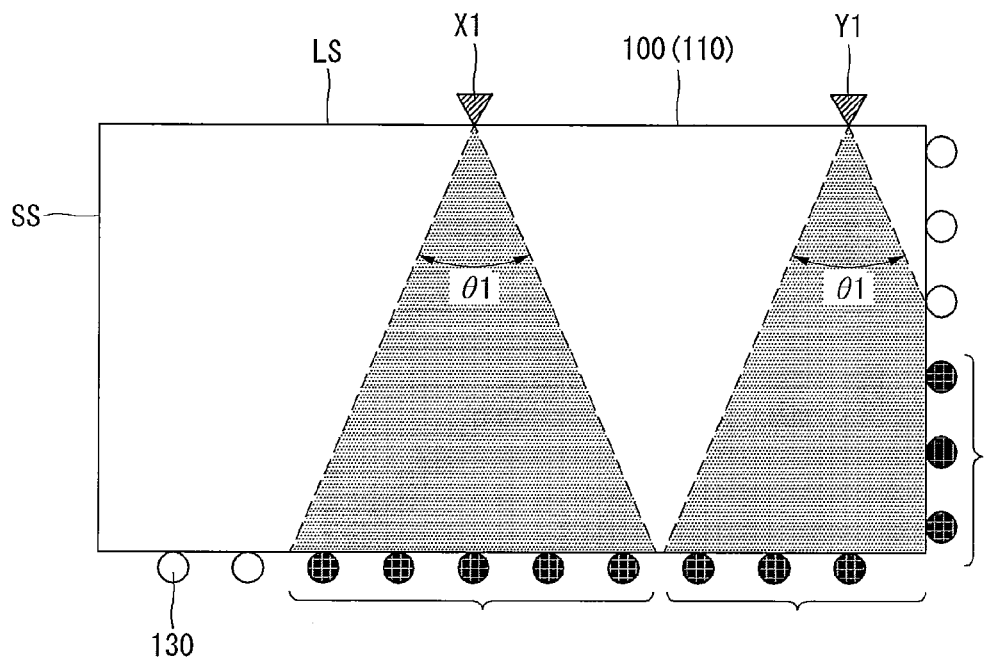
Figure 16B:
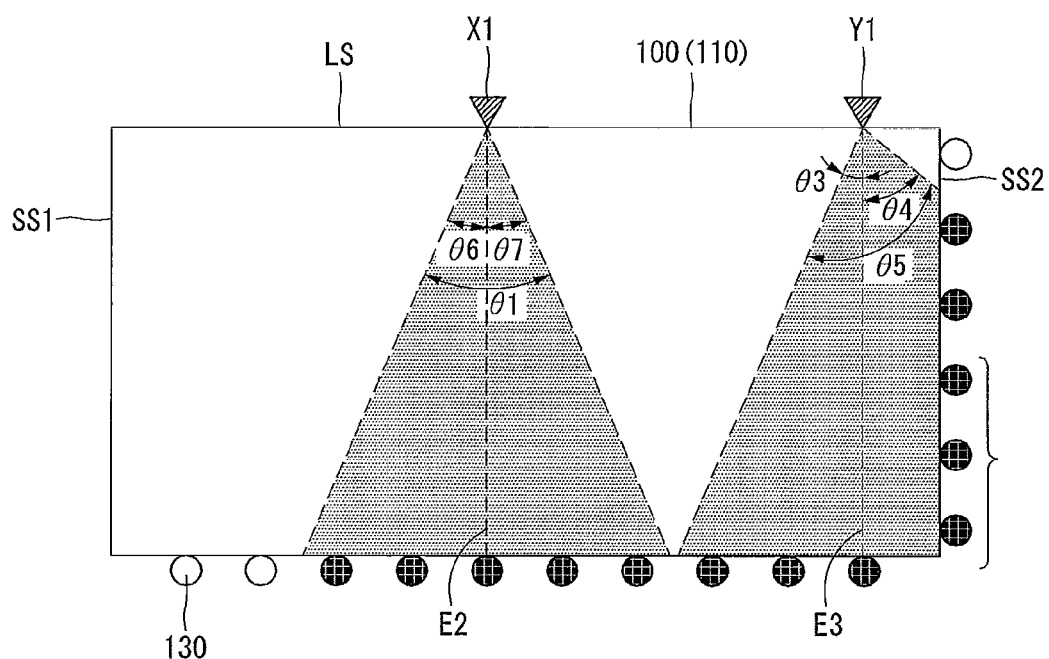

As shown in FIGS. 16A and 16B, it is also possible to vary the number of light receiving devices 130 without changing the radiation angle of the light emitting devices 120.

For example, it is possible to vary the number of light receiving devices 130 that are activated according to a first light emitting device X1 and a second light emitting device Y1 that are substantially arranged next to each other in the same area of the substrate 100.

The number of light receiving devices 130 that are turned on according to the second light emitting device Y1 that is arranged closer to the short side SS of the substrate 100 than the first light emitting device X1 may be greater than the number of light receiving devices 130 that are turned on according to the first light emitting device X1.

Since the second light emitting device Y1 is arranged closer to the short side SS of the substrate 100, a distance between the second light emitting device Y1 and the light receiving devices 130, which are arranged on the short side SS of the substrate 100, is relatively smaller than a distance between the first light emitting device X1 and the light receiving devices 130.

Therefore, even when the radiation angle θ1 of the first light emitting device X1 is substantially the same as the radiation angle θ1 of the second light emitting device Y1, the number of light receiving devices 130 that are turned on according to the second light emitting device Y1 may become larger.

Alternatively, as shown in FIG. 16B, a radiation angle θ5 of the second light emitting device Y1 that is arranged closer to the short side SS of the substrate 100 than the first light emitting device X1 may be greater than the radiation angle θ1 of the first light emitting device X1.

More specifically, since the second light emitting device Y1 is arranged closer to the short side SS of the substrate 100, and thus, a distance between the second light emitting device Y1 and the light receiving devices 130, arranged on the short side SS of the substrate 100, is relatively smaller than a distance between the first light emitting device X1 and the light receiving devices 130. Therefore, a radiation angle θ4 in a direction of the short side SS of the substrate 100 to which the second light emitting device Y1 is adjacent may be greater as compared with the first light emitting device X1.

When an extension line E2 of the first light emitting device X1 is set to a direction perpendicular to the long side LS of the substrate 100, if it is assumed that the first light emitting device X1 has a radiation angle of θ6 in a direction from the extension line E2 toward a first short side SS1 of the substrate 100, and the first light emitting device X1 has a radiation angle of θ7 in a direction from the extension line E2 toward a second short side SS2 of the substrate 100, the sum of θ6 and θ7 may be equal to the total radiation angle θ1 of the first light emitting device X1.

In addition, when an extension line E3 of the second light emitting device Y1 is set to a direction perpendicular to the long side LS of the substrate 100, if it is assumed that the second light emitting device Y1 has a radiation angle of θ3 in a direction from the extension line E3 toward the first short side SS1 of the substrate 100, and the second light emitting device Y1 has a radiation angle of θ4 in a direction from the extension line E3 to the second short side SS2 of the substrate 100, the sum of θ3 and θ4 may be equal to the total radiation angle θ5 of the second light emitting device Y1.

Here, the radiation angle of θ3 may be substantially the same as the radiation angle of θ6. On the other hand, the radiation angle of θ4 may be greater than the radiation angle of θ7.

As such, even when the radiation angle of θ4 may be greater than the radiation angle of θ7, since the second light emitting device Y1 is arranged closer to the second short side SS2 of the substrate 100, a distance between the second light emitting device Y1 and the light receiving devices 130 arranged on the second short side SS2 of the substrate 100 is relatively smaller as compared with the first light emitting device X1. Therefore, the sensitivity of the light receiving devices 130, arranged on the second short side SS2 of the substrate 100, to the second light emitting device Y1 may be sufficiently high.

As shown in FIG. 16B, the second light emitting device Y1 may be located around the edge or at the end of the first area of the substrate. On the other hand, the first light emitting device X1 may be located in the center of the first area of the substrate as compared with the second light emitting device Y1. If this is considered, the first light emitting device X1 may be referred to as a center light emitting device, and the second light emitting device Y1 may be referred to as an edge light emitting device.

As such, the number of light receiving devices 130 that are turned on according to the second light emitting device Y1 that is located around the edge or at the end of the first area of the substrate may be different from the number of light receiving devices 130 that are turned on according to the first light emitting device X1 that is located at the center of the first area thereof.

For example, as shown in FIG. 16B, 8 light receiving devices 130 are turned on according to the second light emitting device Y1, while 5 light receiving devices 130 are turned on according to the first light emitting device X1.

In addition, as shown in FIG. 16B, the radiation angle θ5 of the second light emitting device Y1 may be greater than the radiation angle θ1 of the first light emitting device X1.

The control of the radiation angle of the light emitting device 120 as described above may be automatically performed according to the intensity of beam that is detected by each of the light receiving devices 130 with respect to the arbitrary light emitting device 120. For example, in a radiation angle control mode, while the arbitrary light emitting device 120 is turned on, all the light receiving devices 130 may be turned on in a sequential manner or at the same time, the intensity of the beam that is received by each of the light receiving devices 130 can be measured.

As a result of measurement, the intensity of the beam that a light receiving device 130 has received is lower than a predetermined threshold may be set not to be activated according to the light emitting device 120. By using this method, the radiation angle of each of the light emitting devices 120 does not need to be manually controlled by hand.

In order to increases reliability in detection of a touch position, a radiation angle of one light emitting device 120 may be set to a range from approximately 30% to 95% of the maximum radiation angle.

In order to the size of a dead zone, the light receiving devices 130 may be located farther than the light emitting devices 120.

Figure 17:
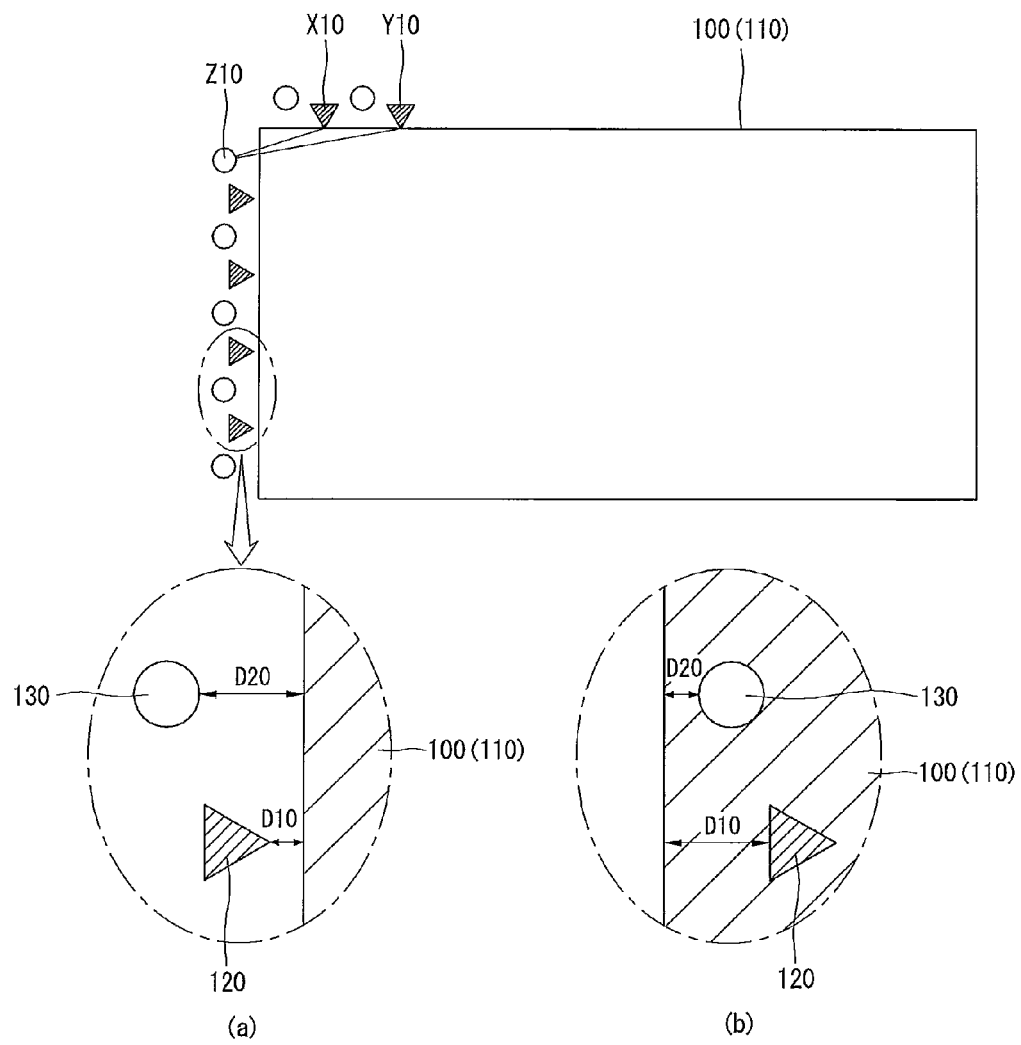

For example, as shown in FIG. 17, the light receiving devices 130 are located farther from the center of the substrate 100 than the light emitting devices 120. Then, a first light receiving devices Z10 can effectively receive beams emitted from first and second light emitting devices X10 and Y10 that are located around the edge of the substrate 100, thereby reducing dead zones.

To this end, a distance between the end of the substrate 100 and the light receiving devices 130 may be different from a distance between the end of the substrate 100 and the light emitting devices 120.

For example, as shown in (a) of FIG. 13, when the light emitting device 120 and the light receiving device 130 are located outside the substrate 100, a shortest distance D20 between the substrate 100 and the light receiving device 130 may be greater than a shortest distance D10 between the end of the substrate 100 and the light emitting device 120. Alternatively, as shown in (b) of FIG. 13, when the light emitting device 120 and the light receiving device 130 overlap the substrate 100, a shortest distance D20 between the end of the substrate 100 and the light receiving device 130 may be smaller than a shortest distance D10) between the end of the substrate 100 and the light emitting devices 120.

FIGS. 18 through 30 are diagrams illustrating a touch panel according to another exemplary embodiment of the invention. A description of what has been described above will be omitted.

Figure 18:
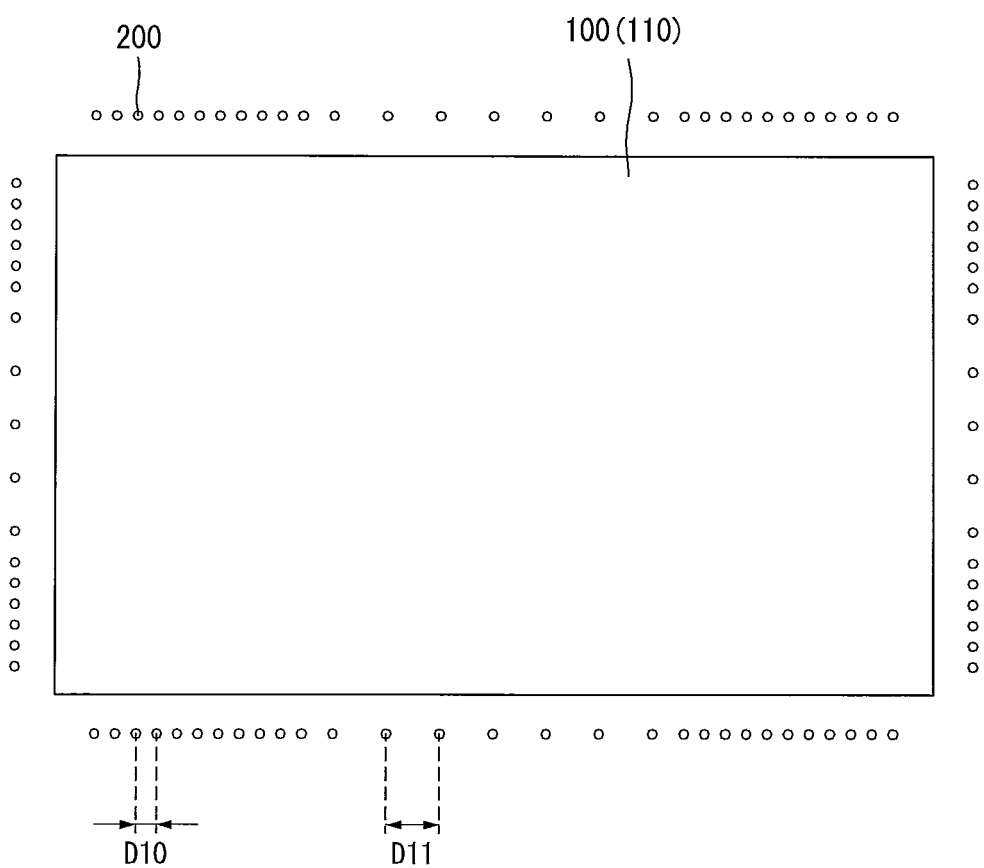
FIGS. 18 through 30 are diagrams illustrating a touch panel according to another embodiment of the present invention in detail.

With reference to FIG. 18, the density of optical devices 200 that are arranged on the substrate 100 may be changed according to the position of the substrate 100. Preferably, a distance between two optical devices 200 that are adjacent to each other may get smaller toward the edge of the substrate 100. That is, the optical devices 200 may be more densely arranged toward the corners of the substrate 100.

For example, a distance D11 between two optical devices 200 that are adjacent to each other in the central area of the substrate 100 may be greater than a distance D10 between two optical devices 200 that are adjacent to each other at the corners of the substrate 100.

Here, the distance between the optical devices 200 adjacent to each other may refer to a distance between two light emitting devices 120 adjacent to each other, a distance between two light receiving devices 130 adjacent to each other, and a distance between the light emitting device 120 and the light receiving device 130 adjacent to each other.

Figure 19:
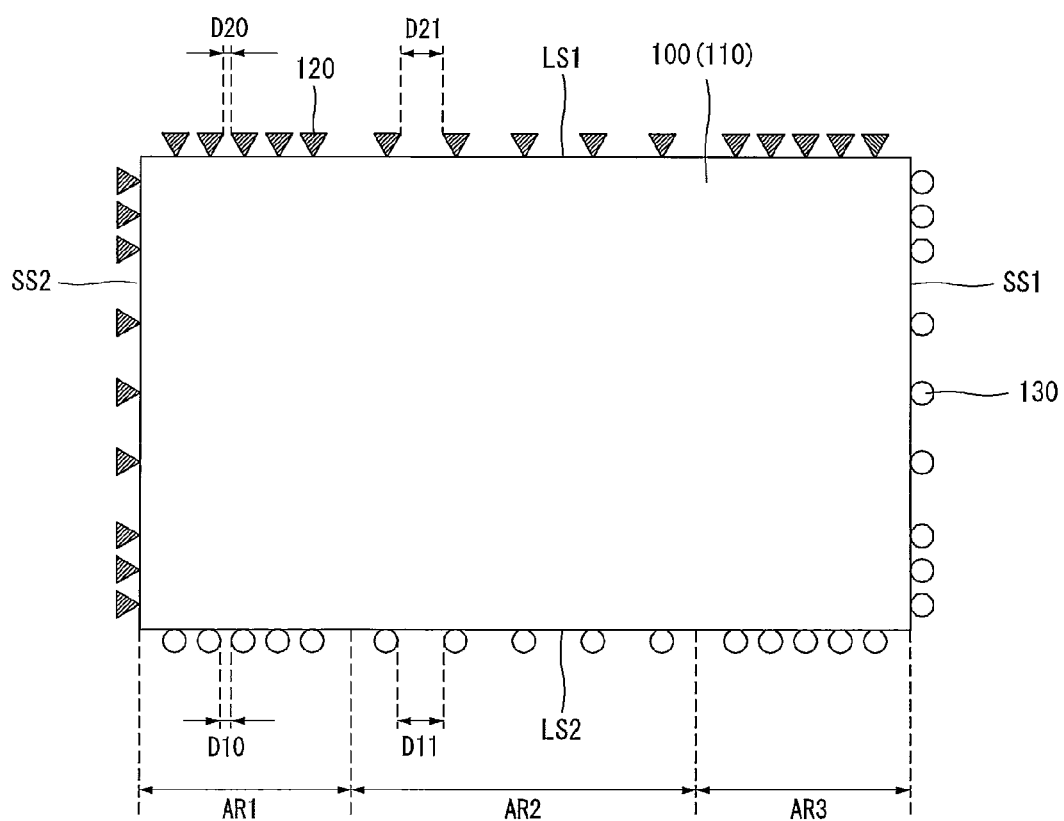

For example, as shown in FIG. 19, it is assumed that a plurality of light emitting devices 120 are arranged on a first long side LS1 and a second short side SS2 of the substrate 100 and a plurality of light receiving devices 130 are arranged on a second long side LS2 and a first short side SS1 of the substrate 100.

In this case, a distance D11 between light receiving devices 130 that are adjacent to each other in a second area AR2 of the second long side LS2 of the substrate 100 may be greater than a distance D10 between two light receiving devices 130 that are adjacent to each other in a first area AR1 or a third area AR3 that is located farther from the center thereof than the second area AR2.

In addition, a distance D21 between two light emitting devices 120 that are adjacent to each other in the second area AR2 of the first long side LS1 of the substrate 100 may be greater than a distance D20 between two light emitting devices 120 that are adjacent to each other in the first area AR1 and the third area AR3 that is located farther from the center thereof than the second area AR2.

Figure 20:
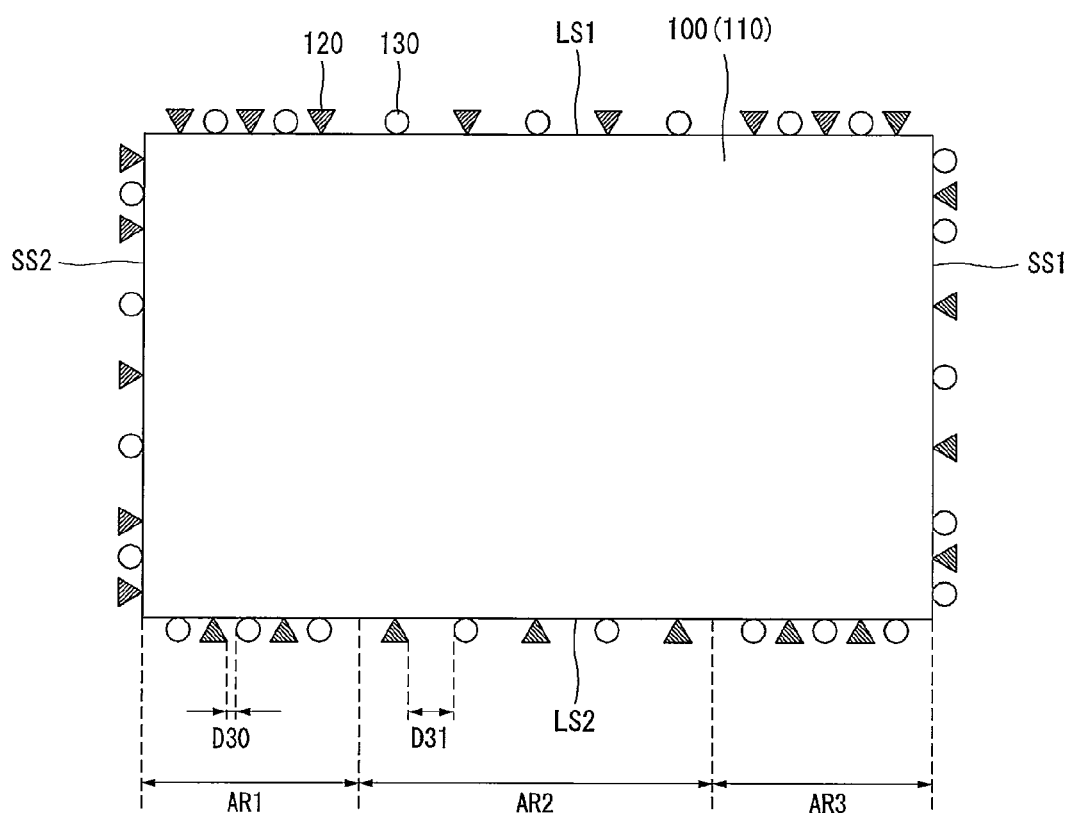

Alternatively, as shown in FIG. 20, it is assumed that a plurality of light receiving devices 130 and a plurality of light emitting devices 120 are arranged on each of the first long side LS1, the second short side SS2, the second long side LS2, and the first short side SS1 of the substrate 100.

In this case, a distance D31 between the light emitting device 120 and the light receiving device 130 that are adjacent to each other in the second area AR2 of the substrate 100 may be greater than a distance D30 between the light emitting device 120 and the light receiving device 130 that are adjacent to each other in the first area AR1 and the third area AR3 that is located closer to the edges thereof than the second area AR2.

A distance between two optical devices 200 may gradually decrease towards the corner of the substrate 100.

Figure 21:
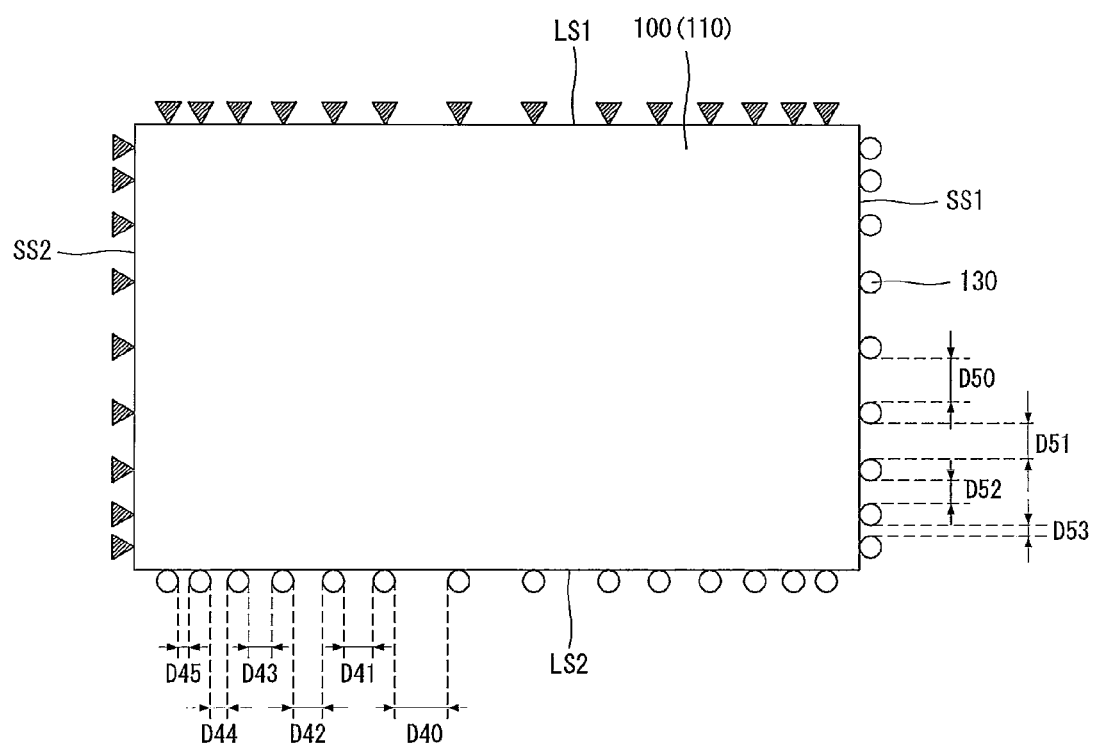

For example, as in the case of FIG. 21, a distance between two light receiving devices 130 adjacent to each other may gradually decrease in order of D40, D41, D42, D43, D44, and D45 as it gets farther from the center of the long side LS2 of the substrate 100.

In this embodiment, the description has been made to a case in which the long sides LS1 and LS2 of the substrate 100 are virtually divided into the areas AR1, AR2, and AR3. This method can be applied to the short sides SS1 and SS2 of the substrate 100. That is, as it gets farther from the center of the first short side SS2, a distance between two light receiving devices 130 that are adjacent to each other in the first short side SS2 of the substrate 100 may gradually decrease in order of D50, D51, D52, and D53.

In addition, the description has been made to a case in which a predetermined side, that is, each of the long sides LS1 and LS2 of the substrate 100 is divided into that is, three areas, and a distance between optical devices 200 adjacent to each other in each area is set. However, a predetermined side of the substrate 100 may be divided into more than four areas, and a distance between optical devices 200 adjacent to each other in each area may vary.

In the present invention, it is set such that the distance between the optical devices 200 gradually decreases as it gets farther from the center of each of the sides LS1, LS2, SS1, and SS2 of the substrate 100. Distances between approximately three optical devices 200 that are located at the outermost edge of each side may be half or less than half of a distance between optical devices 200 that are arranged in the very centre of or next to the substrate 100 or the central area (AR1) or an average distance between optical devices 200.

As such, when the distance between the two optical devices 200 is reduced towards the corners of the substrate 100, the size of a dead zone at the corners of the substrate 100 can be reduced.

Figure 22:
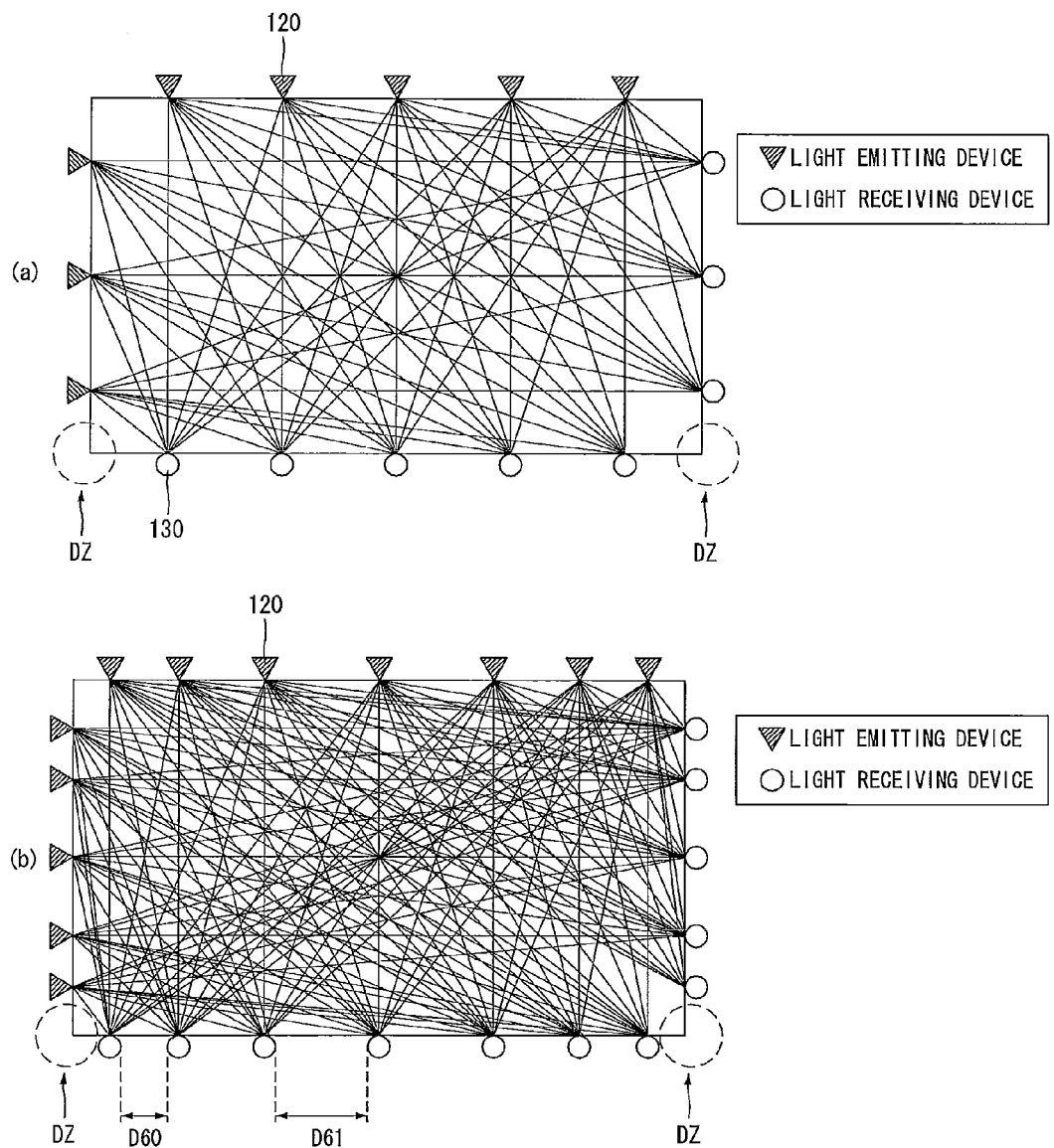

For example, as shown in (A) of FIG. 22, when the optical devices 200 are separated at substantially regular intervals regardless of where they are located on the substrate 100, dead zones DZ may be created at the corners of the substrate 100.

On the other hand, as shown in (B) of FIG. 22, when a distance between two optical devices 200 decreases toward the edges of the substrate 100, the size of dead zones can be reduced.

Figure 23:
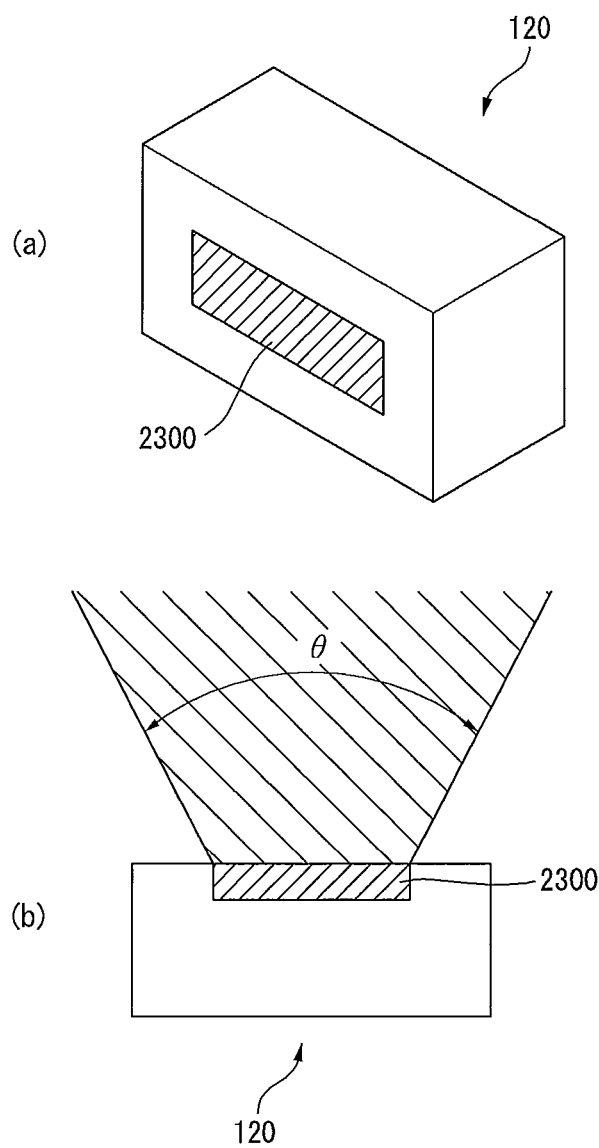

Referring to FIG. 23, as indicated by (A), the light emitting device 120 may include a light emitting surface 2300. As shown in (B) of FIG. 23, predetermined light can be emitted through the light emitting surface 2300 at a predetermined radiation angle.

A direction in which the light emitting surface 2300 of the light emitting devices 120 directs may be referred to as a light emitting direction of the light emitting devices 120.

Figure 24:
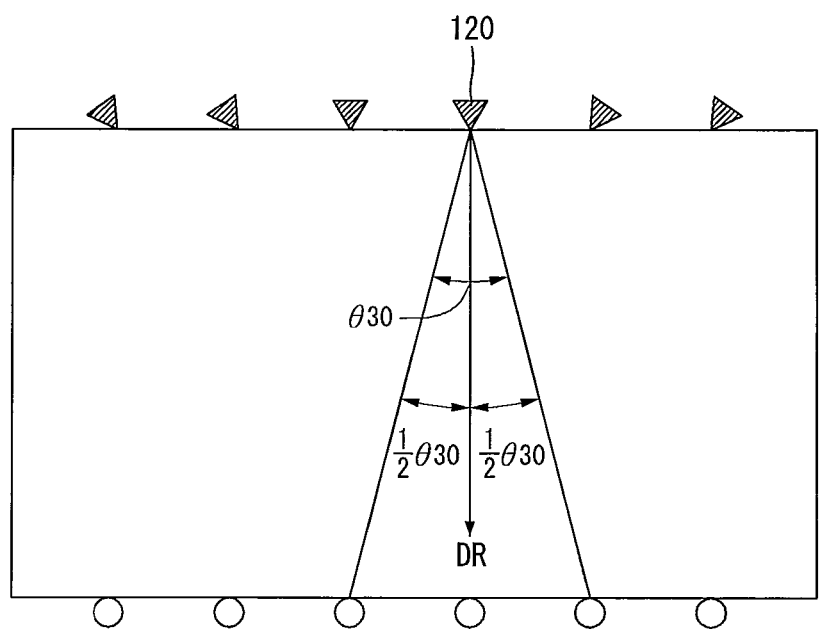

In addition, as shown in FIG. 24, when the light emitting device 120 emits light at a radiation angle of θ30, the light emitting direction of the light emitting device 120 may mean an angle of θ30/2 from the center of a light emitting range of the light emitting device 120, that is, both ends of the light emitting range. In FIG. 24, the light emitting direction of the light emitting device 120 is indicated by DR.

At least one light emitting direction among the plurality of light emitting devices 120 may be different from at least one light emitting direction among the rest light emitting device 120. In other words, a direction to which at least one light emitting surface 2300 directs among the plurality of light emitting devices 120 may be different from a direction to which at least one light emitting surface 2300 faces among the rest light emitting devices 120.

Figure 25:
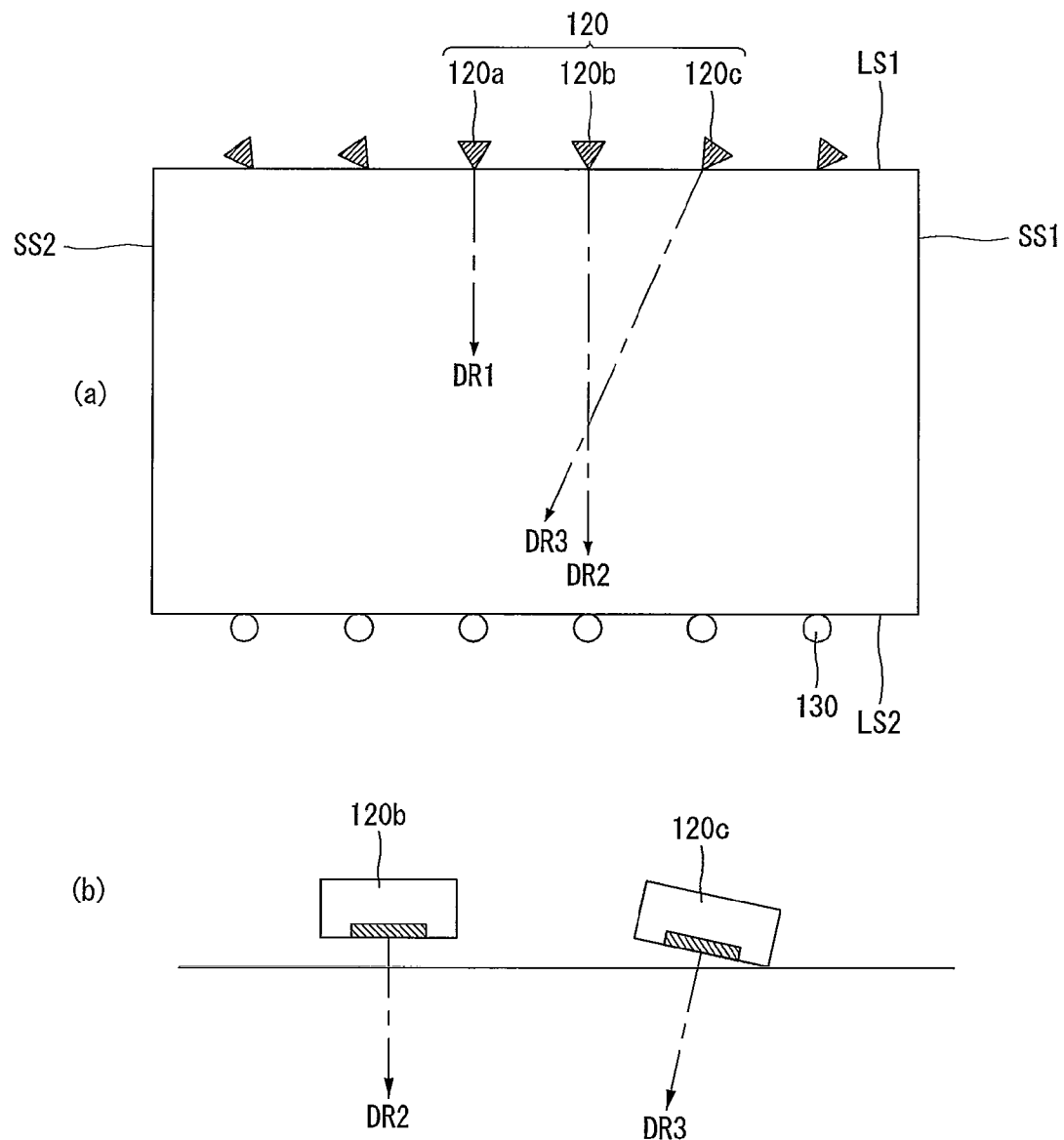

For example, as shown in (A) of FIG. 25, light emitting directions DR1 and DR2 of a first light emitting device 120a and a second light emitting device 120b among the plurality of light emitting devices 120, that directions to which light emitting surfaces 2300 thereof direct may be substantially the same. On the other hand, a light emitting direction DR3 of a third light emitting devices 120c among the light emitting devices 120 may be different from the light emitting directions of the first light emitting device 120a and the second light emitting device 120b.

As shown in (B) of FIG. 25, the direction DR2 to which the light emitting surface 2300 of the second light emitting device 120b directs is different from the direction DR3 to which the light emitting surface 2300 of the third light emitting devices 120c directs.

As such, when light emitting directions of two light emitting devices 120 that are selected among the plurality of light emitting devices 120, that is, directions to which light emitting surfaces 2300 direct are different each other, the size of dead zones can be reduced. In addition, it is possible to increase the efficiency of light that is emitted by the light emitting devices 120.

Figure 26:
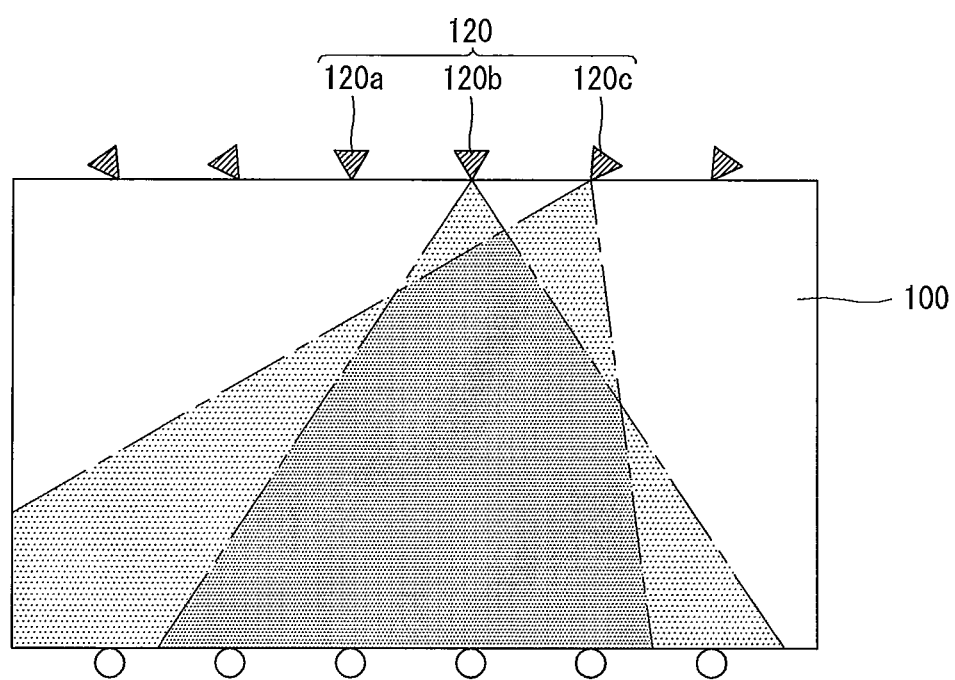

For example, as shown in FIG. 26, among a first light emitting device 120a, a second light emitting device 120b, and a third light emitting devices 120c, when a light emitting direction of the third light emitting devices 120c that is located relatively farther from the center of the substrate 100 is inclined toward the center of the substrate 100, it is possible to sufficiently use the light emitted by the third light emitting devices 120c, thereby increasing luminous efficiency.

In addition, in order to improve luminous efficiency, a direction to which the light emitting surface 2300 of the light emitting device 120 that is located farther from the center of the substrate 100 may be controlled to face the central area of the substrate 100.

Figure 27:
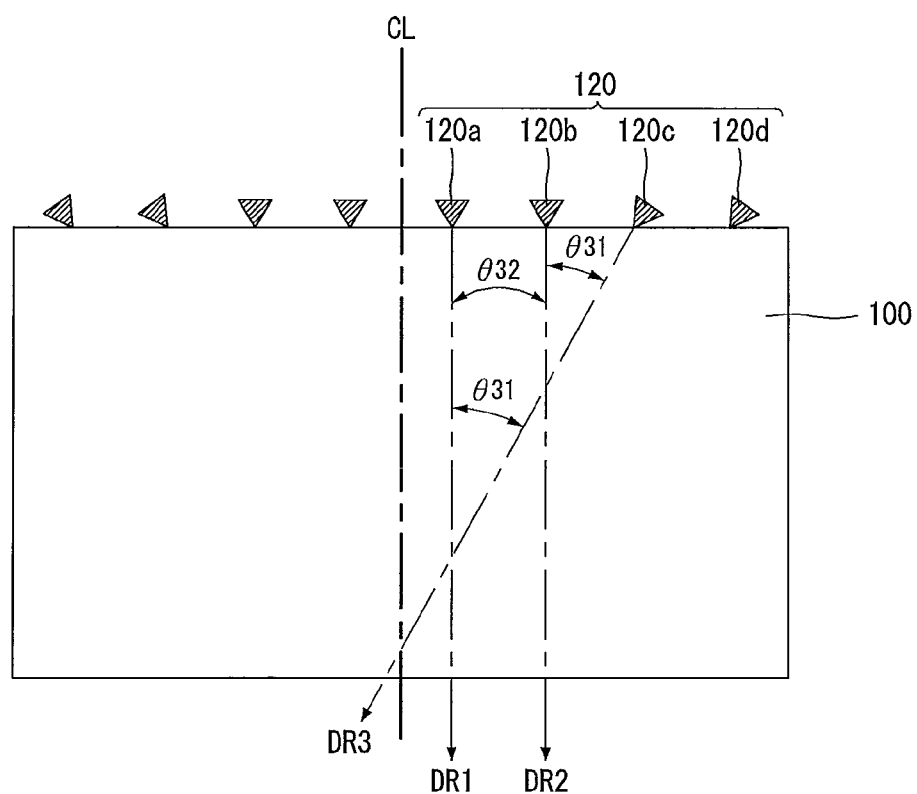

For example, as shown in FIG. 27, it is assumed that on the basis of a straight line that passes through the center of the substrate 100 and is perpendicular to a predetermined side of the substrate 100, that is, a center line CL, first, second, third, and fourth light emitting devices 120a, 120b, 102c, and 120d are arranged at the right side of the center line CL. More specifically, the first light emitting device 120a is arranged closer to the center of the substrate 100 than the second light emitting device 120b. In other words, the first light emitting device 120a is arranged closer to the center line CL of the substrate 100 than the second light emitting device 120b. In addition, the second light emitting device 120b may be arranged closer to the center of the substrate 100 than the third light emitting devices 120c.

In this case, an angle θ31 between a direction DR1 to which the light emitting surface 2300 of the first light emitting device 120a directs and a direction DR3 to which the light emitting surface 2300 of the third light emitting devices 120c directs may be greater than an angle θ32 between a direction DR1 to which the light emitting surface 2300 of the first light emitting device 120a directs and a direction DR2 to which the light emitting surface 2300 of the second light emitting device 120b directs. That is, as compared with the first and second light emitting devices 120a and 120b, the light emitting direction of the third light emitting devices 120c is inclined toward the center line CL of the substrate 100.

Here, the angle θ32 between the direction DR1 to which the light emitting surface 2300 of the first light emitting device 120a directs and the direction DR2 to which the light emitting surface 2300 of the second light emitting device 120b directs may be substantially zero degree. That is, the direction DR1 to which the light emitting surface 2300 of the first light emitting device 120a directs and the direction DR2 to which the light emitting surface 2300 of the second light emitting device 120b directs may be substantially parallel with each other. In this case, the angle θ31 between the direction DR1 to which the light emitting surface 2300 of the first light emitting device 120a directs and the direction DR3 to which the light emitting surface 2300 of the third light emitting devices 120c directs may be substantially the same as the angle θ32 between the direction DR1 to which the light emitting surface 2300 of the first light emitting device 120a directs and the direction DR2 to which the light emitting surface 2300 of the second light emitting device 120b directs.

Figure 28:
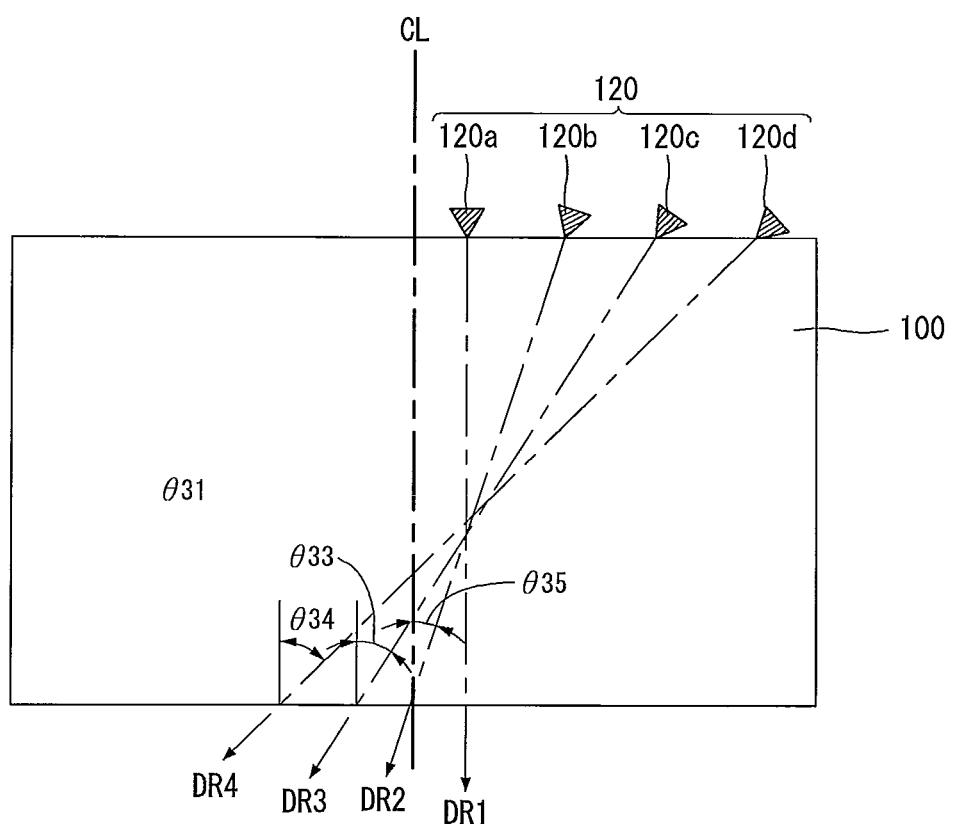
Figure 29:
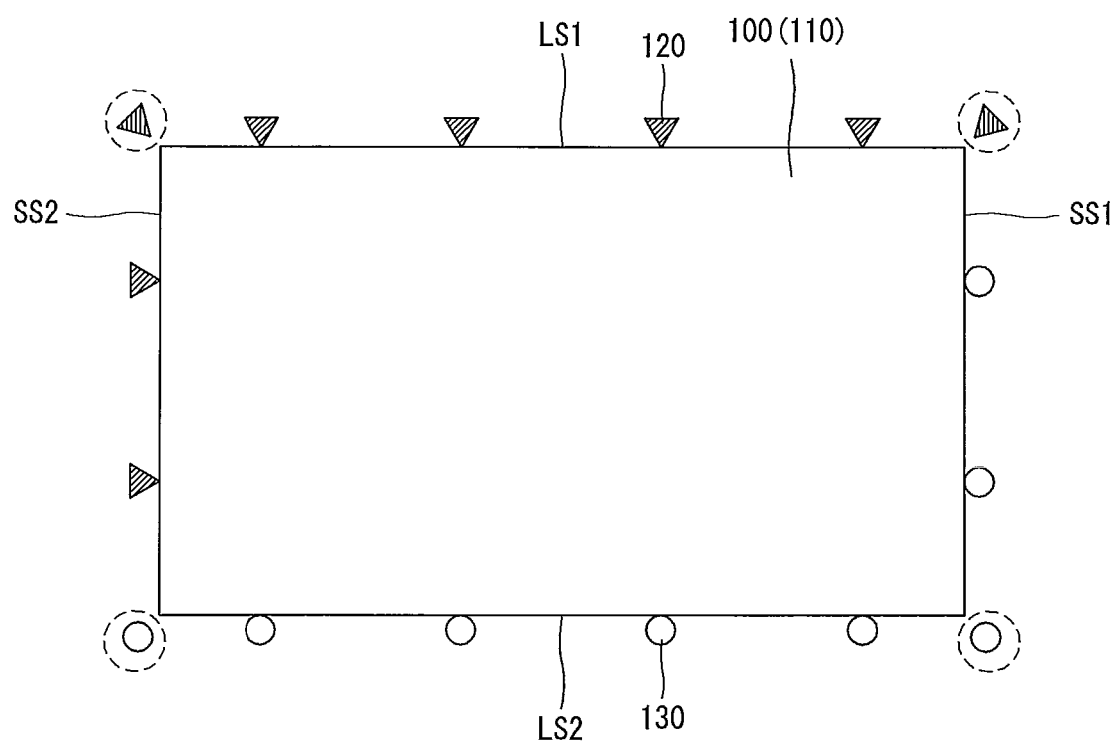

Alternatively, as shown in FIG. 28, on the basis of the center line CL passing through the center of the substrate 100, as it gets farther from the center line CL, an angle between the center line CL and the light emitting direction of the light emitting device 120 may gradually increase. Referring to FIG. 28, an angle θ35 between the center line CL and the direction DR2 to which the light emitting surface 2300 of the second light emitting device 120b directs may be greater than an angle (0 degree) between the center line CL and the direction DR1 to which the light emitting surface 2300 of the first light emitting device 120a directs. An angle θ33 between the center line CL and the direction DR3 to which the light emitting surface 2300 of the third light emitting devices 120c directs may be greater than an angle θ35 between the center line CL and the direction DR2 to which the light emitting surface 2300 of the second light emitting device 120b directs. In addition, an angle θ34 between the center line CL and a direction DR4 to which a light emitting surface 2300 of a fourth light emitting device 120d directs may be greater than the angle θ33 between the center line CL and the direction DR3 to which the light emitting surface 2300 of the third light emitting devices 120c directs.

A direction to which a light emitting surface 2300 of a light emitting device that is located at the outermost edge of the substrate 100 may be rotated by approximately 1° toward the center of the substrate.

In addition, the description has been made to the light emitting devices 120 that are located on the first long side LS1. The same method may be applied to the light emitting devices 120 that are located on the second short side SS2. In addition, the light receiving devices 130 corresponding to the light emitting devices 120 may be arranged symmetrically with respect to the light emitting devices.

At least one optical device 200 may be arranged at the corner of the substrate 100. For example, as indicated by dashed line in FIG. 29, the light emitting device 120 may be arranged at least one corner of the substrate 100, and the light receiving devices 130 may be arranged at the other corners thereof.

In this case, it is possible to reduce the size of dead zones at the corners of the substrate 100.

Figure 30:
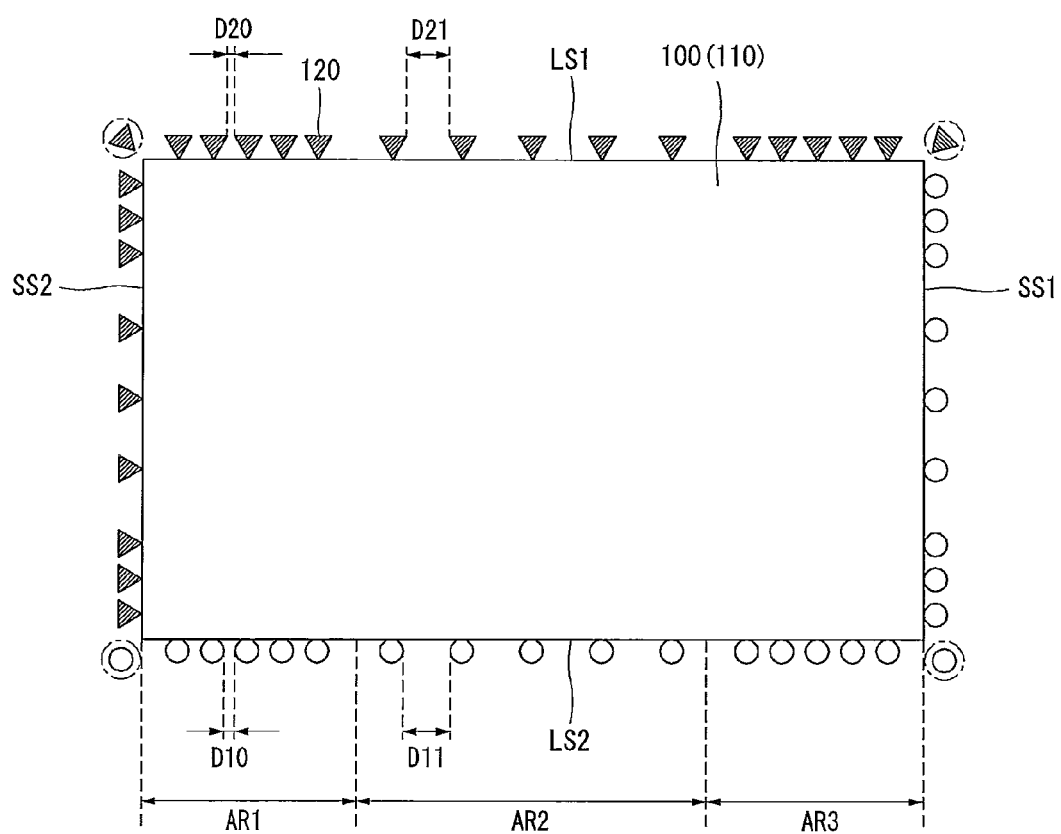

In addition, in order to reduce the size of dead zones at the corners of the substrate 100, as shown in FIG. 30, while at least one optical device 200 is arranged at the corners of the substrate 100, a distance between two optical devices 200, adjacent to each other, can gradually decrease toward the corner of the substrate 100.

FIGS. 31A, 31B, and 32 through 37 are diagrams illustrating a display apparatus having a touch panel according to an embodiment of the present invention. A description of what has been described above will be omitted. Hereinafter, various types of display panels, such as a plasma display panel (PDP) and a liquid crystal display panel (LCD), may be used as a display panel 1801.

Figure 31A:
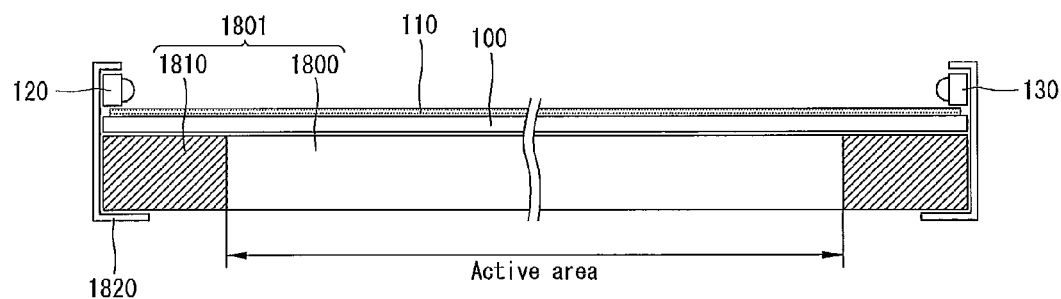
FIGS. 31A and 31B, and 32 through 37 are diagrams illustrating a display apparatus having a touch panel according to another embodiment of the present invention.

Referring to FIG. 31A, the substrate 100 may be arranged on a front surface of the display panel 1801, and the plurality of light emitting devices 120 and light receiving devices 130 may be arranged around the edges of the substrate 100. That is, the substrate 100 having light emitting devices 120 and the light receiving devices 130 arranged thereon is provided on the front surface of the display panel 1801.

The positions where the plurality of light emitting devices 120 and the light receiving devices 130 are arranged may correspond to edges of an active area 1800 on which an image of the display panel 1801 is displayed.

In this case, a protection cover 1820 that is arranged outside the light emitting devices 120 and the light receiving devices 130 may cover side surfaces of the substrate 100 and the display panel 1801. In addition, the protection cover 1820 may also be used as a fixing unit to fix the substrate 100 and the display panel 1801.

Figure 31B:
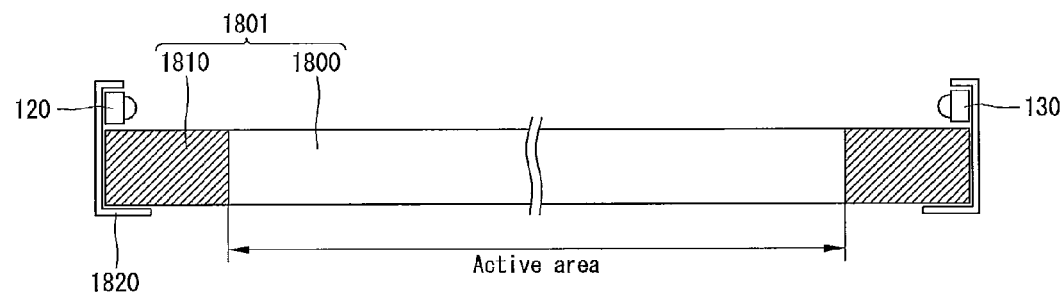

Alternatively, as shown in FIG. 31B, the substrate 100 may be removed, and the plurality of light emitting devices 120 and the plurality of light receiving devices 130 may be arranged around the edges of the display panel 1801.

The light emitting devices 120 and the light receiving devices 130 may be arranged in a dummy area 1810 outside the active area 1800 on which an image of the display panel 1801 is displayed. For example, as shown in 31B, the light emitting devices 120 and the light receiving devices 130 may be arranged in the dummy area 1810 outside the active area 1800 of the display panel 1800. Here, a dummy area is indicated by reference numeral 1810, which may refer to a bezel area of the display panel.

In this case, the display panel 1801 replaces the substrate 100.

The configuration of a touch panel that is used in this display apparatus is substantially the same as the configuration which has been described in detail with reference to FIGS. 1 through 30. Thus, a detailed description thereof will be omitted.

Figure 32:
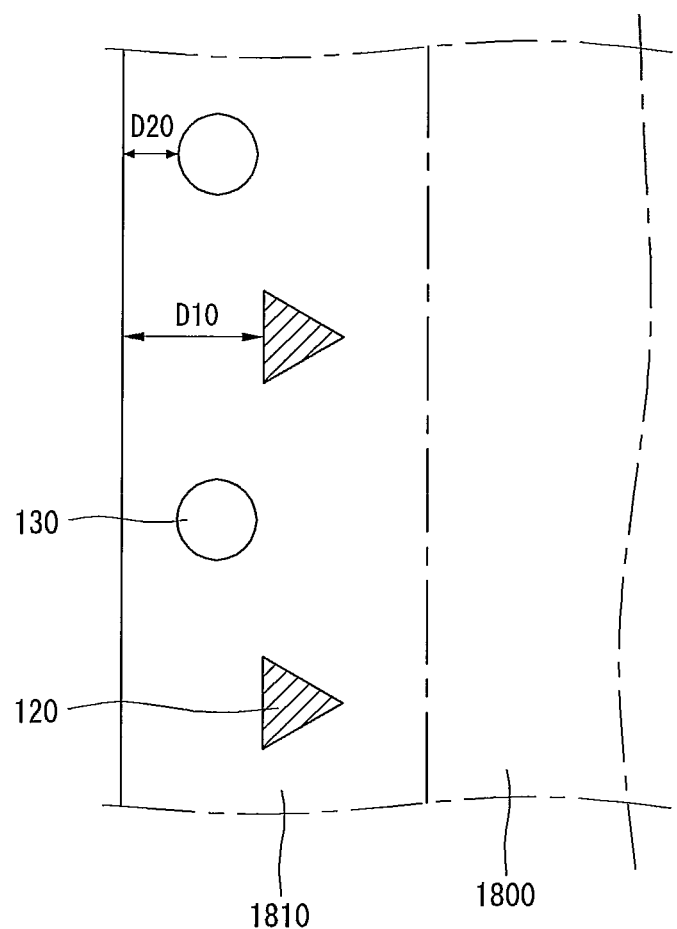

Like the case as shown in FIG. 17, in the display apparatus, as shown in FIGS. 31A and 31B, the light receiving devices 130 may be located further back than the light emitting devices 120. To this end, as shown in FIG. 32, a shortest distance D20 between the end of the display panel 1801, that is, the end of the dummy area 1810 and the light receiving device 130 may be smaller than a shortest distance D10 between the end of the display panel 1801 and the light emitting device 120.

As such, in order to locate the light receiving devices 130 farther from the center of the display panel 1801, a PCB may be arranged on the protection cover 1820. When the PCB is arranged on the protection cover 1820, provided to cover the side surfaces of the display panel 1801, the light receiving devices 130 can be substantially arranged at the end of the display panel 1801.

Here, the PCB may be a board having flexibility, for example, a flexible PCB. In addition, the PCB may connect a controller (not shown) to the light receiving devices 130 and the light emitting devices 120.

Figure 33:
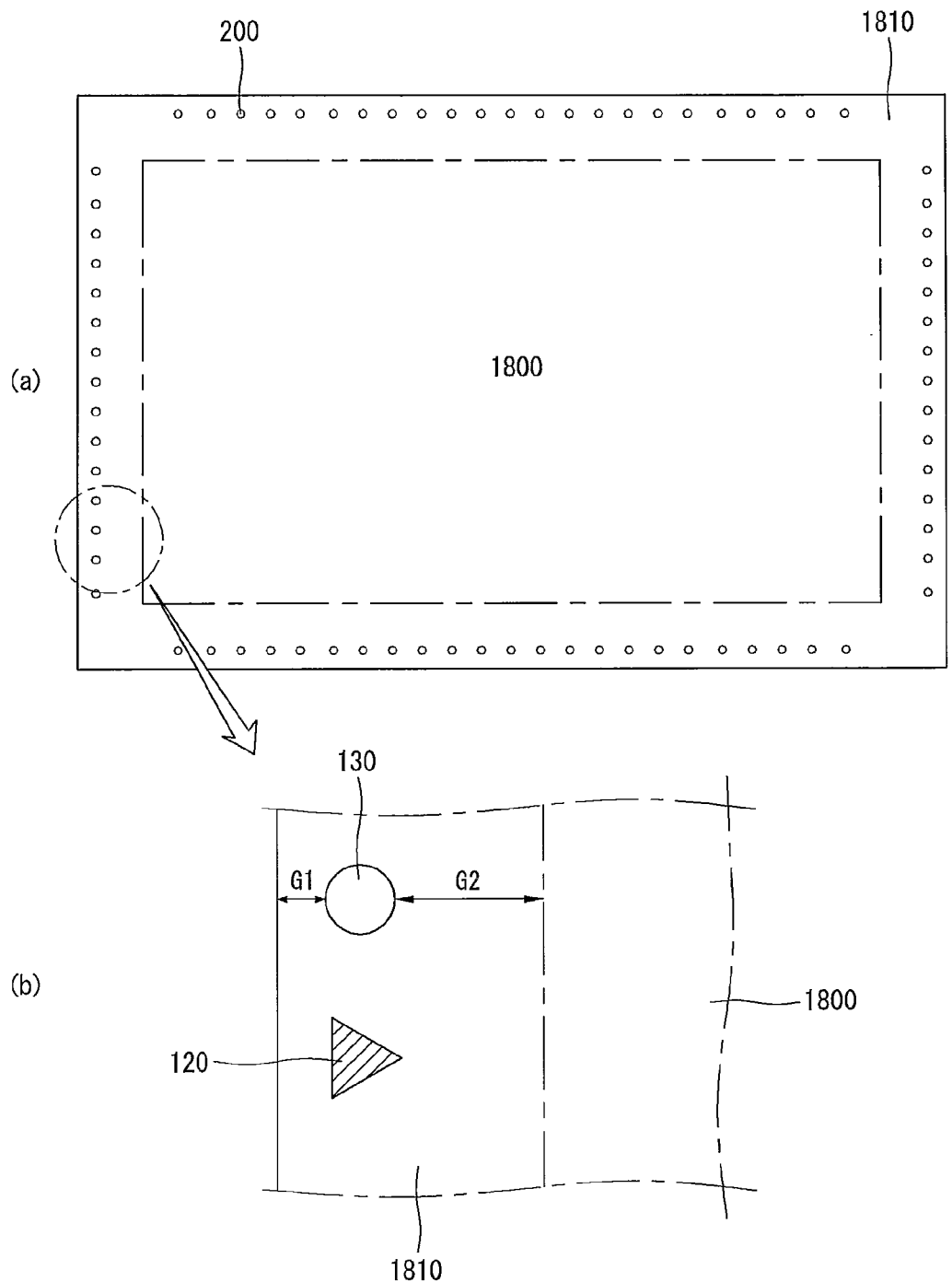

Alternatively, as shown in FIG. 33, the optical devices 200, arranged in the dummy area 1810 of the display panel 1801, may be arranged close to the end of the dummy area 1810. For example, as shown in (B) of FIG. 33, a distance G1 between the end of the dummy area 1810 and the optical device 200 may be smaller than a distance G2 between the optical device 200 and an active area AA. Here, the optical device 200 may be at least one of the light emitting device 120 and the light receiving device 130.

In this case, it is possible to reduce the size of dead zones.

Figure 34:
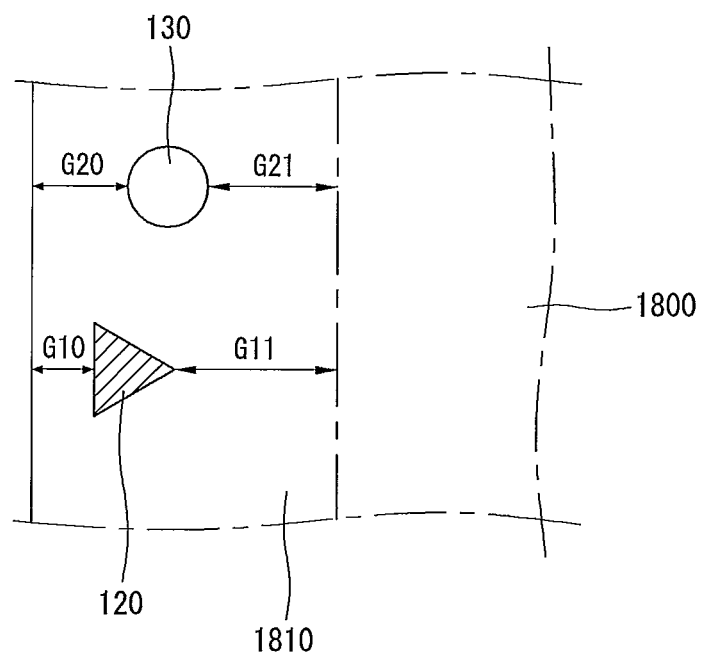
Figure 35:
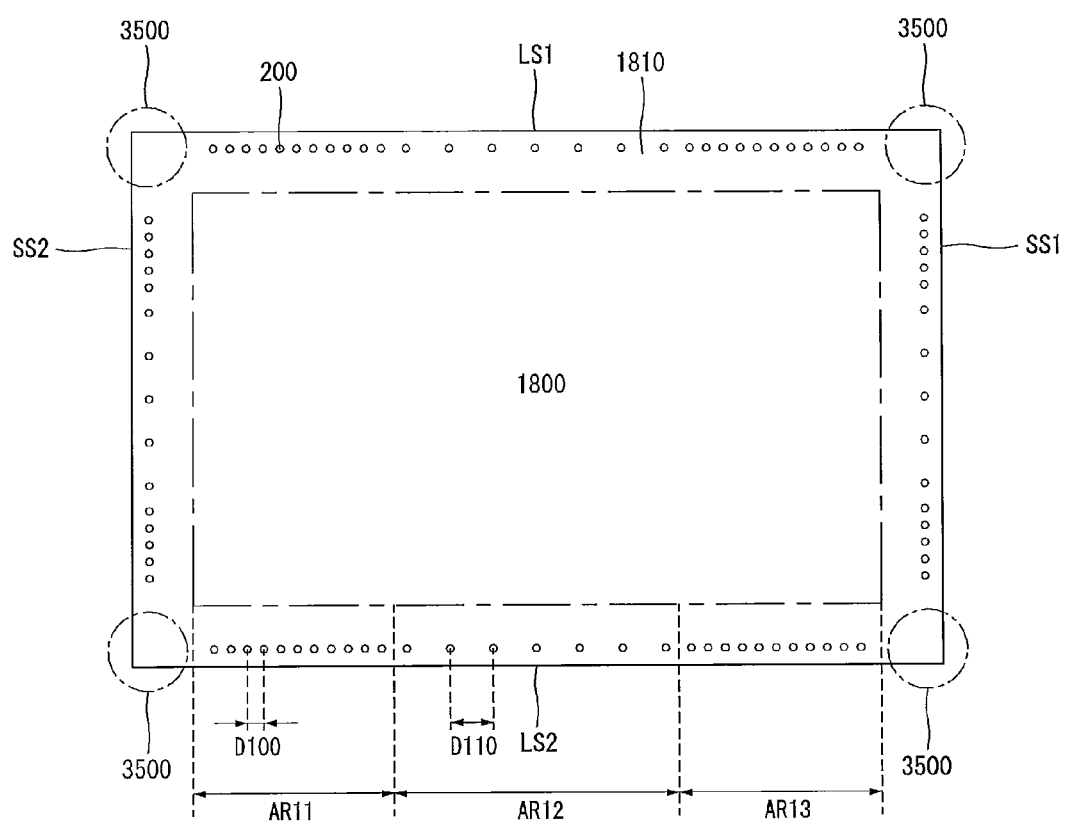

Alternatively, while the light emitting devices 120 and the light receiving devices 130, which are arranged in the dummy area 1810 of the display panel 1801, are arranged close to the end of the dummy area 1810, the light emitting devices 120 may be closer to the end of the dummy area 1810 than the light receiving devices 130. For example, as shown in FIG. 34, a distance G10 between the end of the dummy area 1810 and the light emitting device 120 may be smaller than a distance G11 between the light emitting device 120 and the active area AA, and a distance G20 between the end of the dummy area 1810 and the light receiving device 130 may be smaller than a distance G21 between the light receiving device 130 and the active area AA. Here, the distance G10 between the end of the dummy area 1810 and the light emitting device 120 may be smaller than the distance G20 between the end of the dummy area 1810 and the light receiving device 130. In this case, since light, emitted by the light emitting device 120, can spread more widely, the luminous efficiency of the light emitting device 120 can be improved, and also, it is possible to reduce the size of dead zones in an area adjacent to the light emitting device 120.

As such, even when the optical devices 200, arranged in the dummy area 1810 of the display panel 1801, is arranged adjacent to the end of the dummy area 1810, a distance between two optical devices 200 adjacent to each other in the dummy area 1810 can decrease towards the corner of the display panel 1801. For example, a distance D110 between two light emitting devices 120 adjacent to each other in a twelfth area AR12 of a first long side LS1 of the display panel 1801 may be greater than a distance D100 between two light emitting devices 120 adjacent to each other in an eleventh area AR11 or a thirteenth area AR13 that is located farther from the center than the twelfth area AR12.

In this case, the distance between the two optical devices 200 adjacent to each other decreases toward corners 3500 of the dummy area 1810. In other words, the number of optical devices 200 per unit distance in a first part (AR11 and AR13) adjacent to the corners 3500 of the dummy area 1810 may be regarded to be greater than the number of optical devices 200 per unit distance in a second part (AR12) located further from the corners 3500 than the first part.

The method of reducing the distance between the two optical devices 200 adjacent to each other towards the corner of the display panel 1801 can be inferred from the detailed description with reference to FIGS. 18 through 22. Thus, a detailed description thereof will be omitted.

Figure 36:
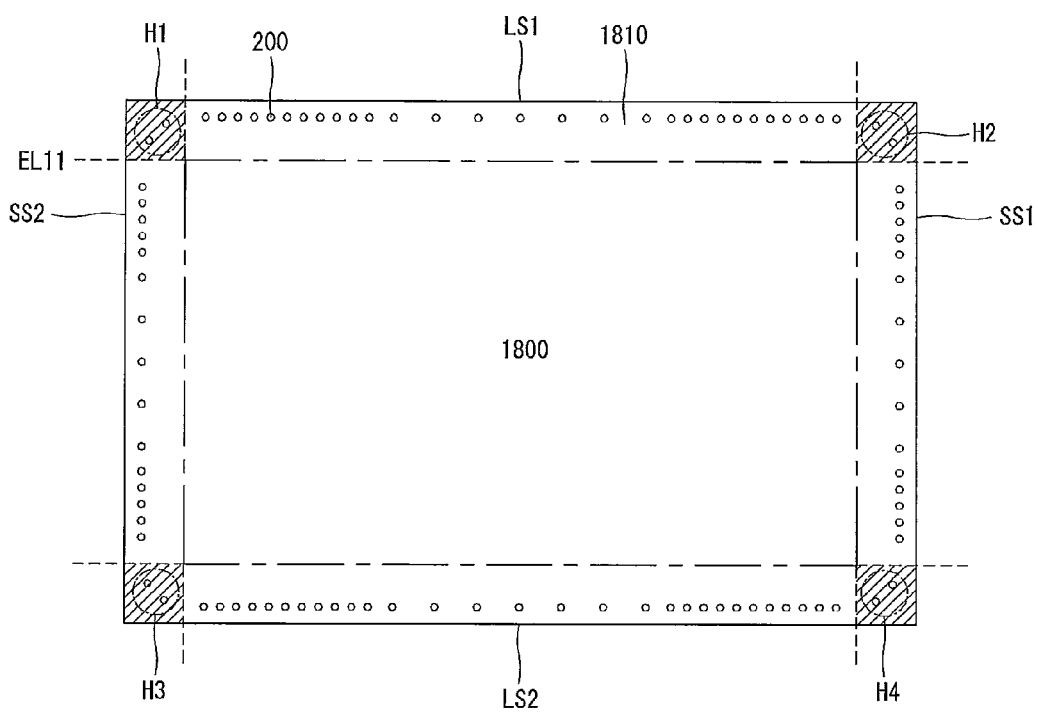

Alternatively, as shown in FIG. 36, at least one optical device 200 may be arranged at the corner of the dummy area 1810. In FIG. 36, optical devices 200 that are arranged at the corners of the dummy area 1810 are indicated by H1 to H4.

Here, the optical devices 200, which are arranged at the corners of the dummy area 1810, may not overlap the active area 1800 in a direction parallel with short sides SS1 and SS2 of the active area 1800 and long sides LS1 and LS2 of the active area 1800. Specifically, the optical devices 200, which are arranged at the corners of the dummy area 1810, may not meet an extension line EL10 of the short sides SS1 and SS2 of the active area 1800 and an extension line EL11 of the long sides LS1 and LS2 of the active area 1800.

In addition, the optical devices 200, arranged at the corners of the dummy area 1810, can be arranged closer to the active area 1800 than other optical devices 200. Here, the optical devices 200, arranged at the corners of the dummy area 1810, have been described in detail with reference to FIG. 36.

Figure 37:
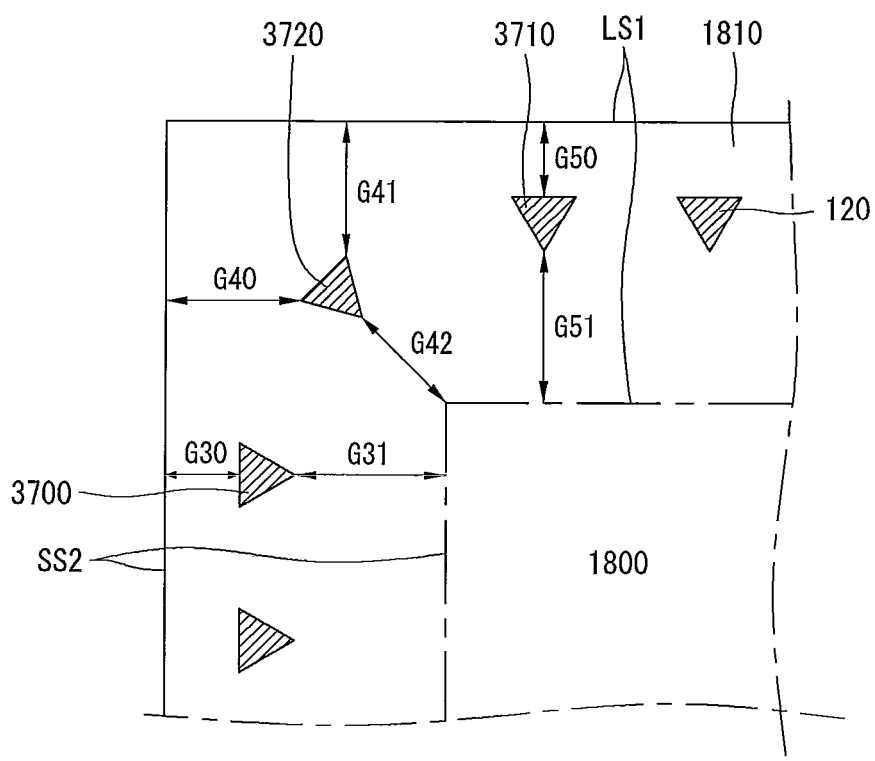

For example, as shown in FIG. 37, a distance G42 between the active area 1800 and an optical device 3720 that is arranged at the corner of the dummy area 1810 may be smaller than distances G31 and G51 between optical devices 3700 and 3710 and the active area 1800.

In addition, distances G40 and G41 between the end of the dummy area 1810 and the optical device 3720, arranged at the corner of the dummy area 1810, may be greater than distances G30 and G50 between the optical devices 3700 and 3710 and the end of the dummy area 1810. Specifically, a distance G40 between the optical device 3720, arranged at the corner of the dummy area 1810, and the second short side SS2 of the dummy area 1810 may be greater than a distance G30 between the optical device 3700 overlapping the active area 1800 in a direction of the long side LS of the dummy area 1810 and the second short side SS2 of the dummy area 1810.

In addition, a distance G41 between the optical device 3720, arranged at the corner of the dummy area 1810 and the first long side LS1 of the dummy area 1810 may be greater than a distance G50 between the optical device 3710 overlapping the active area 1800 in a direction of the short side SS of the dummy area 1810.

In addition, the distances G31 and G51 may be different from each other, and the distances G30 and G50 may be different from each other.

FIGS. 38 through 42 are diagrams illustrating a method of driving a touch panel according to another embodiment of the present invention.

Figure 38:
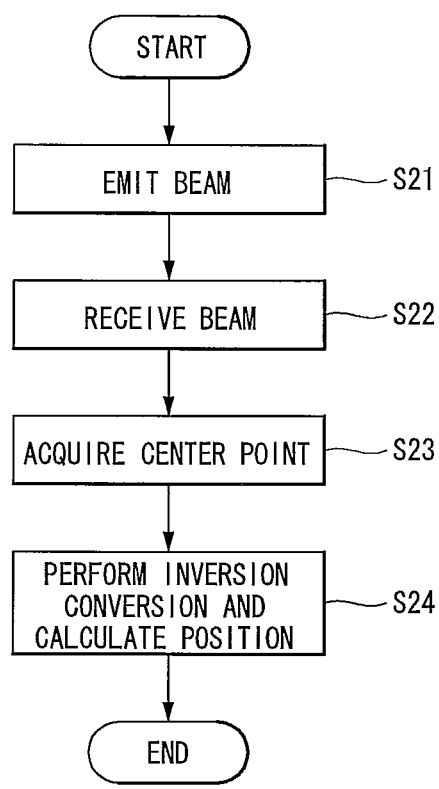
FIGS. 38, 39A and 39B, and 40 through 42 are diagrams illustrating a method of driving a touch panel according to another embodiment of the present invention in detail.

Referring to FIG. 38, according to a method of driving a touch panel according to this embodiment, a plurality of light emitting devices X10 through X40 are turned on in a sequential manner to thereby emit beams in operation S21, and a plurality of light receiving devices Z1 through Z4 are turned on to thereby receive the beams having been emitted by the light emitting devices X10 through X40 in operation S22.

Then, the positions of the light emitting devices X10 through X40 and detection data in association with light receiving data of the plurality of light receiving devices Z1 through Z4, which are turned on according to the individual light emitting devices, are converted using a mathematical conversion method to thereby center points of the detection data in operation S23.

Then, data on the center points are inversely converted to thereby calculate a touch position in operation S24.

Figure 39A:
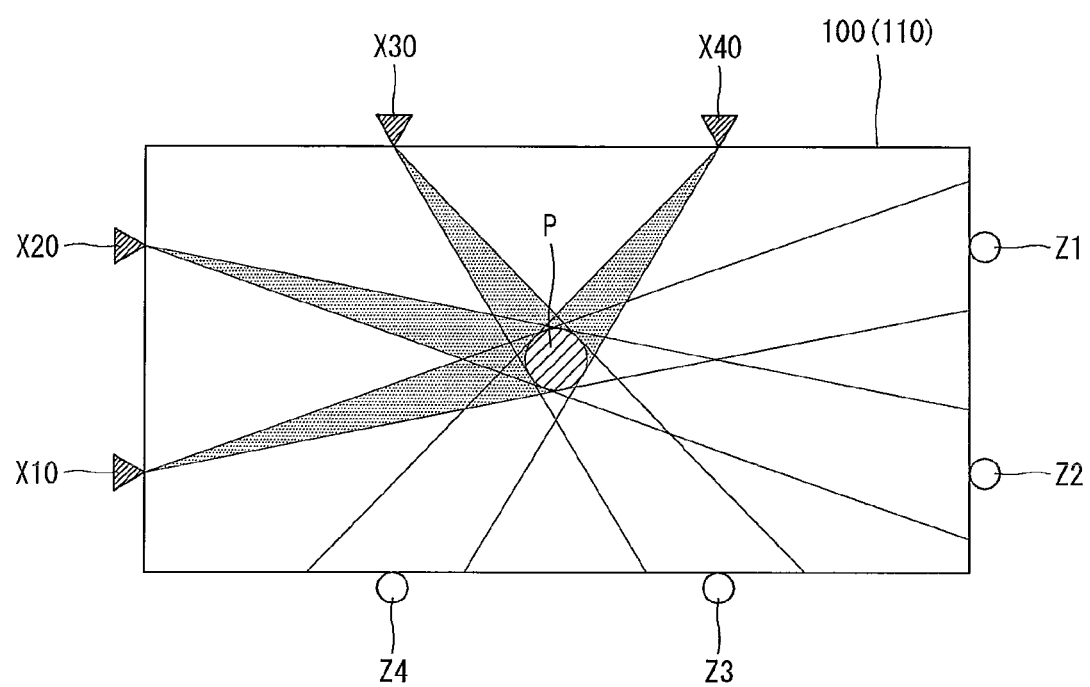

Here, the detection data includes the position of a light emitting device being turned on and the position of a light receiving device that fails to detect light from the light emitting device among a plurality of light receiving devices being turned on according to the light emitting device. For example, as shown in FIG. 39A, when the first light emitting device X10 is turned on, a first light receiving device Z1 does not receive light emitted from the first light emitting device X10 due to an input unit that is located at a point P. Therefore, detection data includes data on rectangular coordinates corresponding to (X10, Z1). In the same manner, as shown in 39A, the detection data includes data on rectangular coordinates corresponding to (X10, Z1), (X20, Z2), (X30, Z3), and (X40, Z4).

Here, in the operation in which the plurality of light receiving devices Z1 through Z4 receive beams, as described above in detail, when each of the light emitting devices X10 through X40 is turned on, the plurality of light receiving devices may be turned on and the other light receiving devices may be turned off. This has been described in detail, and thus a detailed description thereof will be omitted.

In the touch panel according to this embodiment, in order to prevent an erroneous operation of the light receiving devices Z1 through Z4 caused by light externally incident thereon or light emitted from a display panel, a driving signal whose frequency or amplification is controlled may be used.

For example, as shown in 39B, the fourth light emitting device X40 among the plurality of light emitting devices X10 through X40 may be turned on according to a plurality of driving signals DS during a first period time P1. Specifically, the fourth light emitting device X40 is turned on when the driving signal DS are supplied during the first period time P1 to thereby emit a beam, while the fourth light emitting device X40 is turned off between two driving signals DS and does not emit a beam. That is, the fourth light emitting device X40 has a light emission period TP and a light emission duration TH.

At this time, the light receiving devices Z1 through Z4 perform sampling according to a sampling rate based on the light emission period TP and the light emission duration TH of fourth light emitting device X40, and sense light reception when receiving light corresponding to the pattern of the light emission period TP and the light emission duration TH of fourth light emitting device X40. Specifically, when the fourth light emitting device X40 has a light emission period TP of 2 ms and a light emission duration TH of 1 ms, the light receiving devices Z1 through Z4 may regard light being received with a period of 2 ms for 1 ms as the light, having been emitted from the fourth light emitting device X40, and ignore another light. For example, when an observer shines a flashlight on the plurality of light receiving devices Z1 through Z4 for 10 seconds, the light receiving devices Z1 through Z4 may regard the flashlight as external noise. As a result, the influence of external light can be reduced, and the malfunction of the light receiving devices can be reduced.

Here, the description has been made to a method of operation one light emitting device by using four driving signals DS. However, the number of driving signals DS to drive one light emitting device can be varied.

In addition, a method of controlling a pulse width of the driving signal DS may also be used.

A method of using a sinusoidal driving signal instead of a square wave signal may also be used.

A method of calculating a touch position will be described in more detail.

Figure 39B:
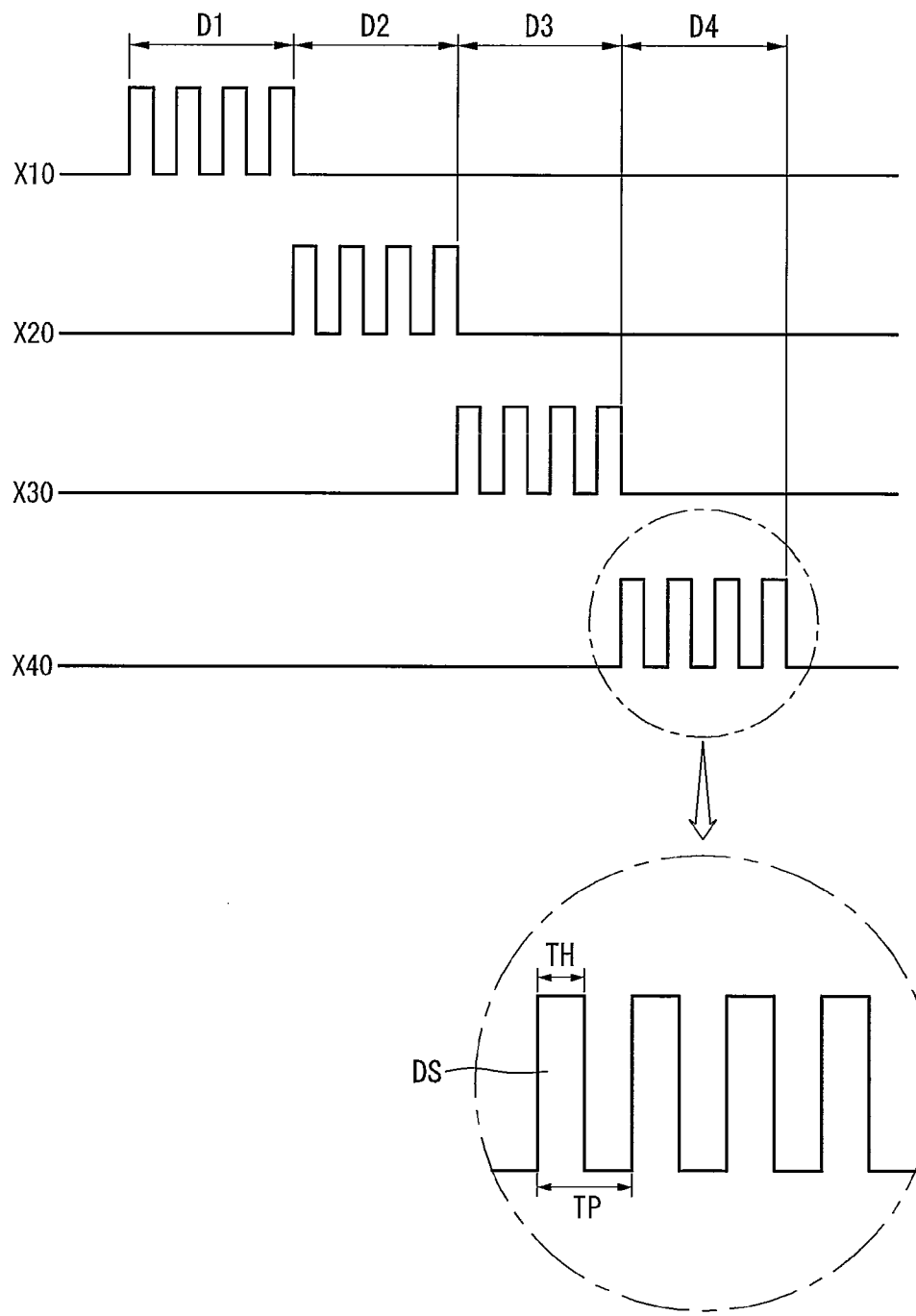

First, a plurality of detection data corresponding to (X10, Z1), (X20, Z2), (X30, Z3), and (X40, Z4) including position data of the light emitting devices X10 through X40 and the light receiving devices Z1 through Z4 by the method as described in FIGS. 39A and 39B may be acquired.

Figure 40:
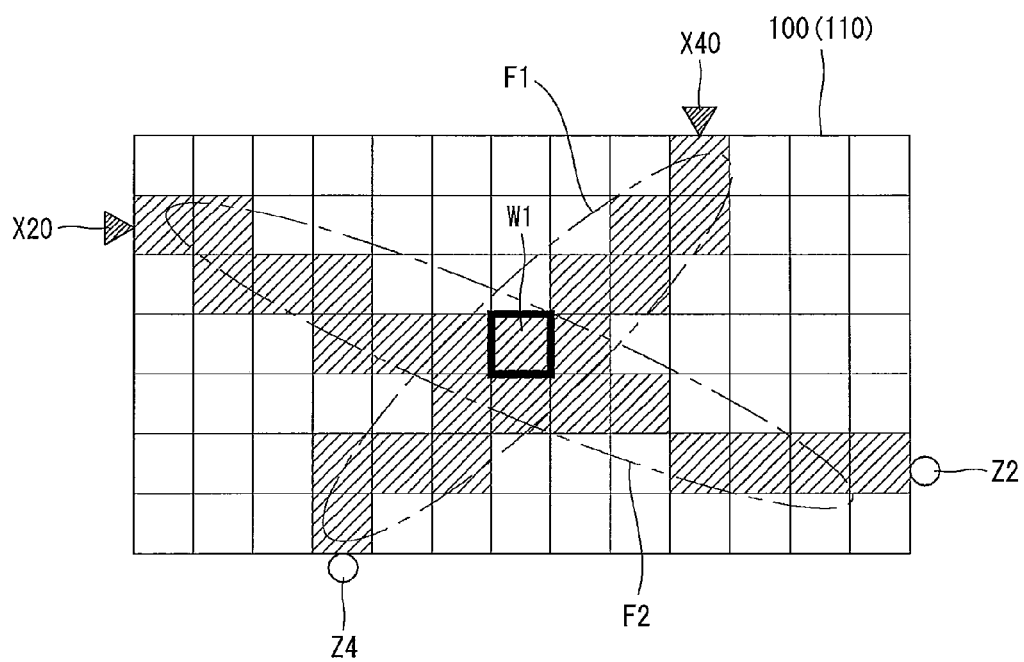

Then, each detection data can be mapped onto a rectangular coordinate system. In this case, as shown in FIG. 40, the detection data about the second light emitting device X20 and the second light receiving devices Z2 may be mapped as indicated by F2, and the detection data about the fourth light emitting device X40 and the fourth light receiving devices Z4 may be mapped as indicated by F1.

Then, in order to acquire a center point of each detection data, the mapped detection data can be converted using a mathematical conversion method. Such conversion is referred to as a first conversion.

Figure 41:
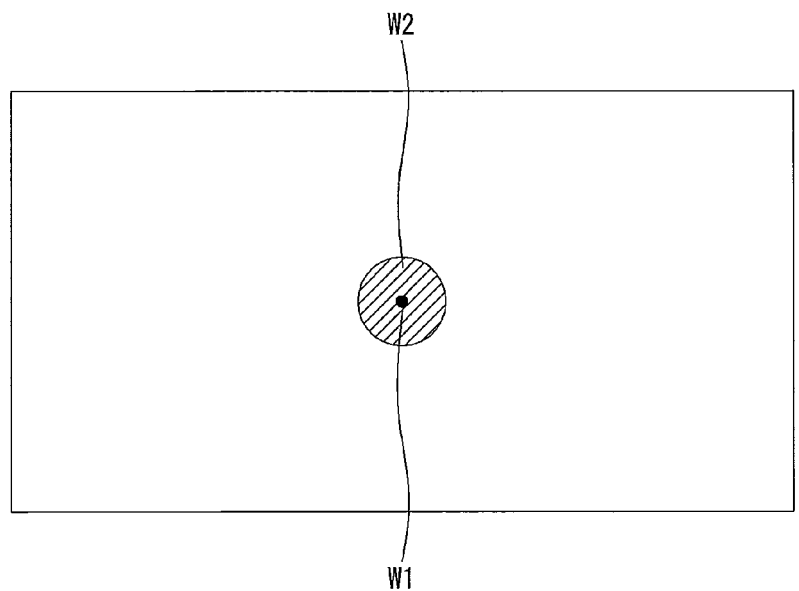

Grouping is performed to connect the first converted detection data to the plurality of detection data being mapped and corresponding to the same position. And data on a center point W1 in association with the mapped detection data can be acquired as shown in FIG. 41. Here, the reason for which grouping is performed is that as shown in FIG. 39A, the plurality of detection data ((X10, Z1), (X20, Z2), (X30, Z3), and (X40, Z4)) correspond to an arbitrary position P, and thus, the detection data according to the arbitrary position P need to be connected to each other.

In the operation of acquiring a center point, the number of touches being made can be acquired through the center point W1. For example, a touch range can be acquired on the basis of the size of a predetermined area W2 around the center point W1.

Alternatively, a method of performing the first conversion of the mapped detection data, acquiring data on the area W2, as shown in FIG. 41, and then acquiring the center point W1 of the area W2 may also be used.

The data on the center point W1 may undergo a second conversion, that is, inverse conversion of the first conversion, so that a plurality of converted detection data including position data about the light emitting devices X10 through X40 being turned on and the light receiving devices Z1 through Z4 being corresponding turned on can be acquired.

Here, the converted detection data, obtained by inversely converting the data about the center point W1, as shown in FIG. 41, may be substantially linear in shape.

Figure 42:
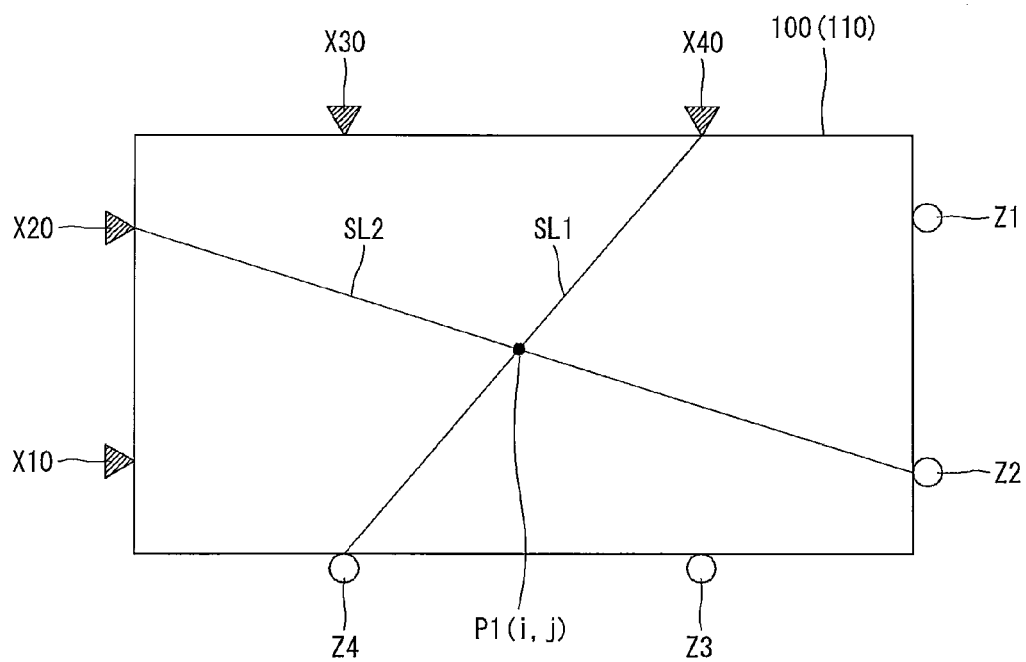

For example, in FIG. 40, since the detection data is mapped on the rectangular coordinate system, it is in the form of predetermined areas (F1 and F2). The center point W1 of each detection data is acquired by the first conversion as shown in FIG. 41, and the data is inversely converted. Therefore, as shown in FIG. 42, converted detection data in the form of straight lines (SL1 and SL2) can be acquired. Here, the area F1 of FIG. 40 may be converted into a linear shape as indicated by SL1 of FIG. 42, and the area F2 of FIG. 40 may be converted into a linear shape as indicated by SL2 of FIG. 42.

Then, as shown in FIG. 42, an intersecting point P(i, j) of the converted detection data is acquired to thereby acquire the touch position.

FIGS. 43 through 46 are diagrams illustrating functional blocks of a display apparatus having a touch panel according to another embodiment of the present invention. A description of what has been described above will be omitted.

Figure 43:
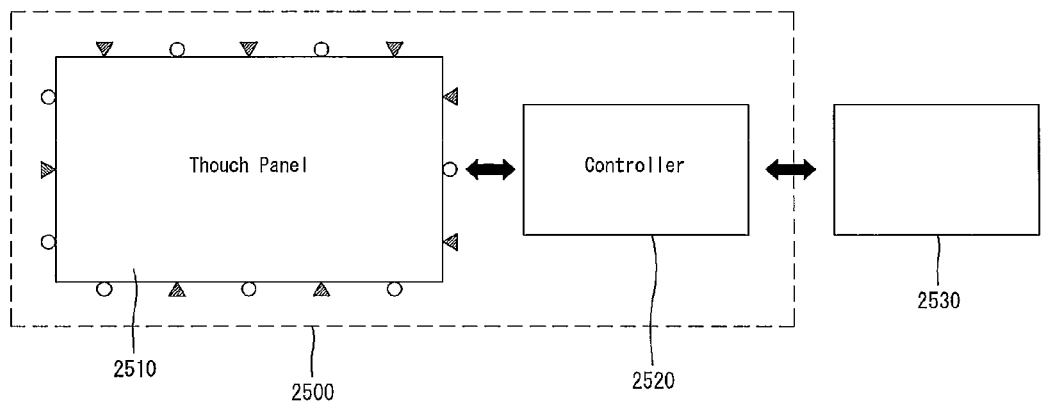
FIGS. 43 through 46 are diagrams illustrating functional blocks of the display apparatus having the touch panel according to the embodiment of the present invention.

Referring to FIG. 43, a display apparatus according to this embodiment may comprise a touch panel section 2500 that including a touch panel 2510 having plurality of light emitting device and a plurality of light receiving devices and a controller 2520, and a display section 2530.

Here, the display section 2530 may be at least one of a PC, an embedded system, and a display panel such as a PDP and an LCD.

The controller 2520 may control the operations of the light emitting device and the light receiving devices of the touch panel 2510.

Figure 44:
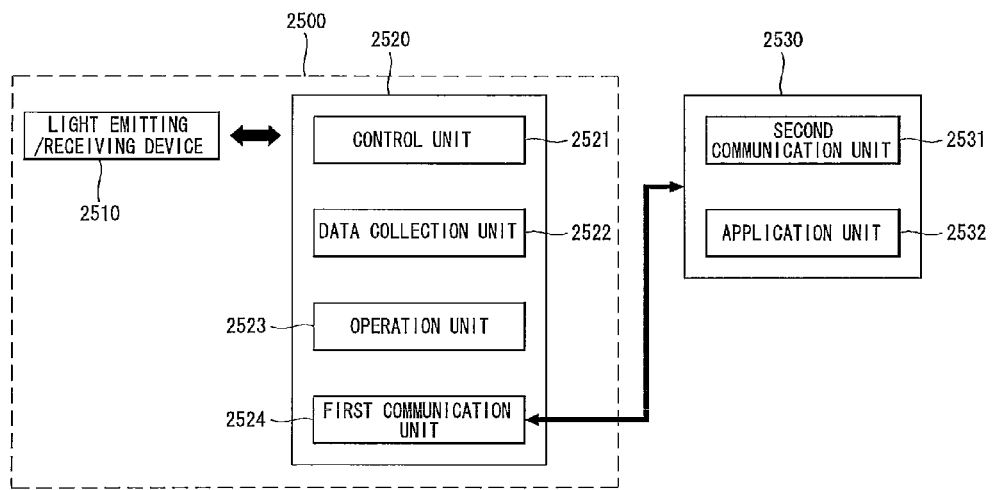

As shown in FIG. 44, the controller 2520 of the touch panel section 2500 may include a control unit 2521, a data collection unit 2522, an operation unit 2523, and a first communication unit 2524.

In addition, the display section 2530 may include a second communication unit 2531 and an application program unit 2532.

The control unit 2521 may control the plurality of light emitting device and the plurality of light receiving devices of the touch panel 2510. For example, the control unit 2521 may turn on the plurality of light emitting device according to predetermined timings and turn on at least one light receiving device according to an arbitrary light emitting device being turned on. The operations of the plurality of light emitting device and the light receiving devices have been described above in detail.

The data collection unit 2522 may collect optical data that is acquired by the plurality of light emitting device and the light receiving devices being operated under the control of the control unit 2521. Here, the optical data may refer to detection data.

The operation unit 2523 may operate and calculate a touch position on the basis of the optical data, collected by the data collection unit 2522. The calculation method of the touch position has been described above in detail.

The first communication unit 2524 may transmit information about the touch position, operated by the operation unit 2523, to the second communication unit 2531 of the display section 2530.

Then, the display section 2530 displays the information about the touch position on a screen, stores the information about the touch position, or applies the information about the touch position to the application program unit 2532 using the information about the touch position for application programs.

Figure 45:
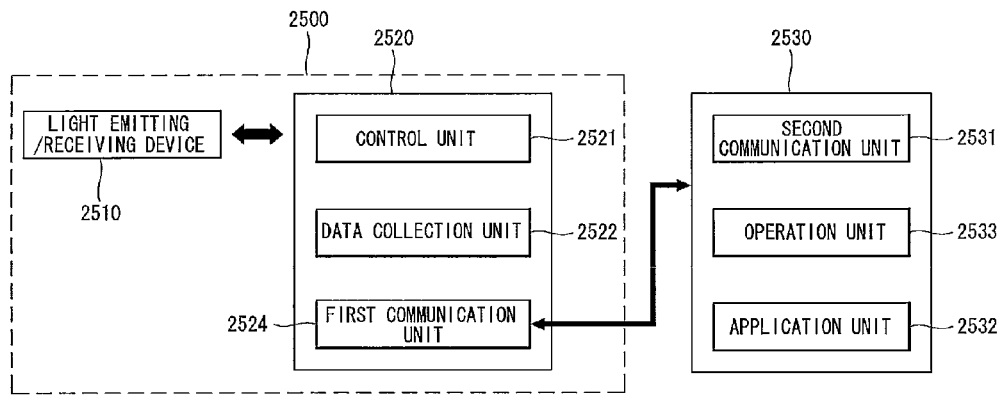

Alternatively, as shown in FIG. 45, the operation may be removed from the controller 2520, and an operation unit 2533 may be arranged in the display section 2530. In this case, the first communication unit 2524 may transmit optical data, collected by the data collection unit 2522, to the second communication unit 2531 of the display section 2530, and the operation unit 2533 may operate and calculate the touch position on the basis of the optical data the second communication unit 2531 has received.

Figure 46:
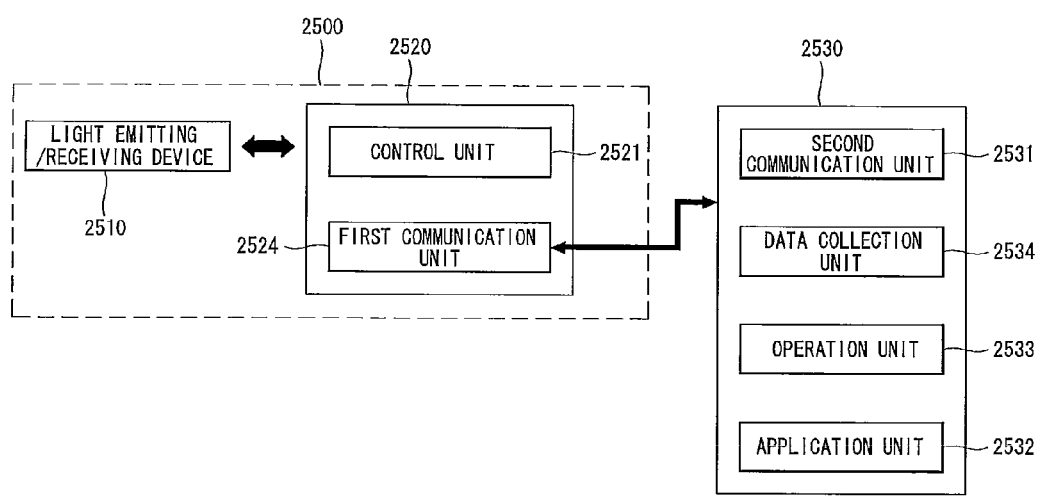

Alternatively, as shown in FIG. 46, the operation unit and the data collection unit are removed from the controller 2520, and the operation unit 2533 and a data collection unit 2534 may be arranged in the display section 2530. In this case, the first communication unit 2524 may transmit each optical data, acquired by the light emitting device and the light receiving devices being operated according to the control of the control unit 2521, the second communication unit 2531 of the display section 2530.

The data collection unit 2534 may collect the optical data, transmitted to the second communication unit 2531 of the display section 2530, and the operation unit 2533 may operate and calculate the touch position on the basis of the optical data collected by the data collection unit 2534.

Another method of driving a touch panel according to an embodiment of the present invention will now be described in detail.

FIGS. 47 through 68 are diagrams illustrating another method of driving a touch panel according to another embodiment of the present invention. A description of what has been described above will be omitted. For example, a driving method below can be applied to the above-described touch panel. A method of driving a touch panel will be exemplified below, and can be applied to a method of driving the display apparatus having the light emitting devices 120 and the light receiving devices 130. In addition, the operation of the touch position may be performed by the operation units 2523 and 2533, which have been described with reference to FIGS. 44 through 46. Moreover, since the operation of the touch position has been described above in detailed, a description thereof will be omitted.

Figure 47:
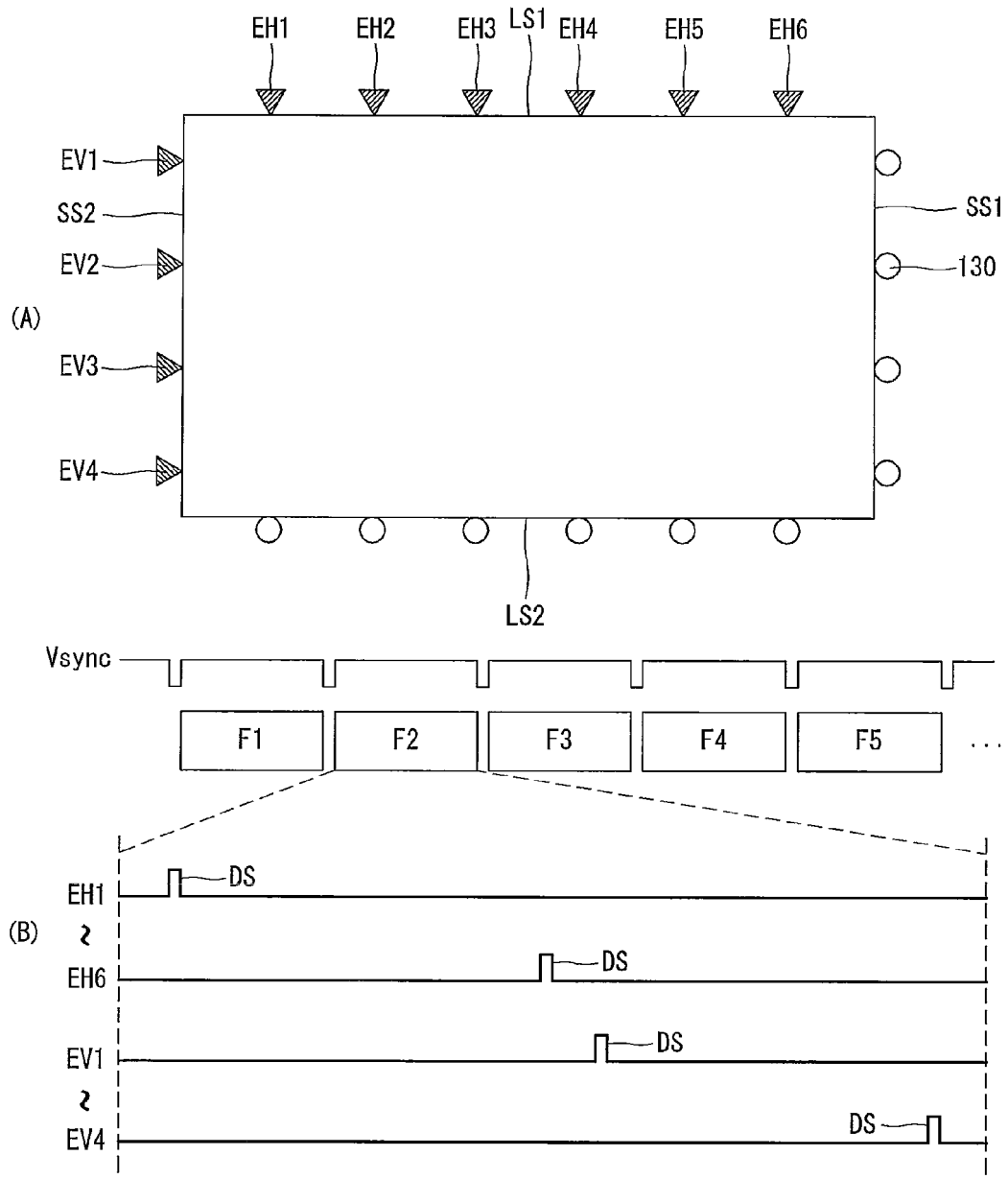
FIGS. 47 through 68 are diagrams illustrating a method of driving a touch panel according to another exemplary embodiment of the invention.
Figure 48:
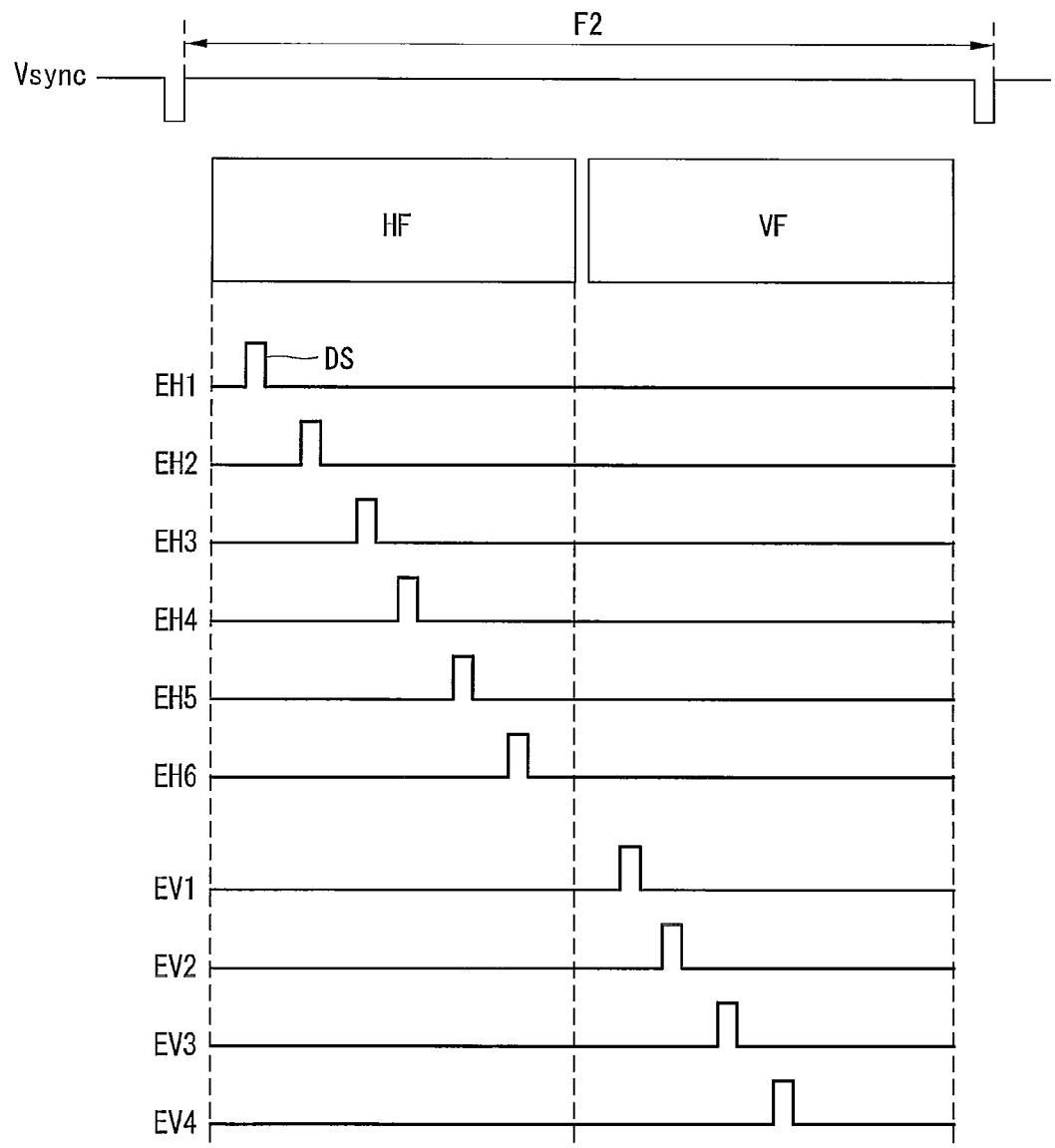

First, as shown in (A) of FIG. 47, it is assumed that a plurality of light emitting devices EH1 through EH6 are arranged on the first long side LS1 of the substrate 100, a plurality of light emitting devices EV1 through EV4 are arranged on the second short side SS2 of the substrate 100, and a plurality of light receiving devices 130 are arranged on the second long side LS2 and the first short side SS1 of the substrate 100. Here, the plurality of light emitting devices EH1 through EH6, arranged on the first long side LS1 of the substrate 100, may be referred to as horizontal light emitting devices, and the plurality of light emitting devices EV1 through EV4, arranged on the second short side SS2 of the substrate 100, may be referred to as vertical light emitting devices.

The plurality of light emitting devices EH1 through EH6 and EV1 through EV4 may be turned on individual frame periods F1 through F5. In addition, at least one light receiving device 130 may be activated according to the light emitting device being turned on. Here, the frame periods F1 through F5 may be differentiated by a vertical synchronous signal Vsync. In addition, the vertical synchronous signal Vsync may be the same as a vertical synchronous signal corresponding to image data that is displayed on the display panel or another vertical synchronous signal for a touch. For the driving convenience and ease, the vertical synchronous signal Vsync used for a touch may be the same as a vertical synchronous signal corresponding to image data. In this case, frames of the image data may be equal to frame periods for a touch.

One frame period may be described as a period during which the plurality of light emitting devices EH1 through EH6 and EV1 through EV4 finish being turned off once.

For example, as shown in (B) of 47, during a second frame F2 of the plurality of frames, driving signals DS may be supplied to the horizontal light emitting devices EH1 through EH6 in a sequential manner, and driving signals DS may then be supplied to the vertical light emitting devices EV1 through EV4 in a sequential manner. Therefore, the plurality of light emitting devices EH1 through EH6 and EV1 through EV4 may be turned on in a sequential manner. Here, the forms of the driving signals DS are not limited to FIG. 47.

As such, during the individual frame periods F1 through F5, the plurality of light emitting devices EH1 through EH6 and EV1 through EV4 are turned on, and the light receiving devices 130 are correspondingly activated, so that scanning can be performed as to whether a touch is made or not. Considering this point, one frame period may refer to a period during which the plurality of light emitting devices EH1 through EH6 and EV1 through EV4 are turned on at least once.

Alternatively, as shown in 48, one frame period F2 may be divided into a horizontal frame period HF and a vertical frame period VF. Here, the horizontal frame period HF is a period during which the plurality of light emitting device, arranged in a horizontal direction, that is, the horizontal light emitting devices EH1 through EH6 are turned on. The vertical frame period VF is a period during which the plurality of light emitting device, arranged in a vertical direction, that is, the vertical light emitting devices EV1 through EV4 are turned on.

When a touch is made within a predetermined frame period, detection data about a touch position corresponding to the frame period during which the touch has been made can be ignored. Here, the description of the detection data has been described above.

Figure 49:
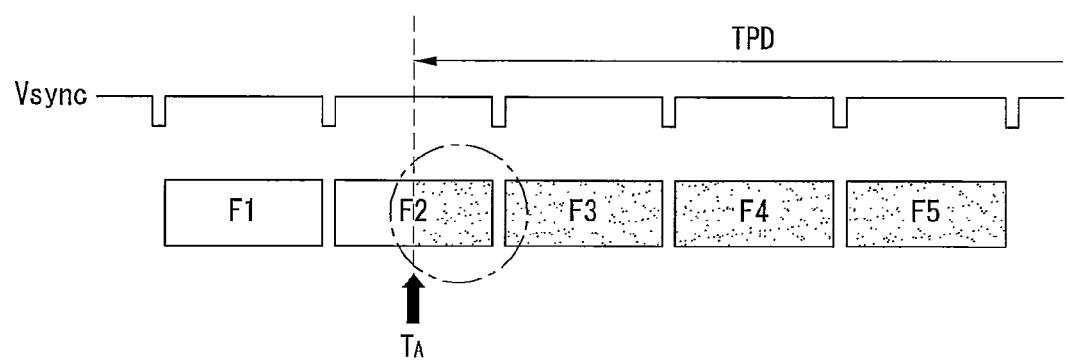

For example, as shown in FIG. 49, when a touch is made at a time point $T_A$ during the second frame period F2 among the plurality of frame periods F1 through F5, it is possible to ignore detection data that is generated during at least one frame period among frame periods corresponding to a touch duration TPD from the time point $T_A$ at which the touch is made to a time point at which the touch is terminated.

It may be possible to ignore detection data that is generated during the first frame period among the frame periods corresponding to the touch duration TPD from the time point $T_A$ at which the touch is made to the time point at which the touch is terminated, that is, the second frame period F2. In other words, in the operation of calculating a touch position, while the detection data, generated during the second frame period F2, is not considered, the touch position is calculated and output by using detection data being generated from the next period, that is, the third frame period F3 d.

The reason for which the detection data being generated during the first frame period among the frame periods corresponding to the touch duration TPD from the time point $T_A$ at which the touch is made to the time point at which the touch is terminated is ignored when the touch position is calculated is as follows.

Figure 50:
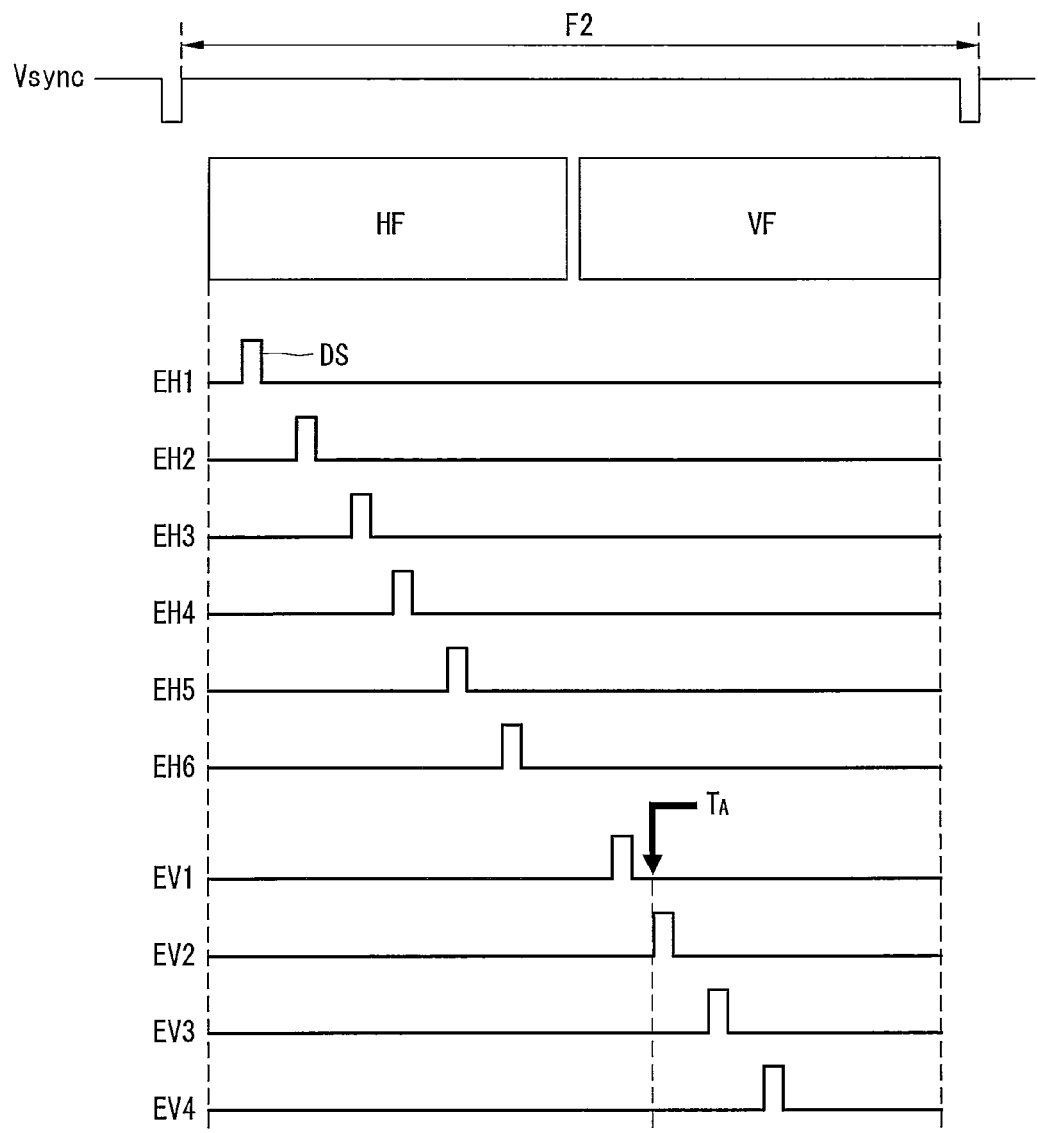

As shown in FIG. 50, it is assumed that a touch is made after a driving signal DS is supplied to the first vertical light emitting device EV1 during the vertical frame period VF of the second frame period F2. That is, the time point $T_A$ at which the touch is made is present between a time point at which the driving signal DS is supplied to the first vertical light emitting device EV1 and a time point at which the driving signal DS is supplied to the second vertical light emitting device EV2.

Figure 51:
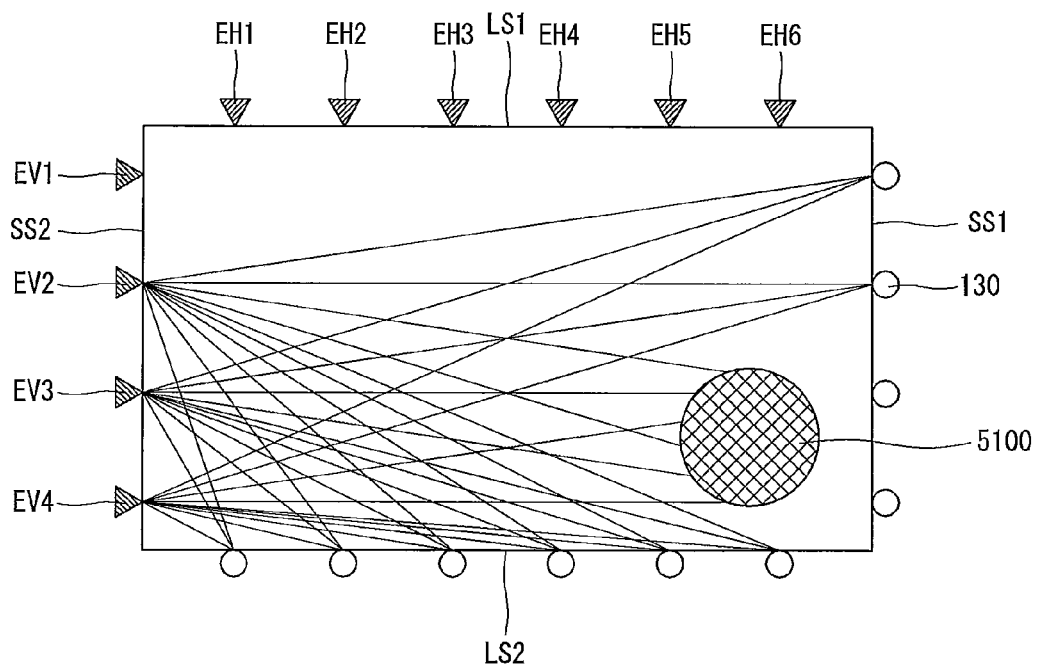

In this case, as shown in FIG. 51, detection data that is generated during the second frame period F2 may depend on the second through fourth vertical light emitting devices EV2 through EV4. More specifically, when a predetermined object 5100 such as a finger makes a touch at a predetermined position on the display panel, the light receiving devices 130 can be activated according to light emitted by the second through fourth vertical light emitting devices EV2 through EV4 during the second frame period F2. For these reasons, it may be difficult to accurately calculate the touch position with the detection data being generated during the second frame period F2. Therefore, in the present invention, the detection data being generated during the second frame period F2 is ignored.

Then, information about the touch position can be output using detection data of the other frame periods corresponding to the touch duration TPD except for the frame period corresponding to the detection data being ignored. The method of calculating and outputting the touch position by using the detection data has bee described in detail with reference to FIGS. 38 through 42.

The time point $T_A$ at which the touch is made is present before the first light emitting device is turned on during a predetermined frame period, detection data about the touch position that is generated during the corresponding frame period is not ignored but can be used to calculate the touch position.

Figure 52:
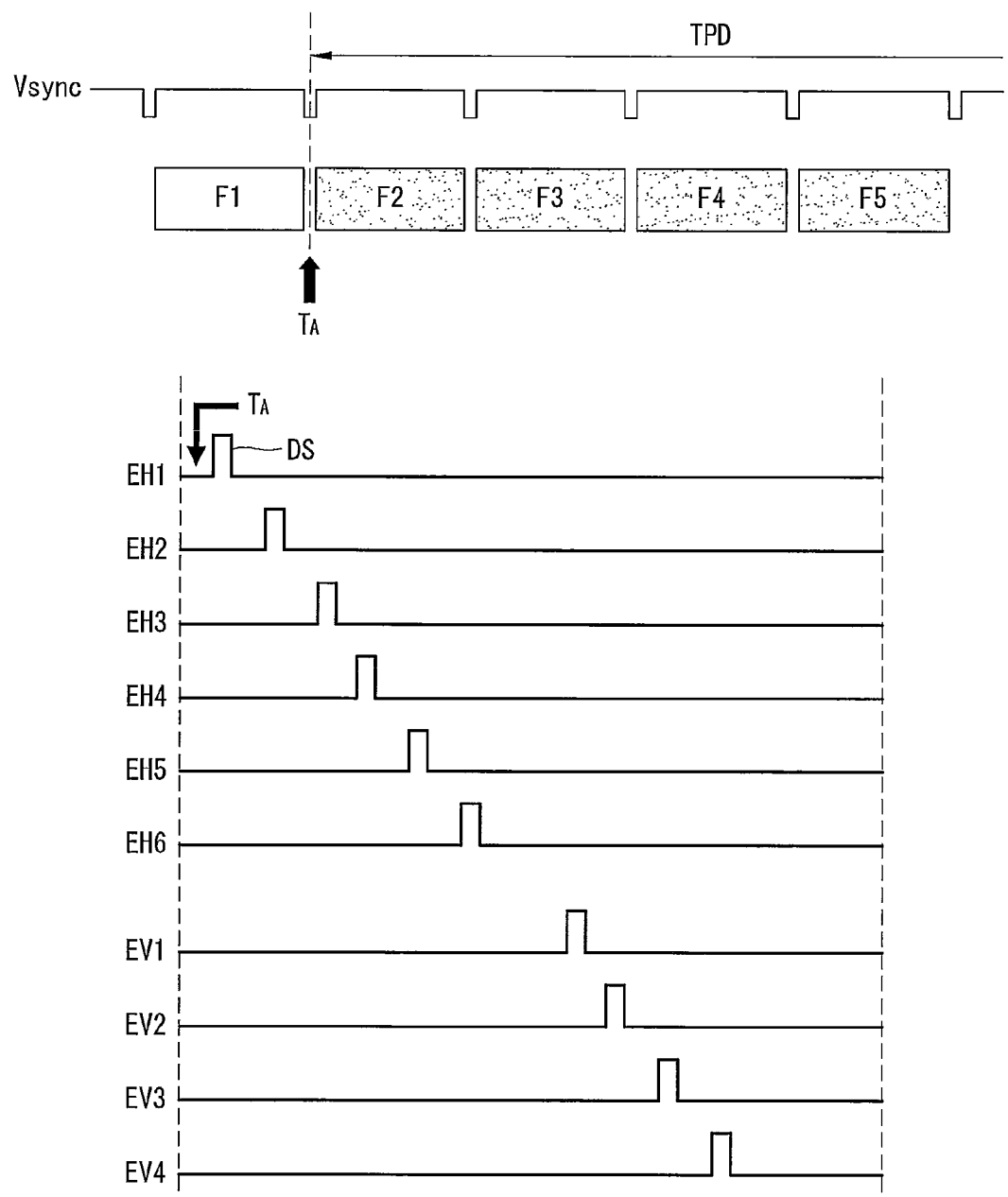

For example, as shown in FIG. 52, when the time point $T_A$ at which the touch is made is within the second frame period F2, and the touch is made before the driving signal DS is supplied to the first light emitting device during the second frame period F2, that is, the first horizontal light emitting device EH1, the detection data about the touch being made during the second frame period F2 may include accurate information about the touch position. Therefore, as shown in FIG. 52, the detection data about the touch position that is generated during the second frame period F2 may not be ignored. Here, the description has been made to a case in which the driving signals DS are sequentially supplied from the first horizontal light emitting device EH1 down during one frame period. The order in which the driving signals DS are supplied is not limited thereto.

Figure 53:
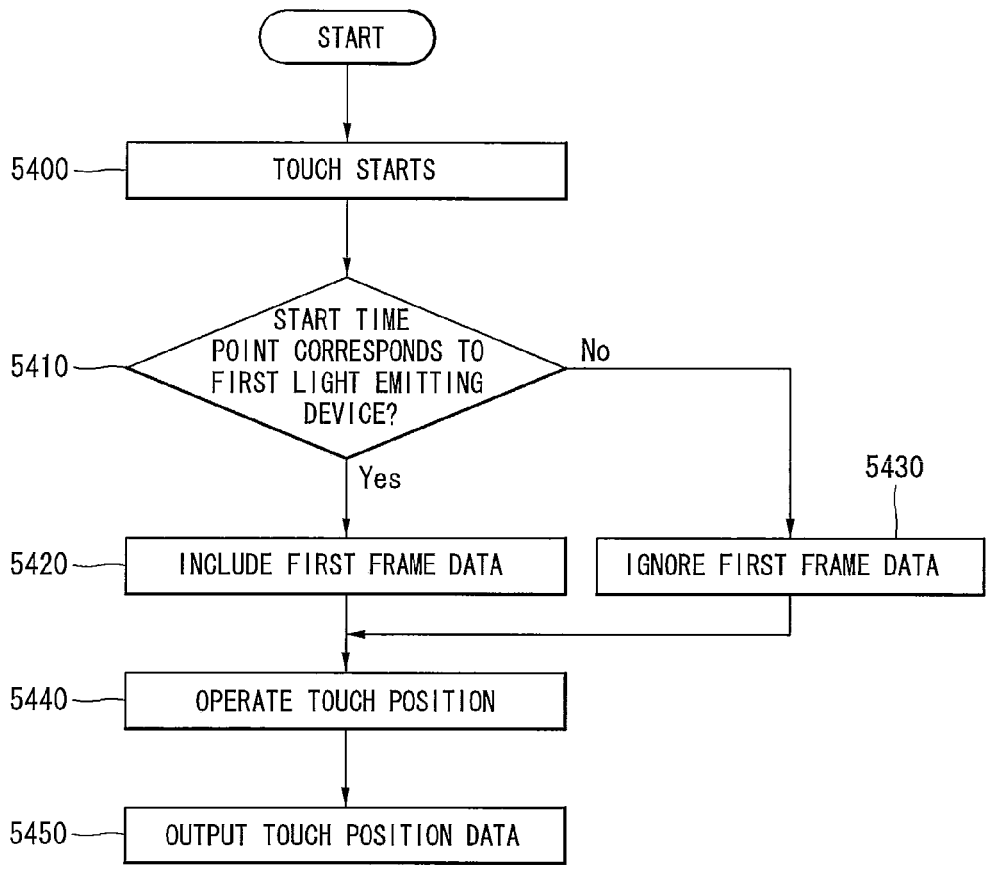

For example, as shown in FIG. 53, when a touch starts in operation 5400, that is, when a touch is made, it is determined as to whether a touch start point $T_A$ is before the first light emitting device is turned on during the first frame period among frame periods corresponding to a touch duration TPD from the time point $T_A$ at which the touch is made to a time point at which the touch is terminated in operation 5410. In other words, it is determined whether the touch start point $T_A$ corresponds to the light emitting device during the first frame period among the frame periods corresponding to the touch duration TPD.

As a result of the determination, if it is determined that the touch start point $T_A$ is before the first light emitting device is turned on during the first frame period among frame periods corresponding to the touch duration TPD, it is possible to include detection data being generated during the first frame period in detection data used to calculate the touch position 5420. That is, the detection data being generated during the first frame period is used to calculate the touch position.

On the other hand, as a result of the determination in operation 5410, if it is determined that the touch start point $T_A$ is after the first light emitting device is turned on during the first frame period among frame periods corresponding to the touch duration TPD, it is possible to ignore detection data being generated during the first frame period in operation 5430.

Then, the touch position is operated using the detection data in operation 5440, and data about the touch position can be output according to a result of the operation in operation 5450.

Figure 54:
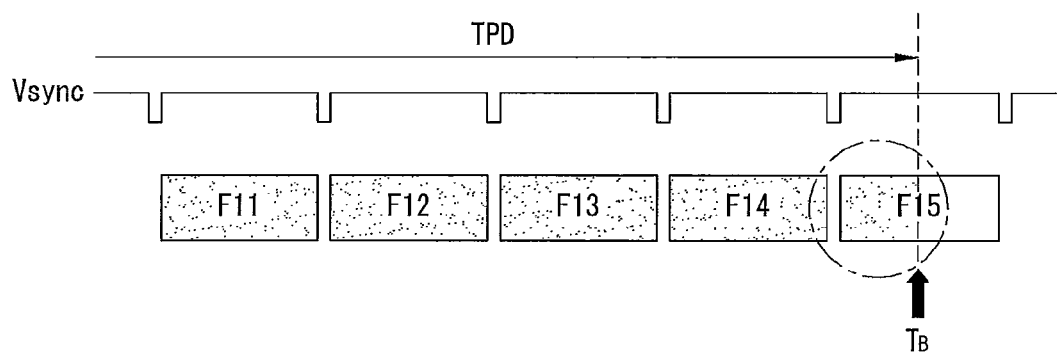

Alternatively, as shown in FIG. 54, when the touch is terminated at a time point $T_B$ during the fifteenth frame period F15 among a plurality of frame period F11 through F15, it is possible to ignore detection data that is generated during the fifteenth frame period F15, that is, the last frame period among frame periods corresponding to a touch duration TPD from a touch start time point to a touch end time point $T_B$.

As such, the reason for which the detection data being generated during the last frame period among the frame periods corresponding to the touch duration TPD from the touch start time point to the touch end time point $T_B$ is ignored when the touch position is calculated may be about the same as the reason for which the detection data being generated during the first frame period is ignored.

If the touch end time point $T_B$ is present after the last light emitting device is turned off during a predetermined frame period, detection data about the touch position that is generated during the corresponding frame period is not ignored but used to output the touch position.

Figure 55:
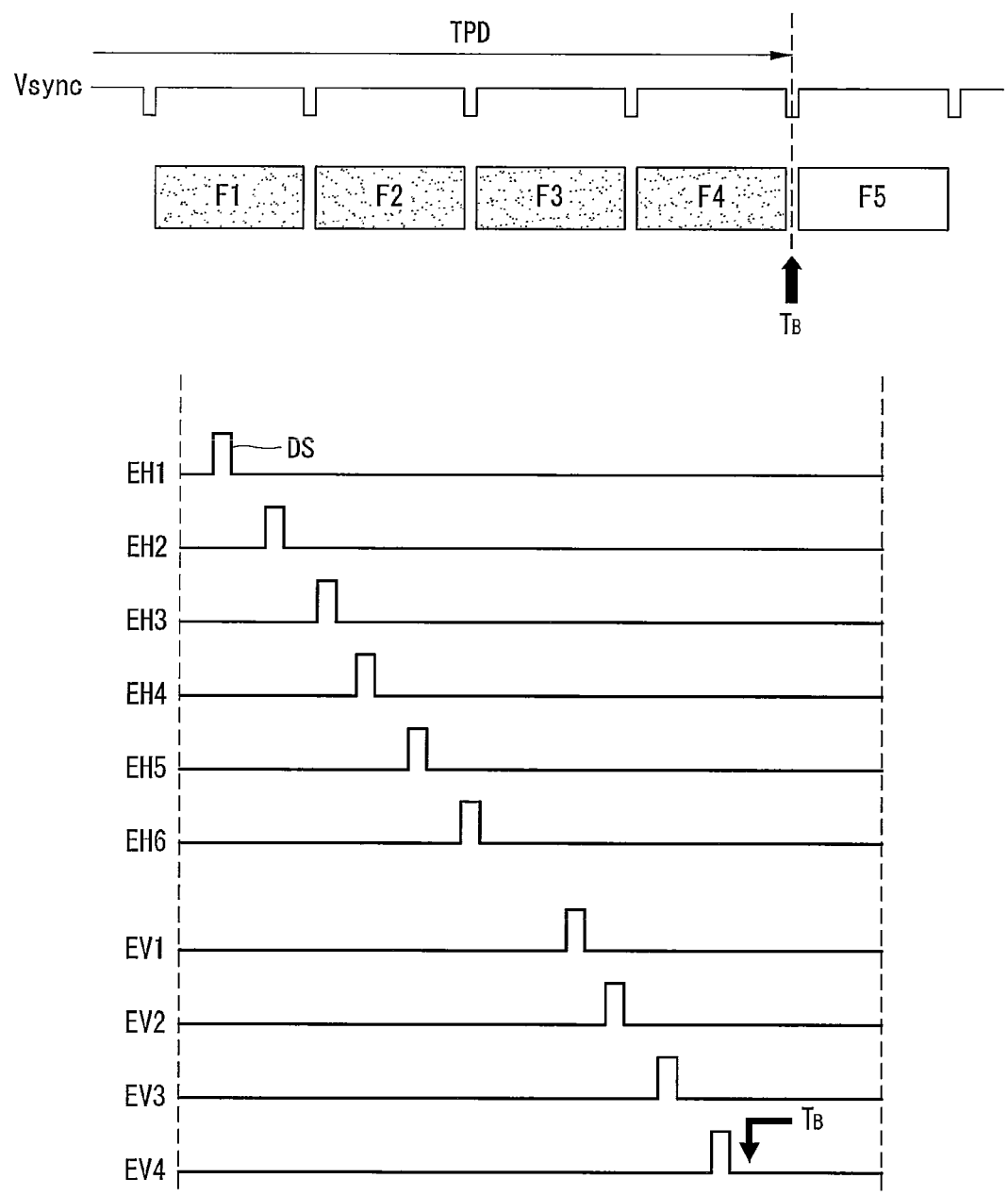

For example, as shown in FIG. 55, when the touch end time point $T_B$ is within the fourteenth frame period F14, and a touch is made after the driving signal DS is supplied to the last light emitting device, that is, fourth vertical light emitting device EV4 during the fourteenth frame period F14, the detection data about the touch position that is generated during the fourteenth frame period F14 can include accurate information about the touch position. Therefore, as shown in FIG. 55, it may not ignore the detection data about the touch position that is generated during the fourteenth frame period F14.

Alternatively, it may be possible to ignore all the detection data being generating during the first frame period and the last frame period among the frame periods corresponding to the touch duration TPD between the touch start time point $T_A$ and the touch end time point $T_B$.

Figure 56:
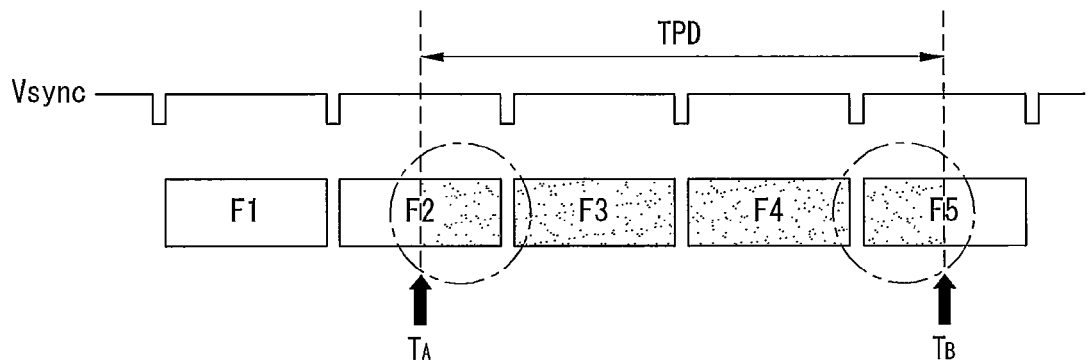

For example, as shown in FIG. 56, when a touch starts at a time point $T_A$ during the second frame period F2 among the plurality of frame periods F1 through F5 and ends at a time point $T_B$, it is possible to ignore detection data being generated the first frame period, that is, the second frame period F2 and the last frame period, that is, the fifth frame period F5 among the frame periods corresponding to the touch duration TPD between the touch start time point $T_A$ and the touch end time point $T_B$.

In this case, the touch position can be calculated and output using the detection data being generated during the third frame period F3 and the fourth frame period F4.

Figure 57:
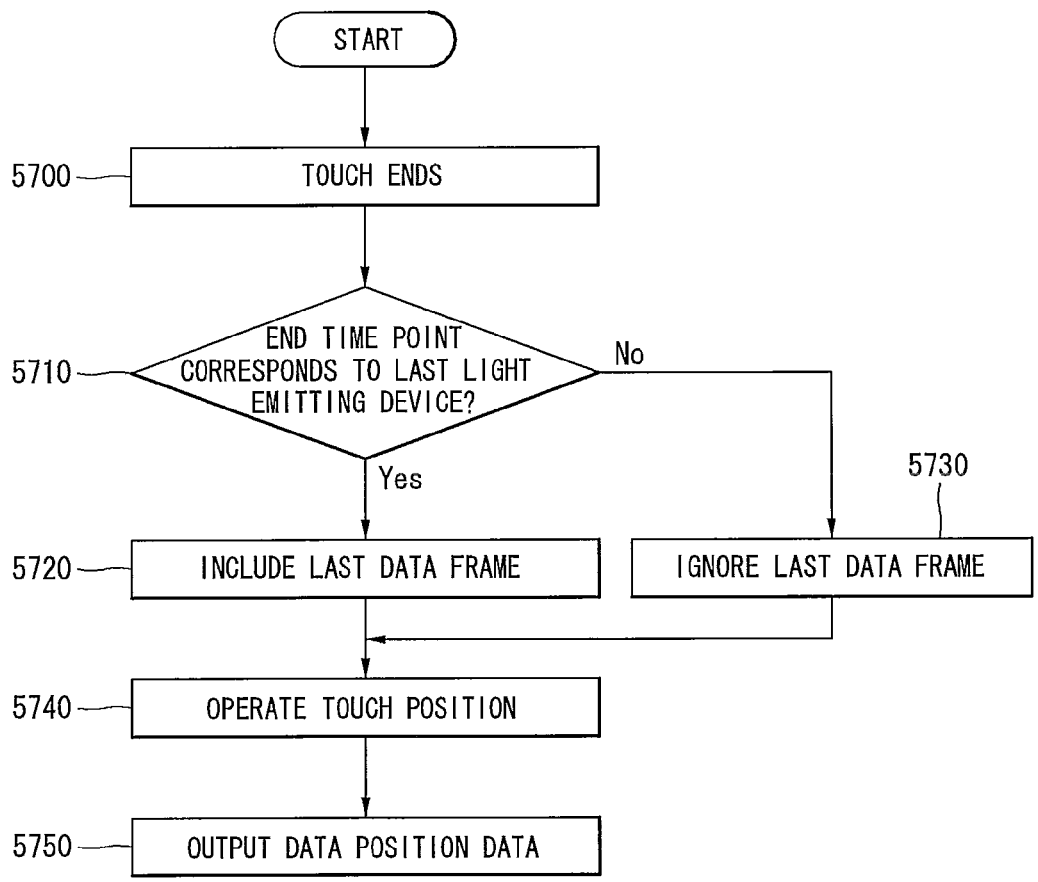

For example, as shown in FIG. 57, when the touch ends (5700), it is determined whether the touch end time point $T_B$ is after the last light emitting device is turned off during the last frame period among the frame periods corresponding to the touch duration TPD in operation 5710. In other words, it is determined whether the touch end time point $T_B$ corresponds to the last light emitting device during the last frame period among the frame periods corresponding to the touch duration TPD.

As a result of the determination, if it is determined that the touch end time point $T_B$ is after the last light emitting device is turned off during the last frame period among the frame periods corresponding to the touch duration TPD, it is possible to include the detection data being generated during the last frame period in the detection data used to calculate the touch position in operation 5720. That is, the detection data being generated during the last frame period is used to calculate the touch position.

On the other hand, as a result of the determination in operation 5710, if it is determined that the touch end time point $T_B$ is before the last light emitting device is turned off during the last frame period among the frame periods corresponding to the touch duration TPD, it is possible to ignore the detection data being generated during the last frame period in operation 5730.

Then, the touch position is operated using the detection data in operation 5740, and data about the touch position can be output according to a result of the operation in operation 5750.

If the touch start time point $T_A$ and the touch end time point $T_B$ are within one frame period or within two consecutive frame periods, information about the touch position may not be output.

Figure 58:
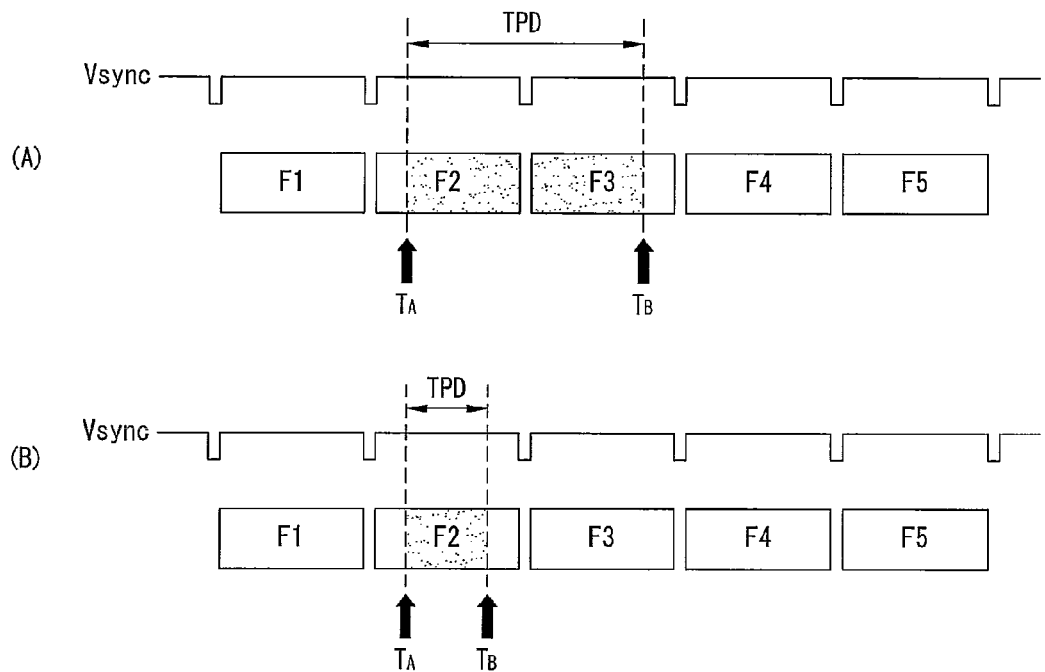

For example, as shown in (A) of FIG. 58, when the touch start time point $T_A$ is within the second frame period F2 among the plurality of frame periods F1 through F5 and the touch end time point $T_B$ is within the third frame period F3 following the second frame period F2, both detection data being generated during the second frame period F2 and detection data being generated during the third frame period F3 may be ignored. In this case, even though the touch has been made during part of the second frame period F2 and part of the third frame period F3, the detection data generated from the second frame period F2 and the third frame period F3 may be ignored in order to prevent malfunction due to lack of data about the touch position.

Alternatively, as shown in FIG. (B) of 58, when the touch start time point $T_A$ and the touch end time point $T_B$ are within the second frame period F2, the detection data generated from the second frame period F2 may be ignored in order to prevent malfunction due to lack of data about the touch position.

Alternatively, a virtual frame may be used in order to accurately calculate the touch position.

Figure 59:
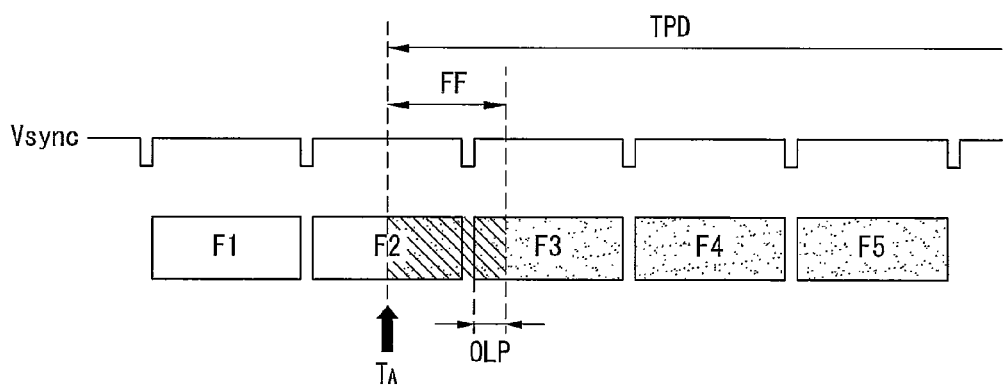

For example, as shown in FIG. 59, when the touch start time point $T_A$ is within the second frame period F2, it is possible to set a virtual frame period FF from the touch start time point $T_A$. Here, the virtual frame period FF may be about the same as one frame period.

Figure 60:
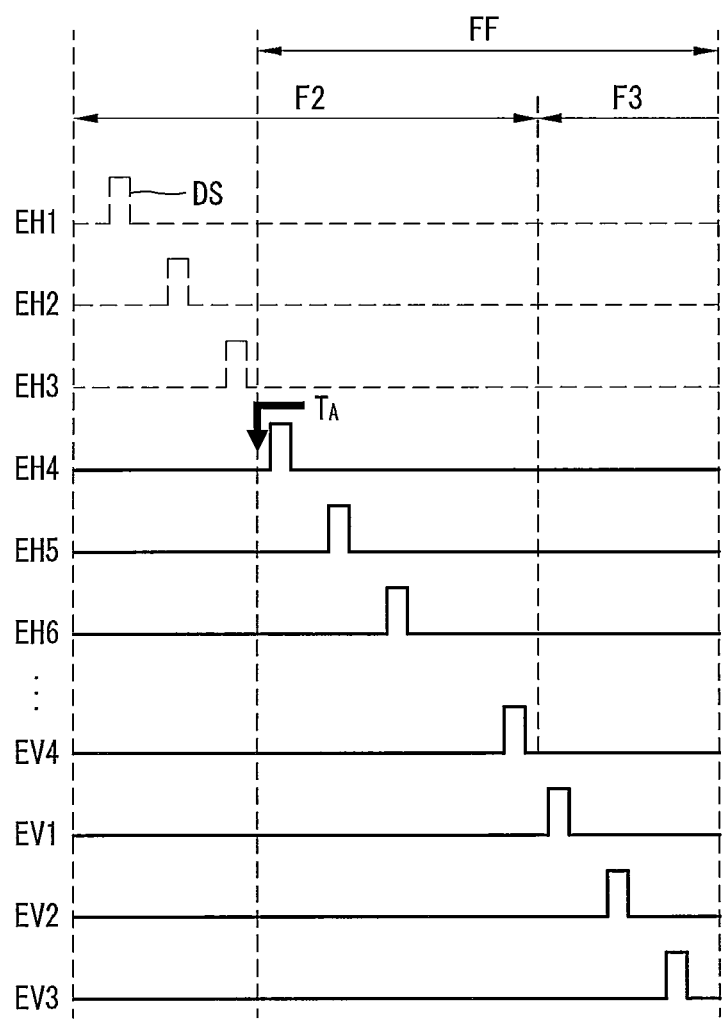

For example, as shown in FIG. 60, when a touch is made at a time point $T_A$ before the driving signal DS is supplied to the fourth horizontal light emitting device EH4 during the second frame period F2 after the driving signal DS is supplied to the third horizontal light emitting device EH3, a period of time before the driving signal DS is supplied to the fourth horizontal light emitting device EH4 during the next frame, the third frame period F3 from the time point $T_A$ may be newly set to the virtual frame period FF.

Here, the virtual frame period FF may overlap the second frame period F2 and also overlap the third frame period F3 for a predetermined duration OLP. That is, the virtual frame period FF partially overlaps the second frame period F2 and the third frame period F3.

In addition, it is possible to operate the touch position by using detection data that is generated during the virtual frame period FF.

Since the touch start time point $T_A$ is within the second frame period F2, the detection data being generated during the second frame period F2 is not complete, while the detection data being generated during the virtual frame period FF including the parts of the second frame period F2 and the third frame period F3 is complete enough to accurately calculate the touch position. For this reason, the detection data being generated during the virtual frame period FF can be used.

In addition, while the detection data being generated during the virtual frame period FF is used to operate the touch position, detection data that is generated from the next frame period, that is, the third frame period F3 may be used to calculate the touch position.

That is, the detection data corresponding to the virtual frame period FF from the touch start time point $T_A$ is used to calculate the touch position, and the second frame period among the frame periods corresponding to the touch duration TPD, that is, a frame period following the frame period corresponding to the touch start time point $T_A$ can be used to calculate the touch position.

Figure 61:
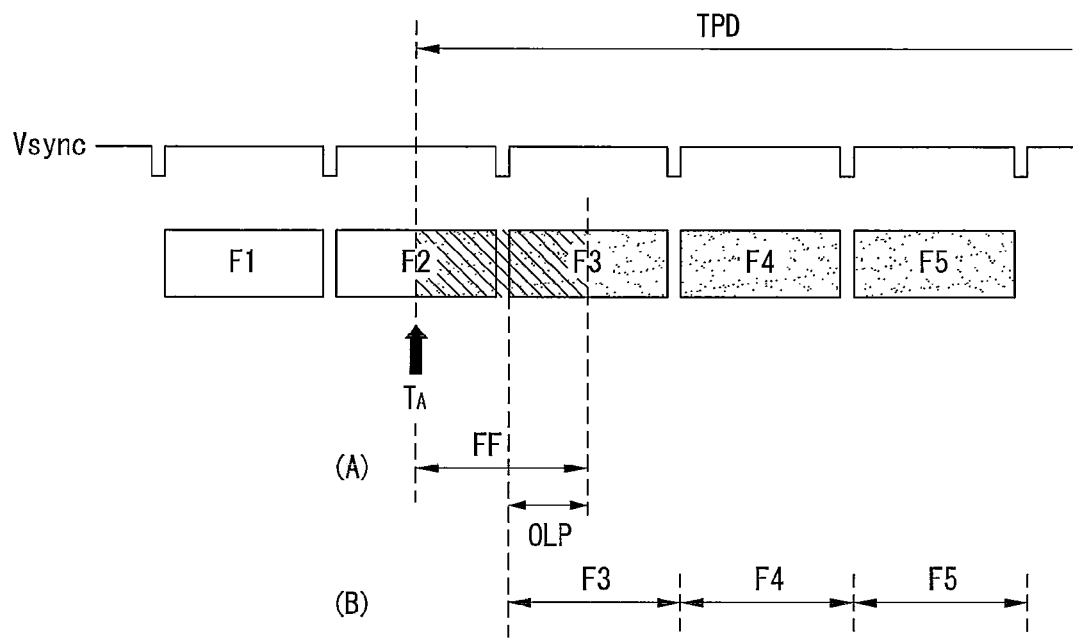

For example, as shown in (A) of FIG. 61, when the touch start time point $T_A$ is within the second frame period F2, detection data corresponding to the virtual frame period FF starting from the touch start time point $T_A$ is used to calculate the touch position, and as shown in (B) of FIG. 61, detection data corresponding to the third frame period F3, the fourth frame period F4, and the fifth frame period F5 can be used to calculate the touch position.

In this case, detection data corresponding to the duration OLP for which the virtual frame period FF and the third frame period F3 overlap may be used again. For example, as shown in FIG. 60, in the third frame period F3, detection data acquired according to the light emission of the first, second, and third horizontal light emitting devices EH1 to EH3 are used twice in order to calculate the touch position.

Alternatively, the virtual frame period FF may be continuously set for the touch duration TPD between the touch start time point $T_A$ and the touch end time point $T_B$.

Figure 62:
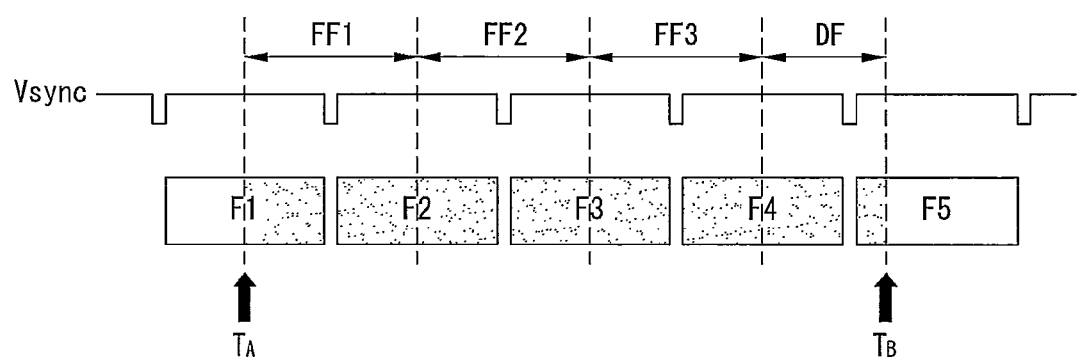
Figure 63:
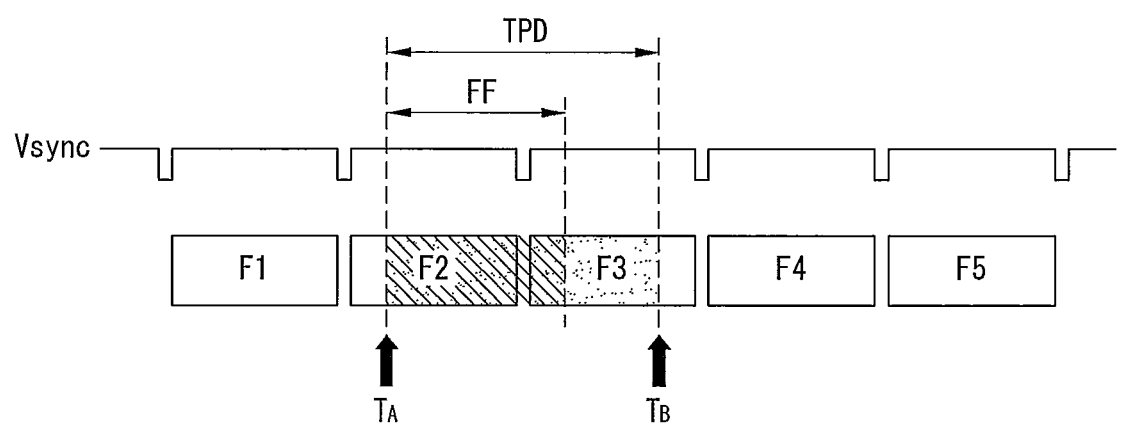

For example, as shown in FIG. 62, when the touch start time point $T_A$ is within the first frame period F1, and the touch end time point $T_B$ is within the fifth frame period F5, first, second, and third virtual frame periods FF1, FF2, and FF3 may be set in a sequential manner from the touch start time point $T_A$. In addition, detection data corresponding to the first, second, and third virtual frame periods FF1, FF2, and FF3 may be used to calculate the touch position. In this case, the detection data corresponding to the first, second, third, fourth, and fifth frame periods F1 through F5 may not be used.

In addition, detection data corresponding to a duration DF between the last virtual frame period, that is, the third virtual frame period FF3 and the touch end time point $T_B$.

In addition, when the method of setting the virtual frame period FF is used, the touch position can be calculated if the touch duration TPD between the touch start time point $T_A$ and the touch end time point $T_B$ is longer than or equal to one frame period.

For example, even when the touch start time point $T_A$ is within the second frame period F2 among the plurality of frame periods F1 through F5, and the touch end time point $T_B$ is within the third frame period F3 following the second frame period F2, the length of the touch duration TPD between the touch start time point $T_A$ and the touch end time point $T_B$ is equal to or longer than that of one frame period, it is possible to set the virtual frame period FF within the touch duration TPD. Accordingly, even when the touch start time point $T_A$ is within the second frame period F2 among the plurality of frame periods F1 through F5, and the touch end time point $T_B$ is within the third frame period F3 following the second frame period F2, the touch position can be calculated.

Hereinafter, a method of making the number of light emitting devices that are turned on for the touch duration TPD between the touch start time point $T_A$ and the touch end time point $T_B$ from the number of light emitting devices that are turned on for a non-touch duration NTPD will be described.

The number of light emitting devices that are turned on during at least one frame for a touch duration between a time point at which a touch is made and a time point at which the touch is completed may be greater than the number of light emitting devices that are turned on during at least one frame for a non-touch duration for which no touch is made.

Figure 64:
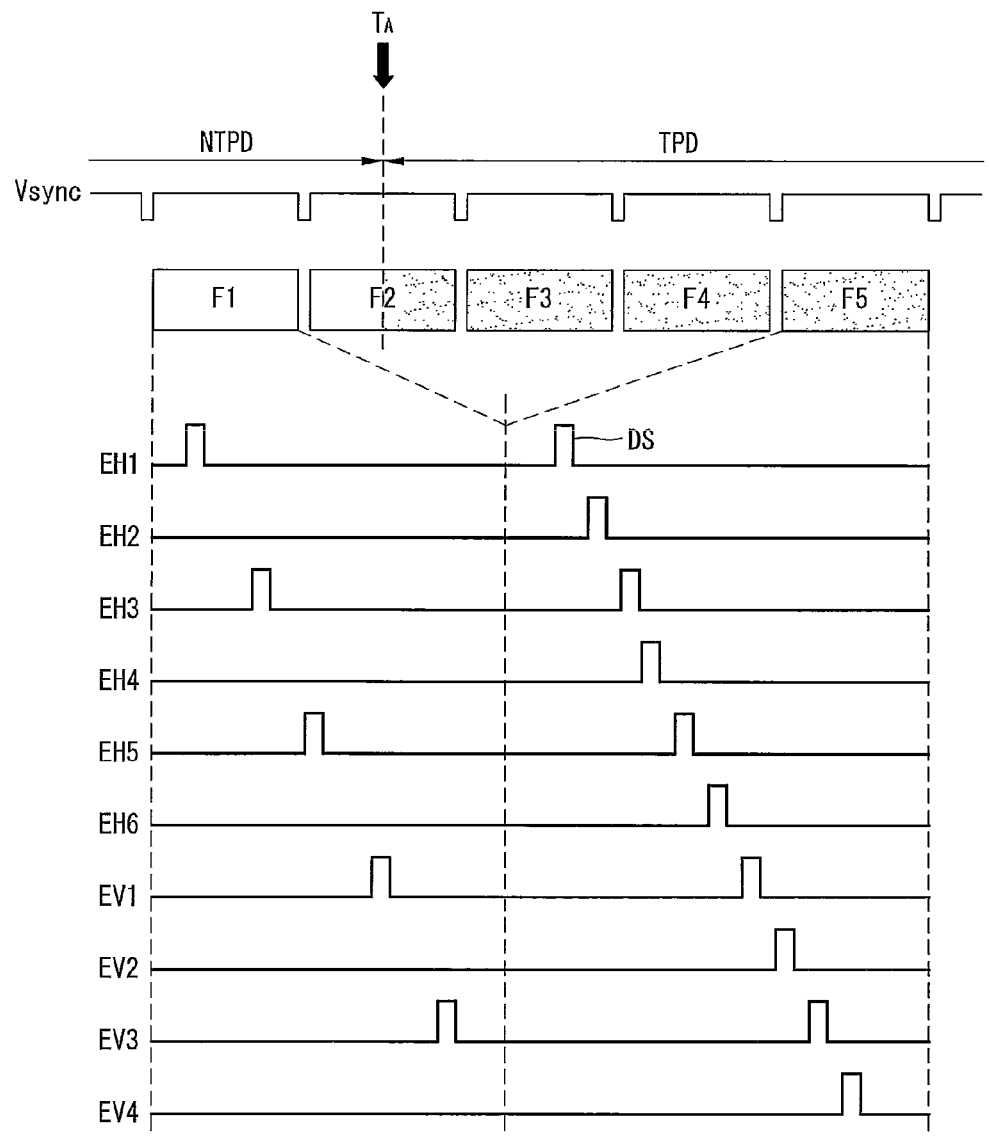

For example, referring to FIG. 64, when the touch start time point $T_A$ is within the second frame period F2, the touch duration TPD is set from the touch start time point $T_A$, and the first frame period F1 may be included in the non-touch duration NTPD.

In this case, the number of light emitting devices that are turned on during first frame period F1 may be smaller than that of light emitting devices that are turned on during a frame period, which is included in the touch duration TPD, that is, the fifth frame period F5. That is, during the frame period for which no touch is made, a smaller number of light emitting devices are turned on to thereby reduce power consumption.

In other words, during the first frame period F1, which is included in the non-touch duration NTPD, at least one light emitting device may not be turned on. For example, as shown in FIG. 64, even (or odd) numbered light emitting devices among the plurality of light emitting devices may not be turned on.

In addition, during the fifth frame period F5 corresponding to the touch duration TPD, the plurality of light emitting device may be turned on in a sequential manner.

Alternatively, during two different frame periods, which are included in the non-touch duration NTPD, different light emitting devices may be turned on.

Figure 65:
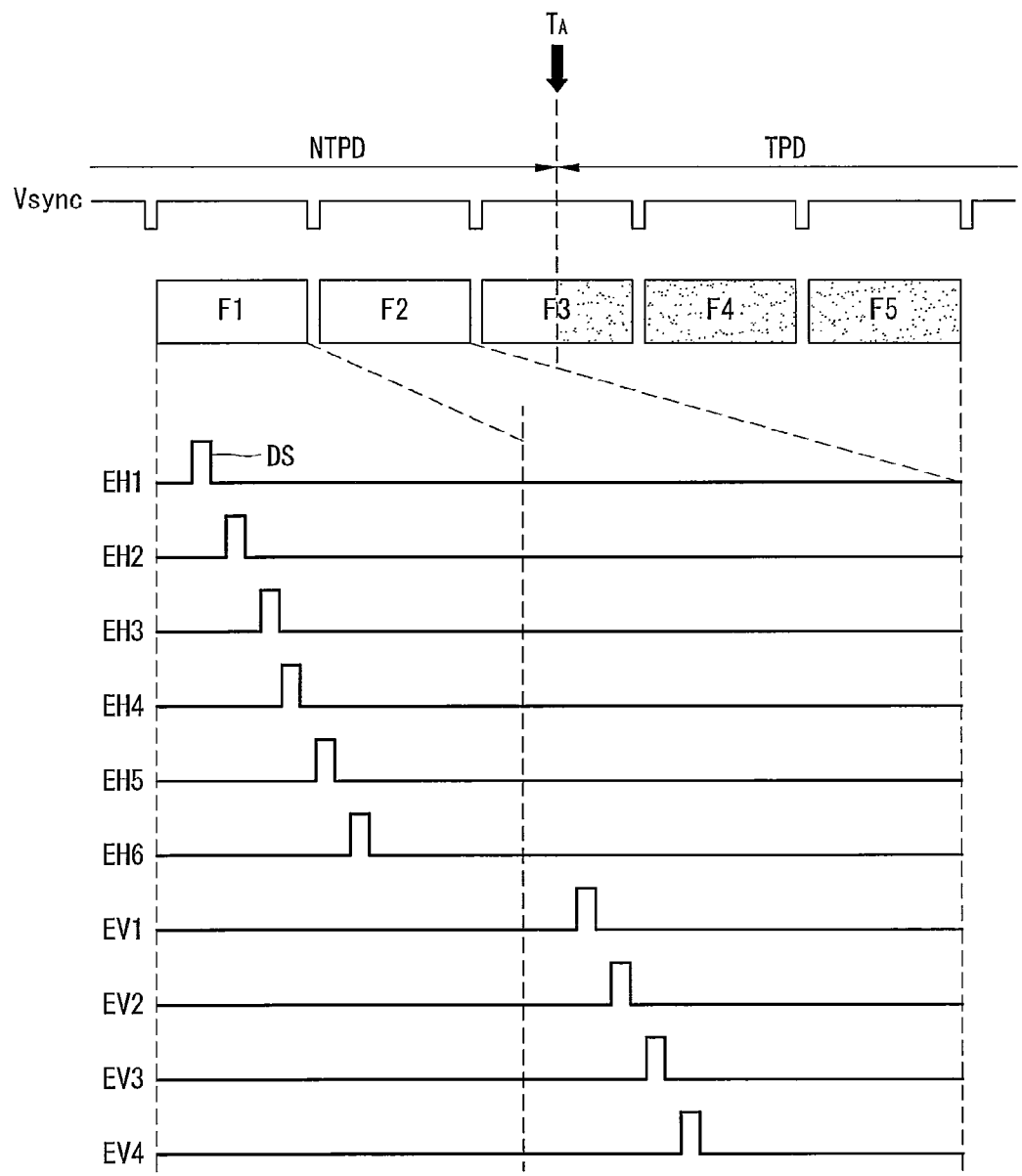

For example, as shown in FIG. 65, when the first and second frame periods F1 and F2 are included in the non-touch duration NTPD, at least one of the light emitting devices that are turned on during the first frame period F1 may not be turned on during the second frame period F2, or at least one of the light emitting devices that are turned on during second frame period F2 may not be turned on during the first frame period F1. For example, during the horizontal light emitting devices EH1 through EH6 may be turned on during the first frame period F1, and the vertical light emitting devices EV1 through EV4 may be turned on during the second frame period F2.

Figure 66:
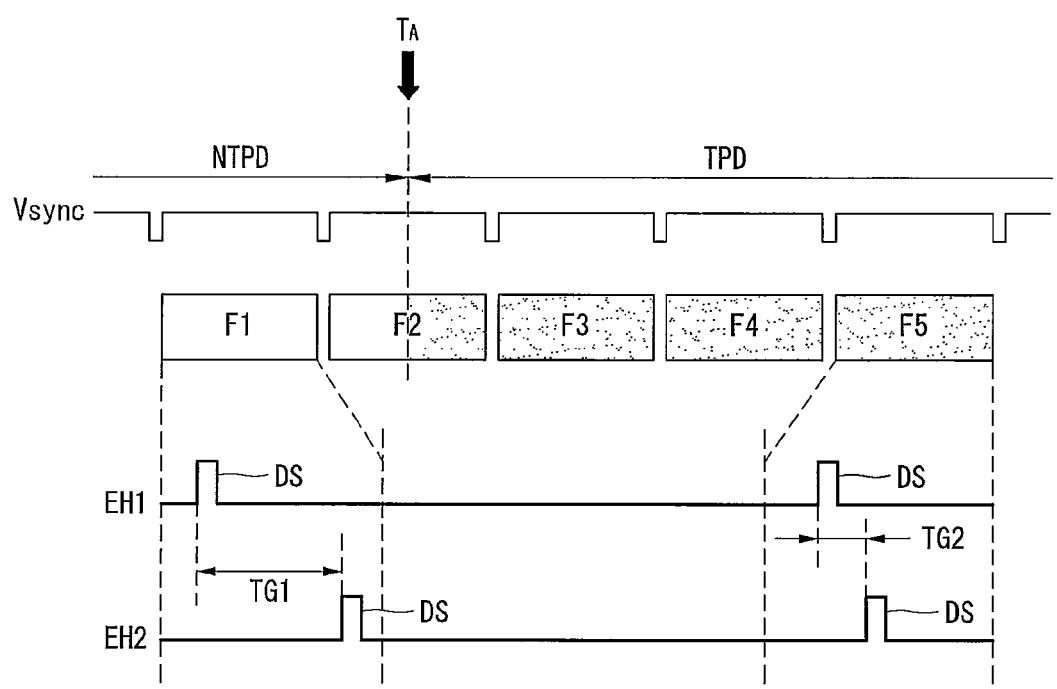

Alternatively, as shown in FIG. 66, a time gap TG2 in turn-on time between two light emitting devices that are sequentially turned on during the fifth frame period F5 corresponding to the touch duration TPD may be greater than a time gap TG1 in turn-on time between two light emitting devices that are sequentially turned on during the first frame period F1 corresponding to the non-touch duration NTPD.

In other words, the time gap TG2 between driving signals DS that are individually supplied to the two light emitting devices being sequentially turned on during the fifth frame period F5 corresponding to the touch duration TPD may be greater than the time gap TG1 between driving signals DS that are individually supplied to the two light emitting devices being sequentially turned on during the first frame period F1 corresponding to the non-touch duration NTPD.

In the case of a frame period that overlaps the touch duration TPD and the non-touch duration NTPD, the number of light emitting devices that are turned on may be smaller than that of light emitting devices that are turned on during a frame period included in the touch duration TPD and greater than that of light emitting devices that are turned on during a frame period included in the non-touch duration NTPD.

Figure 67:
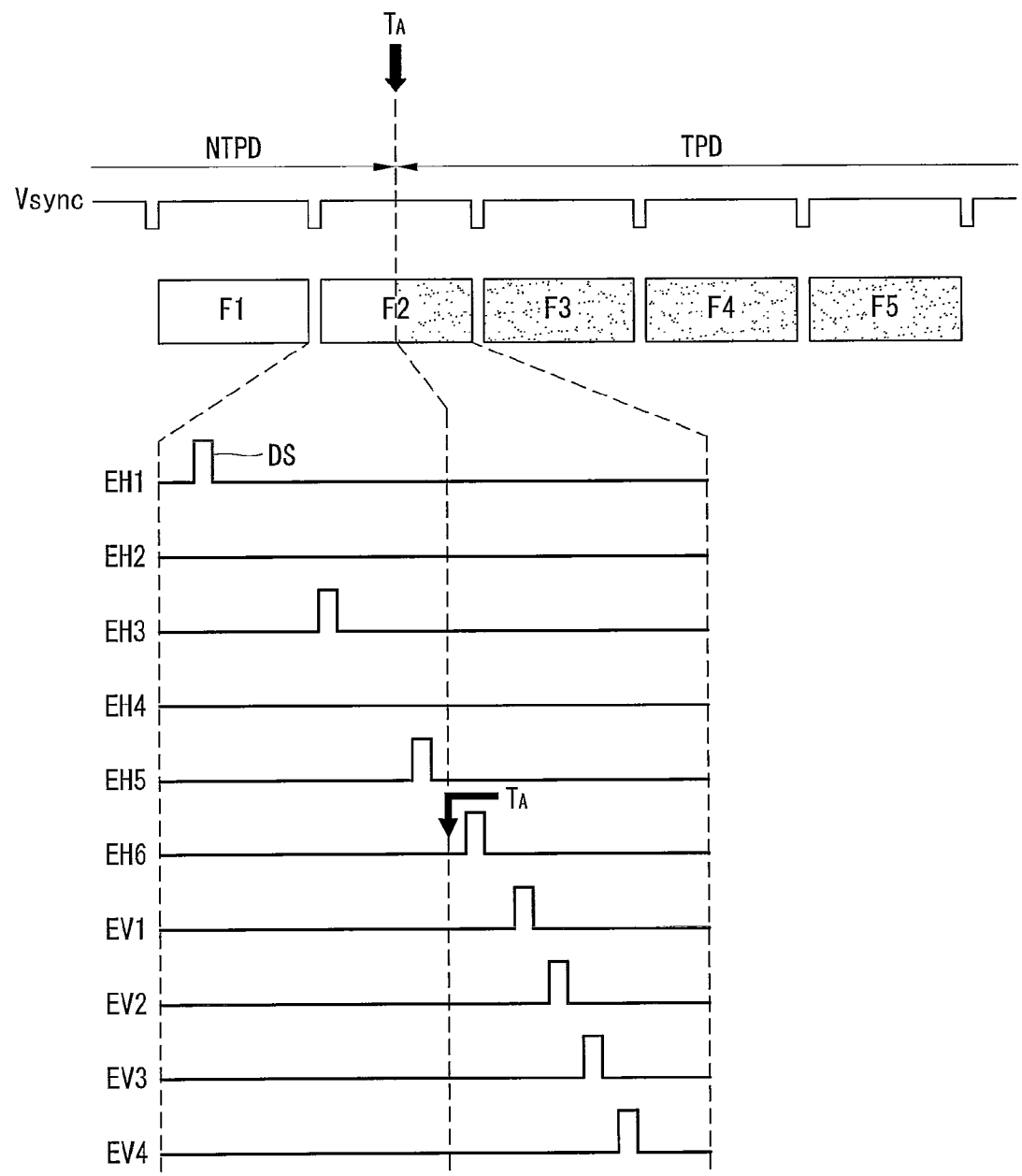

For example, as shown in FIG. 67, when the touch start time point $T_A$ is within the second frame period F2, the second frame period F2 may overlap the touch duration TPD and the non-touch duration NTPD.

In this case, driving signals DS may be supplied to odd numbered light emitting devices until the touch start time point $T_A$ within the second frame period F2, while driving signals DS may not be supplied to even numbered light emitting devices. In addition, driving signals DS may be supplied to odd numbered light emitting devices and even numbered light emitting devices after the touch start time point $T_A$ within the second frame period F2.

Moreover, during the first frame period F1, included in the non-touch duration NTPD, as shown in FIG. 64, driving signals DS may not be supplied to even numbered light emitting devices, and during the fifth frame period F5, included in the touch duration TPD, driving signals DS may be supplied to odd numbered light emitting devices in a sequential manner.

In this case, the number of light emitting devices that are turned on during the second frame period F2 may be greater than that of light emitting devices that are turned on during the first frame period F1 and smaller than that of light emitting devices that are turned on during the fifth frame period F5.

Even in this case, it is also possible to ignore the detection data corresponding to the second frame period F2.

Figure 68:
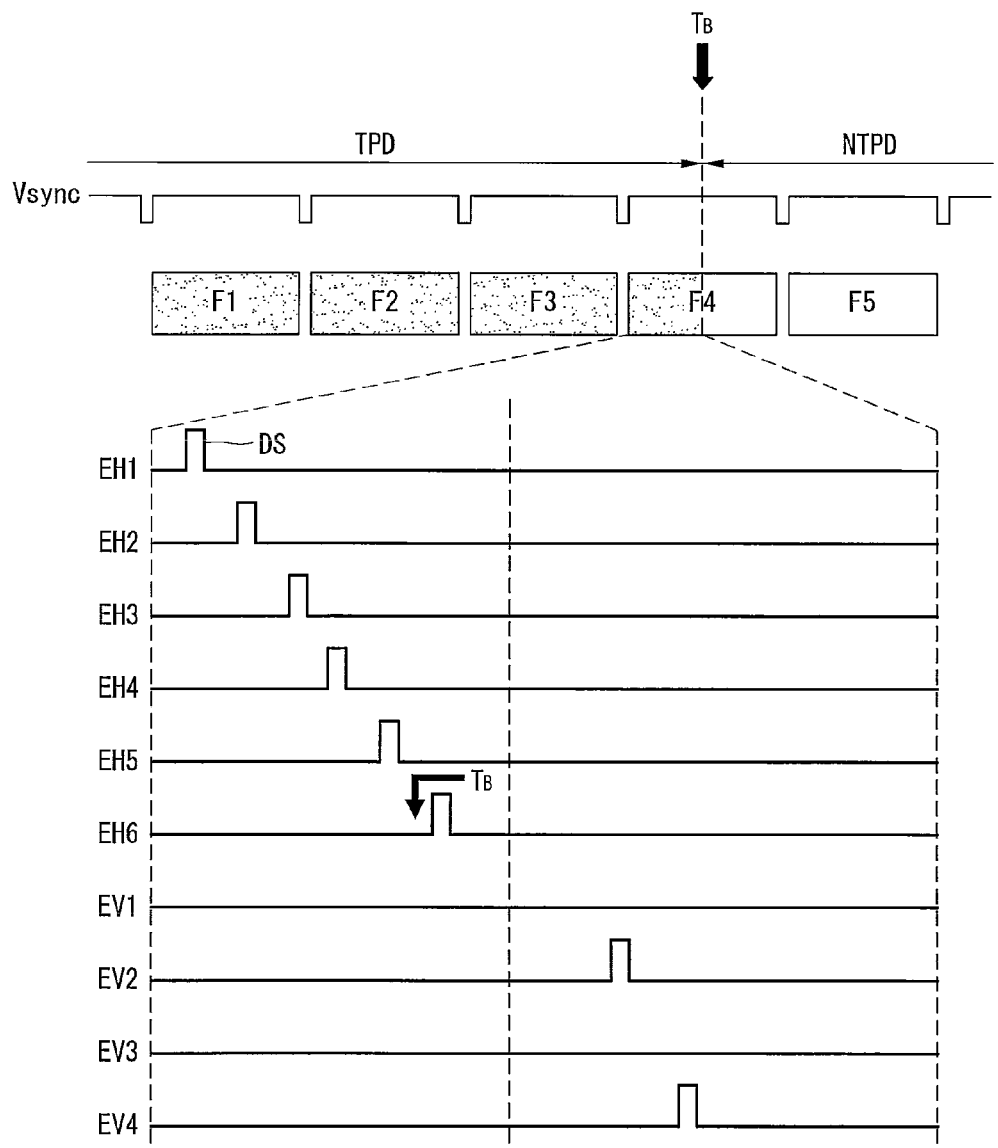

Alternatively, as shown in FIG. 68, when the touch end time point $T_B$ is within the fourth frame period F4, the fourth frame period F4 may overlap the touch duration TPD and the non-touch duration NTPD.

In this case, driving signals DS may be supplied to light emitting devices in a sequential manner until the touch end time point $T_B$ within the fourth frame period F4. In addition, a driving signal DS may not be supplied to every other light emitting device after the touch end time point $T_B$ within the fourth frame period F4.

In this case, the number of light emitting devices that are turned on during the fourth frame period F4 may be smaller than that of light emitting devices that are turned on during the first frame period F1 and greater than that of light emitting devices that are turned on during the fifth frame period F5.

Even in this case, it is possible to ignore the detection data corresponding to the fourth frame period F4.

According to embodiments of the present invention, a touch panel and a display apparatus having the same use a light emitting device and a light receiving device, thereby detecting a position, at which a touch is made, more quickly and accurately.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A touch panel comprising:
a substrate; and
a plurality of optical devices arranged on a flange of the substrate,
wherein the optical devices comprise a plurality of light emitting devices for emitting light and a plurality of light receiving devices for receiving the light emitted by the plurality of light emitting devices,
wherein the substrate comprises a first side, a second side opposite to the first side, a third side adjacent to the first and second sides, and a fourth side opposite to the third side and adjacent to the first and second sides,
wherein the plurality of light emitting devices are arranged on a flange of each of the first, second, third and fourth sides of the substrate,
wherein the plurality of light receiving devices are arranged on the flange of each of the first, second, third and fourth sides of the substrate,
wherein a first gap between a first light emitting element and a first light receiving element is smaller than a second gap between the first light receiving element and a second light receiving element,
wherein the first light emitting element, the first light receiving element and the second light receiving element are serially disposed in at least one of the first side, the second side, the third side or the fourth side,
wherein a gap between adjacent two of light receiving elements are uniform in size in at least one of the first side, the second side, the third side or the fourth side, and
wherein the plurality of light receiving elements are disposed between adjacent two of light emitting elements.

2. The touch panel of claim 1, wherein a gap between two adjacent light receiving devices is less than a gap between two adjacent light receiving devices.

3. The touch panel of claim 1, wherein a number of the plurality of light receiving devices is greater than a number of the plurality of light emitting devices.

4. The touch panel of claim 1, wherein at least one of the optical devices is arranged at the corner of the substrate.

5. A display apparatus comprising:
a display panel; and
a plurality of optical devices arranged around an edge of the display panel,
wherein the optical devices comprise a plurality of light emitting devices for emitting light and a plurality of light receiving devices for receiving the light emitted by the plurality of light emitting devices,
wherein the substrate comprises a first side, a second side opposite to the first side, a third side adjacent to the first and second sides, and a fourth side opposite to the third side and adjacent to the first and second sides,
wherein the plurality of light emitting devices are arranged on a flange of each of the first, second, third and fourth sides of the substrate,
wherein the plurality of light receiving devices are arranged on the flange of each of the first, second, third and fourth sides of the substrate,
wherein a first gap between a first light emitting element and a first corner of the substrate is less than a second gap between a second light emitting element and the first corner of the substrate, and
wherein a radiation angle of the first light emitting element is greater than a radiation angle of the second light emitting element.

6. The display apparatus of claim 5, wherein the display panel comprises an active area on which an image is displayed and a dummy area arranged outside the active area; and
the plurality of optical devices are arranged in the dummy area of the display panel.

7. The display apparatus of claim 5, wherein at least one of the optical devices is arranged at the corner of the substrate.

8. The display apparatus of claim 5,
wherein a direction to which a light emitting surface of at least one of the light emitting devices, arranged next each other, directs is different from a direction to which a light emitting surface of at least one of other light emitting devices.

9. The display apparatus of claim 5, wherein a number of the light receiving devices is greater than a number of the light emitting devices.

\* \* \* \* \*